(12) United States Patent
Katoh et al.

(10) Patent No.: US 6,652,044 B1
(45) Date of Patent: Nov. 25, 2003

(54) RUBBER CRAWLER

(75) Inventors: Yusaku Katoh, Fukuyama (JP); Hideki Kimura, Fukuyama (JP)

(73) Assignee: Fukuyama Gomu Kogyo Kabushiki Kaisha, Hiroshima (JP)

( * ) Notice: Subject to any disclaimer, the term of this patent is extended or adjusted under 35 U.S.C. 154(b) by 0 days.

(21) Appl. No.: 09/914,673

(22) PCT Filed: Feb. 28, 2000

(86) PCT No.: PCT/JP00/01153

§ 371 (c)(1),
(2), (4) Date: Aug. 31, 2001

(87) PCT Pub. No.: WO00/51876

PCT Pub. Date: Sep. 8, 2000

(30) Foreign Application Priority Data

Mar. 2, 1999  (JP) .............................. 11-53901
Feb. 24, 2000  (JP) .......................... 2000-47510

(51) Int. Cl.[7] .............................................. B62D 55/24

(52) U.S. Cl. ..................... 305/165; 305/167; 305/177; 305/195; 305/171

(58) Field of Search ................. 305/167, 169, 305/171, 173, 174, 175, 176, 177, 165, 157, 158, 163, 164, 202, 204

(56) References Cited

U.S. PATENT DOCUMENTS 2,914,360 A  * 11/1959  Duclot
4,141,600 A  *  2/1979  Orpana
5,362,142 A  * 11/1994  Katoh

FOREIGN PATENT DOCUMENTS

| JP | 143169 | 7/1975 |
| JP | 62-261581 | * 11/1987 |
| JP | 5-58357 | 3/1993 |
| JP | 5-139344 | * 6/1993 |
| JP | 9-207838 | 8/1997 |

* cited by examiner

Primary Examiner—Russell D. Stormer
(74) Attorney, Agent, or Firm—Venable LLP; John P. Shannon

(57) ABSTRACT

A rubber crawler has a core of generally parallelepiped blocks (5) each having two longitudinally spaced through holes (9) in the lower surface region and bars (4) inserted in the through holes (9), the generally parallelepiped blocks (5) being arranged in two series, with the blocks of one of the series laterally overlapping the blocks of the other series, and with sprocket engaging holes (2) disposed therebetween, and the bars (4) being inserted in alternately corresponding through holes (9) in adjacent generally parallelepiped blocks (5), the bars (4) being connected within the generally parallelepiped blocks (5), the bars (4) being connected within the generally parallelepiped blocks (5) and embedded in the rubber crawler.

20 Claims, 103 Drawing Sheets

A

B

A

B

A

B

A

B

A

B

C

A

B

A

B

RUBBER CRAWLER

TECHNICAL BACKGROUND

An iron crawler has been much used for an endless track running gear, which is used for running parts of the construction machine etc. However, recently a rubber crawler has been preferably used not to damage a pavement. FIG. 101 is a plan view showing an example of a conventional rubber crawler. FIG. 102 is an X—X line sectional view in FIG. 101, and FIG. 103 is a Y—Y line sectional view in FIG. 101. In the figures, 67 is a core guide protrusion, 64 is a core, 65 is a rubber elastic body, and 66 is an extensible reinforcing layer.

Recently, since the construction machine using the rubber crawler is comfortable to drive and is little fatiguing a driver, it has been more often used under severe conditions except the pavement etc.

Therefore, the construction machine often runs over sharp rocks and scrap wood in civil engineering works. In an operating condition, a foreign substance is caught between the rubber crawler and a driving wheel or an idler wheel, thereby generating unusual tension on the rubber crawler. Therefore, a steel cord of the extensible reinforcing layer is cut, or a steel cord wrapping part is pulled out.

Catching the foreign substance as above-mentioned, or inverse warping of the rubber crawler during running on rough terrain, causes the core guide protrusion to be caught on a chassis. Since the cord adds mighty driving force from the driving wheel, the catching phenomenon destroys adhesion between the core and the steel cord. Owing to this, the core protrudes.

Moreover, during running on rough terrain, a cut crack occurs in a rubber part. In this case, when the crack reaches the steel cord of the extensible reinforcing layer of the rubber crawler, the steel cord is severed due to a cut or corrosion, thereby making the machine unusable as a rubber crawler, though the rubber part can be still used.

In order to solve the above-mentioned problems, this invention aims to provide a rubber crawler to be usable under severe operating conditions.

The Indication of Invention

The present invention relates to a rubber crawler comprising a core consisting of generally parallelepiped blocks each having two longitudinally spaced through holes in the lower surface region and bars inserted in the through holes. The generally parallelepiped blocks are arranged in two series, with the blocks of one of the series laterally overlapping the blocks of the other series, and with sprocket engaging holes disposed therebetween, and the bars are inserted in alternately corresponding through holes in adjacent generally parallelepiped blocks. The bars are connected within the generally parallelepiped blocks and embedded in the rubber crawler.

Besides, the above-mentioned problems can be solved by means of choosing and combining the following listing compositions suitably.

1. At least, a minimum rubber crawler unit is formed from two generally parallelepiped blocks and one bar to insert into the through hole. Then, a rubber crawler unit comprising of plural generally parallelepiped blocks and plural bars is formed from the minimum rubber crawler unit. The generally parallelepiped blocks are arranged in two series, with the blocks of one of the series laterally overlapping the blocks of the other series, and with sprocket engaging holes disposed therebetween, and the bars are inserted in alternately corresponding through holes in adjacent generally parallelepiped blocks. The bars are connected within the generally parallelepiped blocks and embedded in the rubber crawler unit.

The generally parallelepiped blocks are provided at both ends of the rubber crawler unit in a crawler circumferential direction, and at one side of right and left of the rubber crawler unit in a crawler width direction with the engaging holes disposed therebetween. Connecting bars are inserted in connecting generally parallelepiped block through holes and connecting bar insertion holes of the generally parallelepiped blocks, respectively, thereby connecting adjacent rubber crawler units in the crawler circumferential direction at their ends. Thus, an endless rubber crawler can be formed.

2. The bar is a stick member having a circular section, and a bush is fitted in a sprocket engaging part of the bar.

3. A diameter of the through hole of the generally parallelepiped block is larger than the outer diameter of the bar. Filling a gap between the through hole and the bar with rubber, the bar can be connected through the rubber of an elastic material.

4. The through hole of the generally parallelepiped block is formed into different sizes in its front face and back face, one side small and the other side large. Besides, a bar shake stop protrusion is provided within the through hole.

5. An upper surface region of the generally parallelepiped block protrudes out of an inner circumference side of the rubber crawler. In this case, the protrusion may be formed in a horn shape, or its top part may be formed flat so as to serve as a travelling rolling surface which a rolling wheel contacts.

6. A wing part is provided on an outside of the generally parallelepiped block in the crawler width direction. In this case, the wing part is formed so as to be located between the bar and the bar, or so as to extend in the crawler circumferential direction.

7. Lateral shift control parts are provided to both ends of the generally parallelepiped block in its length direction. When embedded in the rubber crawler, the lateral shift control parts may be overlapped with those of an adjoining generally parallelepiped block in view of the crawler circumferential direction, respectively.

8. In order to reinforce the rubber crawler, a reinforcing layer is embedded in the rubber crawler in all its circumference, the reinforcing layer distributed on both sides in the crawler width direction. Here, the reinforcing layer may be embedded in both sides of the bar, the outer circumference side and the inner circumference side, or in either one of them. Besides, the reinforcing layer may be made to meander on inclining towards a center of the thickness of the rubber crawler between the bar and the bar, or in the inner circumference side and the outer circumference side alternately between two bars. In this case, a connecting ring and a generally parallelepiped auxiliary block may be arranged on the outside of the generally parallelepiped blocks, shifted by half a pitch relative thereto. Moreover, the reinforcing layer may be embedded on the outside of the connecting ring (tread side).

9. In the above-mentioned case, a lug is provided so as to shift by half a pitch to the connecting ring.

10. A top face of the generally parallelepiped auxiliary block in the inner circumference side of the rubber crawler is exposed, or covered with rubber to a degree of burr.

11. A pipe is fitted on the bar of the outside of the generally parallelepiped block. Besides, the outside part of the generally parallelepiped block may be attached and detached. Here, an inner wall of the pipe may be covered with a high molecular compound layer, such as rubber.

12. A band provided to the outside part of the generally parallelepiped block is divided into one to plural single substances or owner end bands, which have two or more bars. In this case, adjoining portions of ends of the divided single substance or the owner end band may touch face to face each other.

13. The end of the simple substance or the owner end band is located on a circle centering on the center of the bar in a right-angled section of the bar length direction.

Due to the present invention, the cores consisting of the bars and the generally parallelepiped blocks are connected endlessly. Here, the generally parallelepiped blocks having two through holes are arranged in two series, with the blocks of one of the series laterally overlapping the blocks of the other series, and with the engaging holes disposed therebetween, and the bars are inserted in these through holes one by one to connect the cores. Therefore, even if any deep external injury is inflicted on the rubber crawler, it does not fracture like the conventional rubber crawler. Besides, even if the generally parallelepiped block is caught in the chassis of the machine, the core never protrudes unexpectedly.

The bar is a stick member, and its section form is made circular or polygonal in accordance with a purpose for use. However, the form is not limited to these. Besides, the bar may be either full or hollow. When the bar is full, it has the highest intensity. When the bar is hollow, it is lightweight.

Moreover, when the section form is circular, the intensity is the highest. However, the Other forms can be selected freely.

Furthermore, when fitting the bush in the sprocket engaging part of the bar, a different size sprocket can be applied by changing the size of the bush. When using a wear resistant bush, the rubber crawler improves its durability, thereby serving as a long-lived one. In this case, the bush can be formed integrally with the generally parallelepiped block.

Besides, the bar may be formed into a flat plate having fixed thickness except a portion in which the generally parallelepiped block is fitted. In addition, the bar may be formed in the shape of a ladle as one end on the bar length direction is broader than a diameter of the central part.

The diameter of the through hole of the generally parallelepiped block is larger than that of the bar, and the gap therebetween is filled with rubber to be pasted up. Here, the bar is fixed through the rubber of an elastic material. Even if a high load is applied to the rubber crawler, the rubber crawler can elongate somewhat. In contrast to an iron ring, unusual tension is hardly generated, and the crawler is prevented from breaking easily. Though the bar is fixed to the through hole of the generally parallelepiped block through the elastic material, it is fixed firmly in comparison with the conventional rubber crawler. Therefore, the rubber crawler is prevented rocking and derailing broadly, and lessens rock and oscillations of each bar.

The rubber crawler moves through a rubber layer between the bar and the through hole of the generally parallelepiped block, thereby preventing friction between the through hole and the bar, preventing its abrasion, and preventing creaking sound.

The through hole of the generally parallelepiped block is made with its sprocket engaging hole side large and the other side small. In this case, the bar shake stop protrusion is provided to the inner wall of the enlarged through hole, the rubber crawler decreases twists and shake of the bar.

In this case, in FIG. 74A, a bar wing having a breadth larger than a through hole-through hole interval between adjacent generally parallelepiped blocks as shown is provided to one side of the bar, which corresponds to the outside portion of the generally parallelepiped block in the crawler width direction. A bar wing through hole, which the bar is inserted in its portion equivalent to the through hole of the adjoining generally parallelepiped block is provided to the bar wing. As shown in FIG. 75, when inserting the bar, which is inserted in the through hole of the adjoining generally parallelepiped block, into the bar wing through hole similarly, the rubber crawler is connected with the generally parallelepiped block and the bar wing. Accordingly, it is connected still more firmly.

In the present invention, the rubber crawler is not limited to an integral endless composition. That is the endless rubber crawler can be formed as follows. At least, a minimum rubber crawler unit consisting of two generally parallelepiped blocks and one bar to be inserted into their through holes. The generally parallelepiped blocks are arranged in a zigzag pattern with sprocket engaging holes disposed therebetween, and the bars are inserted in alternately corresponding through holes in adjacent generally parallelepiped, blocks. The bars are connected with the generally parallelepiped blocks, and embedded in the rubber crawler unit. The generally parallelepiped blocks are provided to both ends of the rubber crawler unit in the crawler circumferential direction, which are either right or left side in the crawler width direction with the engaging hole disposed therebetween. The bar is inserted into the connecting generally parallelepiped block through, hole of the generally parallelepiped block at the end of the rubber crawler unit and at the end of the adjoining rubber crawler unit in the crawler circumferential direction, and is connected with them. (When the generally parallelepiped block of the one end is left-hand side, the generally parallelepiped block of the end of the adjoining rubber crawler unit is arranged at right-hand side.) In this way, an endless rubber crawler may be formed.

In this case, the rubber crawler unit is made up of plural generally parallelepiped blocks and plural bars besides the minimum rubber crawler unit consisting of two generally parallelepiped blocks and one bar inserted into their through holes, and forms a rubber crawler unit having necessary length. Here, the rubber crawler may be made endless by connecting same kind of rubber crawler unit, or different kind of rubber crawler unit with suitably combined, or both ends of one rubber crawler unit.

Accordingly, if the rubber crawler should be damaged partially, only the damaged portion needs to be exchanged. Therefore, compared with exchanging the whole rubber crawler, cost is reduced, waste decreases, and abandonment processing also becomes easy.

When the protrusion of the generally parallelepiped block in the inner circumference side of the rubber crawler (anti-tread side) is protruded in the shape of a horn, it serves as a slip-preventing guide of the rolling wheel or the idler wheel. Besides, when the top of the protrusion is formed flat, it serves as a rolling contact surface that the rolling wheel contacts with, thereby serving as a rubber crawler interchangeable with an iron crawler.

Besides, the wing part provided to the generally parallelepiped block serves as a rolling part of an outer rolling wheel, and decreases oscillations when the outer rolling wheel travels on the rubber crawler. When the wing part is extended in the rubber crawler circumferential direction, this effect is increased. Moreover, when the wing part is provided between the bar and the bar, the generally parallelepiped block becomes cheap as well as has the above effect, thereby reducing cost.

When providing the lateral shift control part to the both ends of the generally parallelepiped block in its length direction and embedding in the rubber crawler, if each lateral shift control part of adjacent generally parallelepiped blocks is overlapped in view of the rubber crawler circumferential direction, a lateral shift is prevented. Therefore, the rubber crawler is prevented a derailment.

Besides, when forming one end of the lateral shift control part convex and the other end concave, and overlapping these in the shape of a nest, the lateral shift and twists are prevented. Therefore, the rubber crawler is prevented the derailment more.

When embedding the reinforcing layer into the inner or the outer circumference of the bar, driving force brought from the sprocket to the bar is distributed on the whole rubber crawler through the reinforcing layer, and transmitted to the lug efficiently, thereby providing sufficient traction. Simultaneously, partial stress around the bar is also eased, thereby improving durability of the rubber crawler.

The reinforcing layer is suitably chosen from Vinylon, Nylon, Tetron, Kevlar, and steel cord etc. Here, each material of the reinforcing layers in the outer circumference side and the inner circumference side may be either same or different. Besides, its form may be either linear or textile, and is not limited to these.

Besides, the reinforcing layer can be provided to either the inner circumference side or the outer circumference side.

Next, connecting rings as shown in FIGS. 45 to 48 are arranged in a zigzag pattern on the outside, in the crawler width direction, the rings shifted by half a pitch to the generally parallelepiped block. Two adjacent bars are inserted with shifting by half a pitch thereto as shown in FIG. 44 and all bars are connected at both sides of the sprocket engaging hole. In this case, when the crawler coils around the driving wheel or the idler wheel, or when tension added on the crawler changes, distortion repeatedly generated to rubber between the generally parallelepiped blocks is reduced, thereby preventing rubber fatigue destruction therebetween. Besides, the rubber crawler lessens oscillations and twists, thereby preventing its derailment.

Moreover, the connecting ring increases rigidity of the rubber part and distributes the driving force brought from the sprocket on the whole rubber crawler to transmit to the lug, thereby providing sufficient traction. In this case, when the above-mentioned reinforcing layer is embedded to the outer circumference side of the connecting ring (tread side), the driving force is distributed more uniformly, thereby providing still more sufficient traction.

The connecting ring having each form such as FIG. 45, FIG. 46 and FIG. 48 is made of spring steel, steel cords, high intensity fibers etc. When the connecting ring in FIG. 47 is made of the high intensity fibers, it has spring nature, thereby preventing unusual tension. Accordingly, the rubber crawler is hardly fractured.

In this case, in the rubber crawler provided with the connecting ring, when the lug is arranged with shifting by half a pitch to the connecting ring (one pitch to the bar) in the crawler circumferential direction, rigidity between the connecting rings is prevented falling. The rigidity is balanced as a whole. Accordingly, the traction from the sprocket is efficiently transmitted to the lug.

In the above-mentioned rubber crawler, the connecting ring may be used as the generally parallelepiped auxiliary block. In this case, the diameter of the through hole provided to the generally parallelepiped auxiliary block is larger than the outer diameter of the bar, and rubber is filled into the gap between the through hole and the bar to be pasted up. Here, the bar is fixed through the rubber of an elastic material. Therefore, the rubber crawler is provided with more or less elongation and spring nature, thereby hardly generating unusual tension. Besides, since the bar is fixed firmly, the rubber crawler lessens oscillations and hardly derails.

When exposing the top face of the generally parallelepiped auxiliary block in the inner circumference side of the rubber crawler, or when covering it with a thin rubber layer to a degree of burr, it serves as a rolling contact surface that a rolling wheel of an outer rolling wheel type travels on.

When the pipe is fitted to the bar outside the generally parallelepiped block in the crawler width direction, the rubber part wrapping the pipe can be attached or detached easily. When the rubber part is damaged, only it can be exchanged, thereby serving as an economical rubber crawler so that only the rubber crawler to be damaged at an early stage can be independently molded.

The inner wall of the pipe is covered with a thin high molecular compound layer such as rubber, epoxy, urea, urethane, and liquefied rubber, thereby preventing noises due to friction between the pipe and the bar, and enabling stable adhesion to the bar.

Furthermore, when the band provided to the outside part of the generally parallelepiped block in the crawler width direction is divided into one to plural simple substances or owner end bands having two or more bars, the damaged rubber part is exchanged easily. In this case, the band is divided at one position or plural positions freely, and may be divided into the simple substances having two bars.

In addition, in the rubber crawler provided with the connecting ring, when dividing the rubber crawler per connecting ring (the simple substance having two bars), the divided simple substance becomes small, thereby being produced with a small molding apparatus. Besides, it is easy to convey and exchange.

On the other hand, when touching face to face the ends of the divided simple substance or owner end band in the crawler circumferential direction, each gap therebetween disappears, thereby preventing mud and foreign substances going up at the inner circumference side of the rubber crawler. As well as prevented the derailment and unusual tension due to the foreign substances bit between the sprocket and the rubber crawler, the rubber crawler is prevented sinking and decreasing its revolving nature at a soft ground.

When touching face to face the ends of the divided simple substance or the owner end band in the crawler circumferential direction, if a circle of each end is located on a circle centering on the bar axial center in view of a right-angled section in the bar length direction, the ends can keep the touching. In this case, when the rubber crawler coils to an idler or a sprocket or drives on rough road surface, it is transformed into the inner or the outer circumference side, and the touching position of the end moves. Even in thus state, mud and foreign substances are prevented coming in the inner circumference side of the rubber crawler, thereby preventing the unusual tension and the danger of the derailment.

BRIEF EXPLANATION OF THE DRAWINGS

FIG. 65A is a plan view showing it before connecting, and FIG. 65B is a plan view thereof after connecting.

PREFERRED EMBODIMENTS OF THE INVENTION

Figure 1:
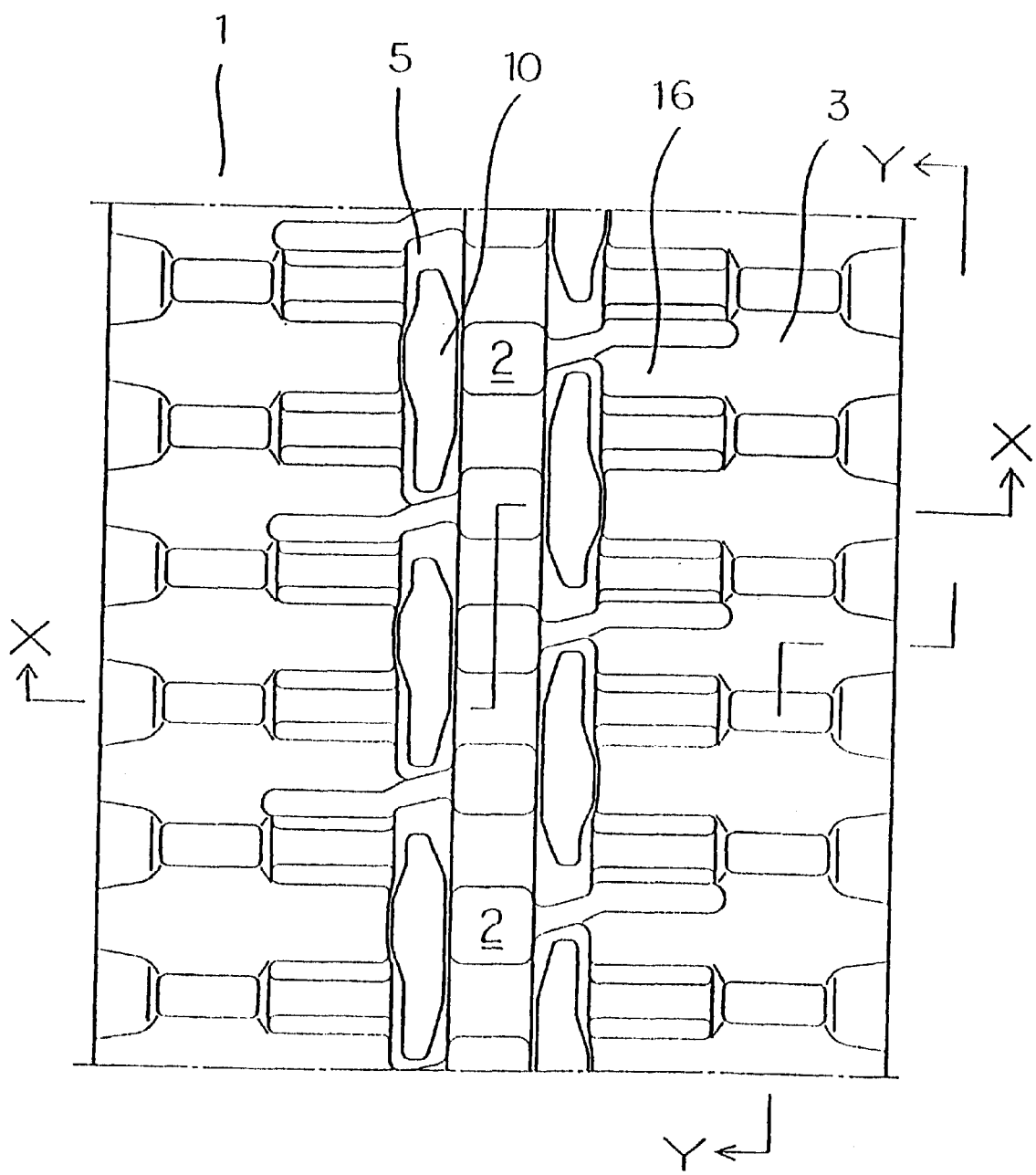
FIG. 1 is a plan view owing an inner circumference side of a rubber crawler of the 1st example.
Figure 2:
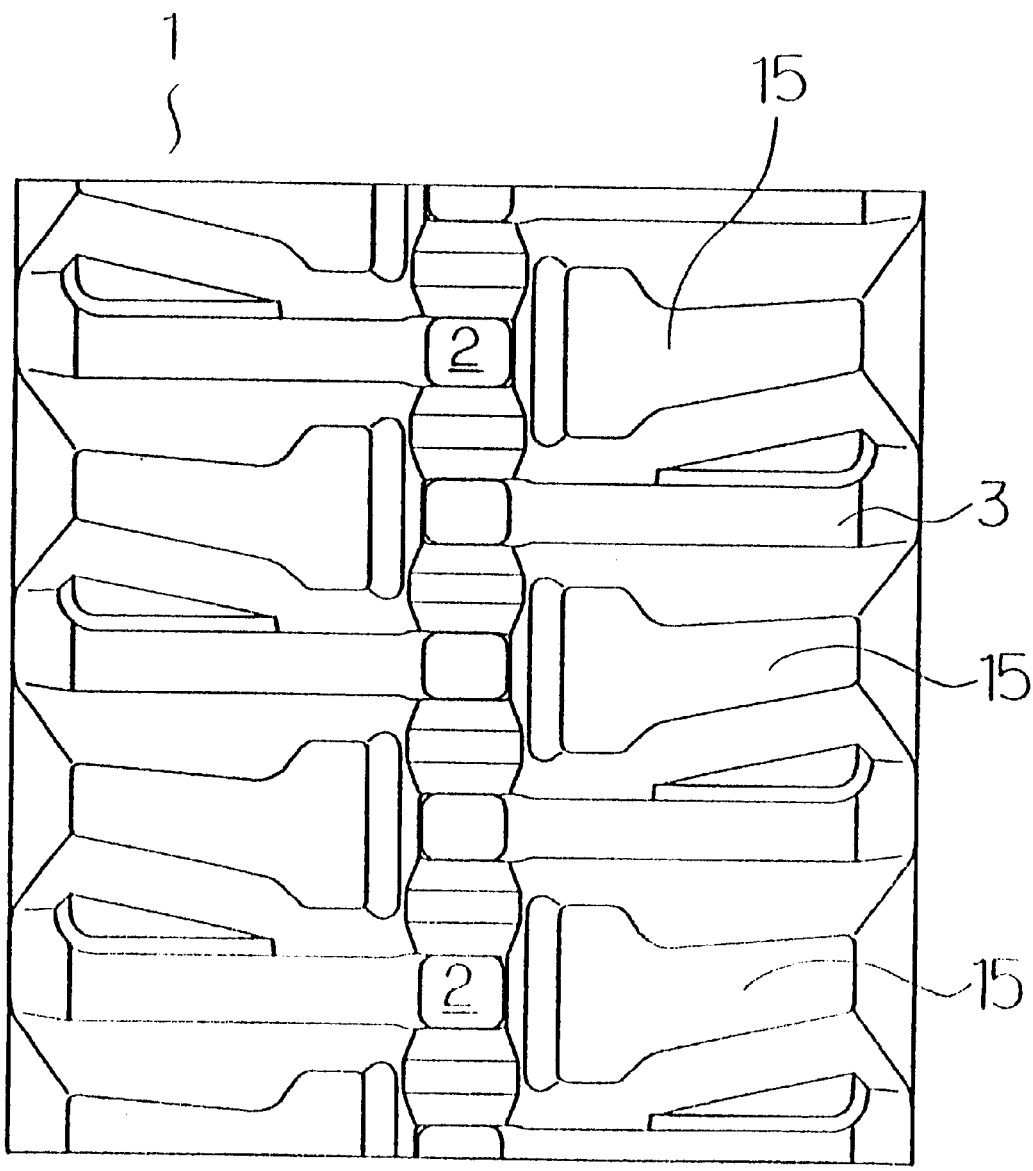
FIG. 2 is a plan view showing an outer circumference side of the rubber crawler.
Figure 3:
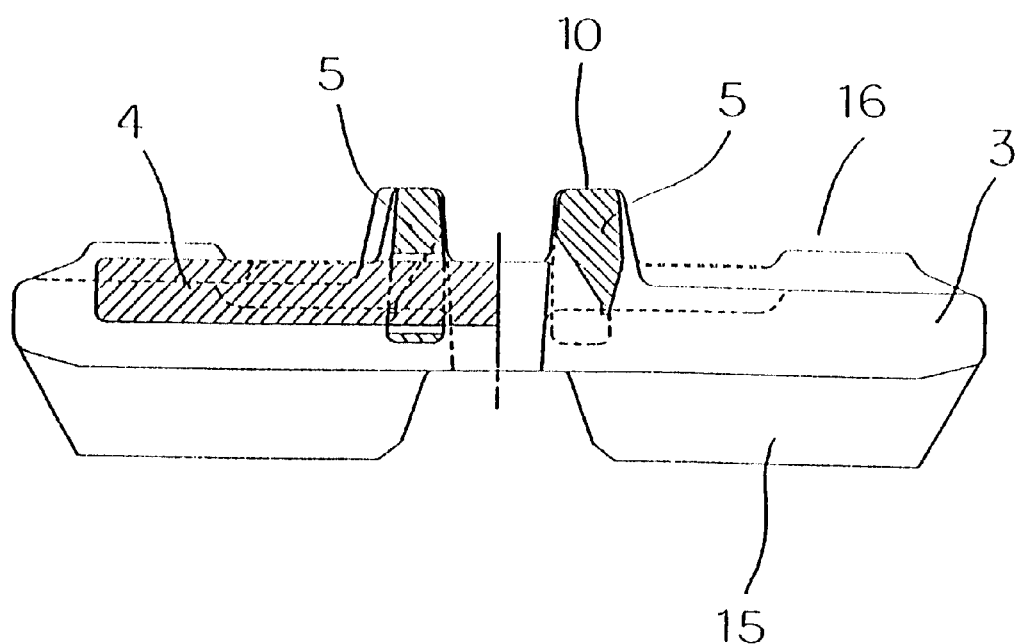
FIG. 3 is an X—X line sectional view in FIG. 1.
Figure 4:
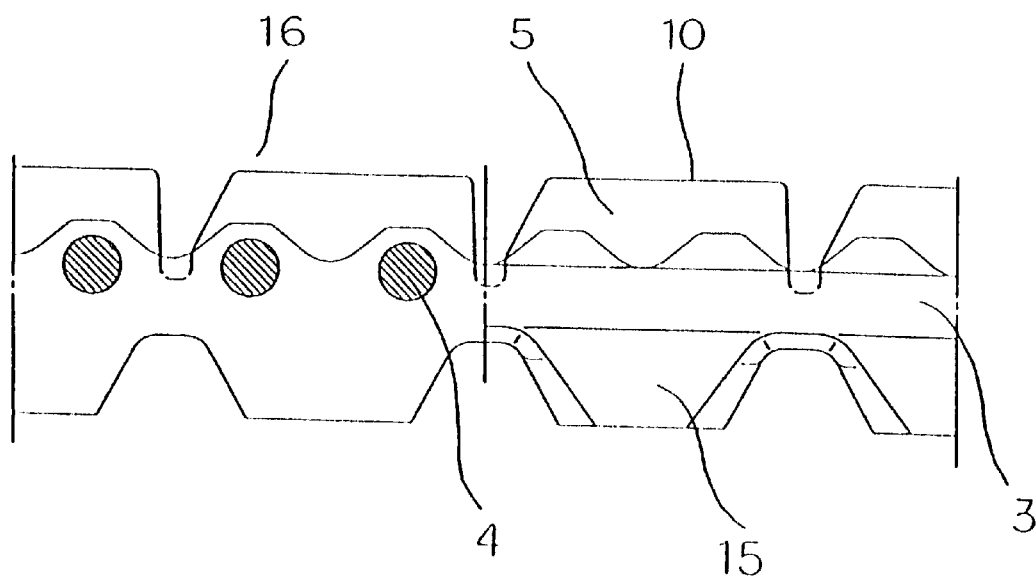
FIG. 4 is a Y—Y line sectional view in FIG. 1.
Figure 5:
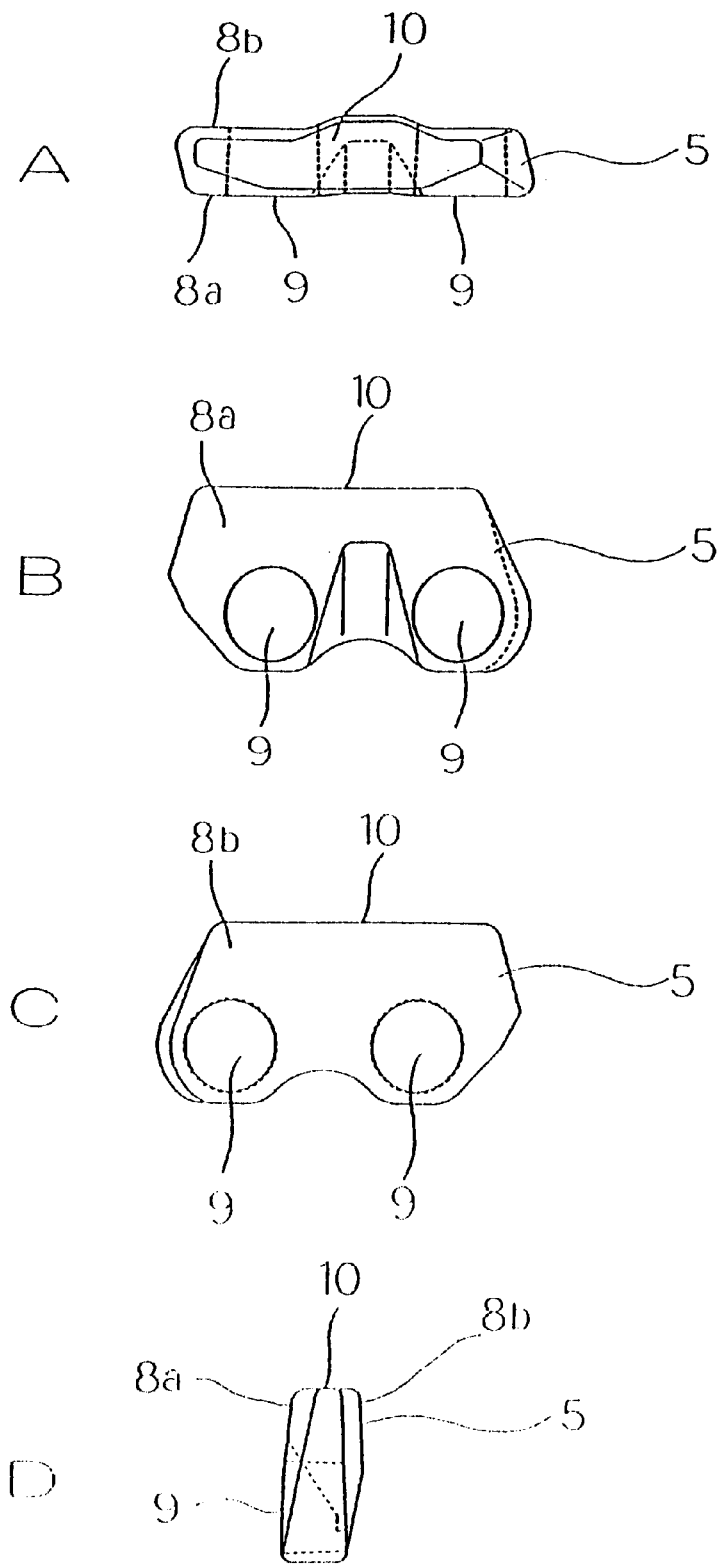
FIG. 5A is a plan view of a generally parallelepiped block of the 1st example.
FIG. 5B is a front view thereof.
FIG. 5C is a back view thereof.
FIG. 5D is a side view thereof.
Figure 6:
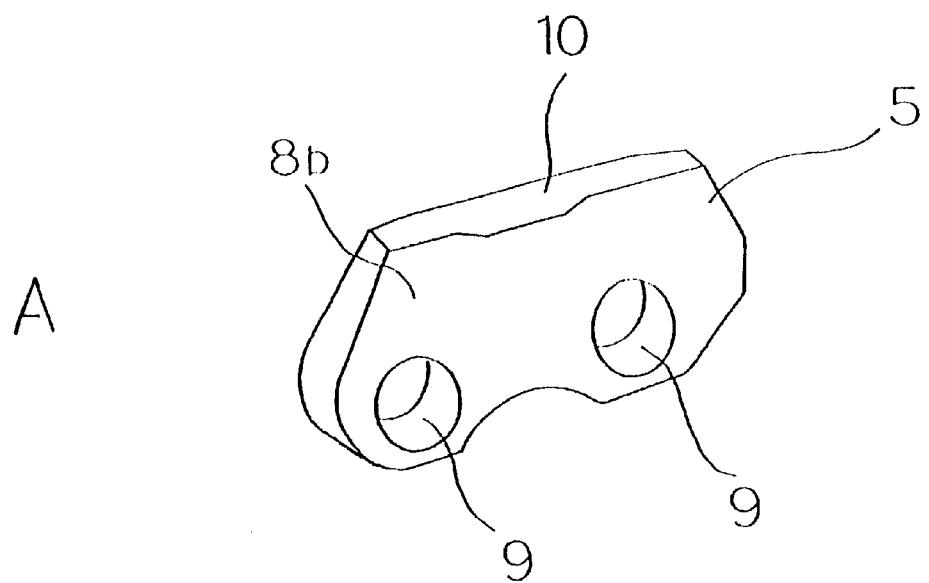
FIG. 6A is a perspective view showing the generally parallelepiped block of the 1st example.
FIG. 6B is a perspective view showing a bar thereof.
Figure 6:
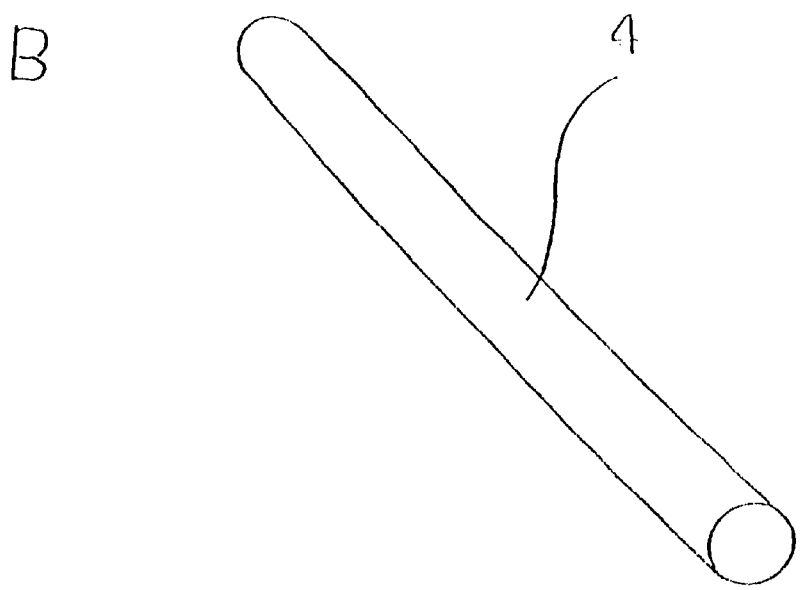
Figure 7:
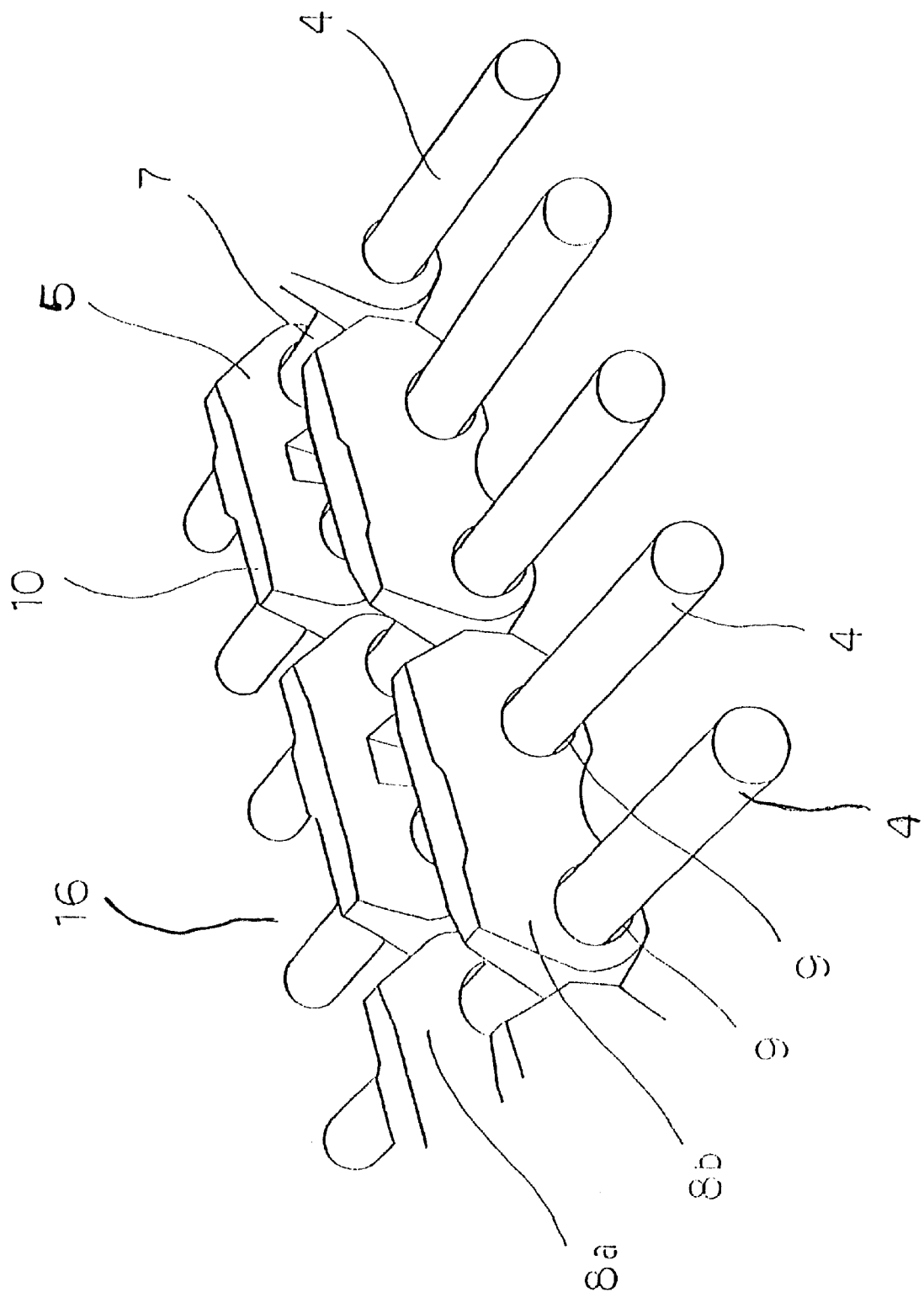
FIG. 7 is a combination view of the bar and the generally parallelepiped block of the 1st example.
Figure 8:
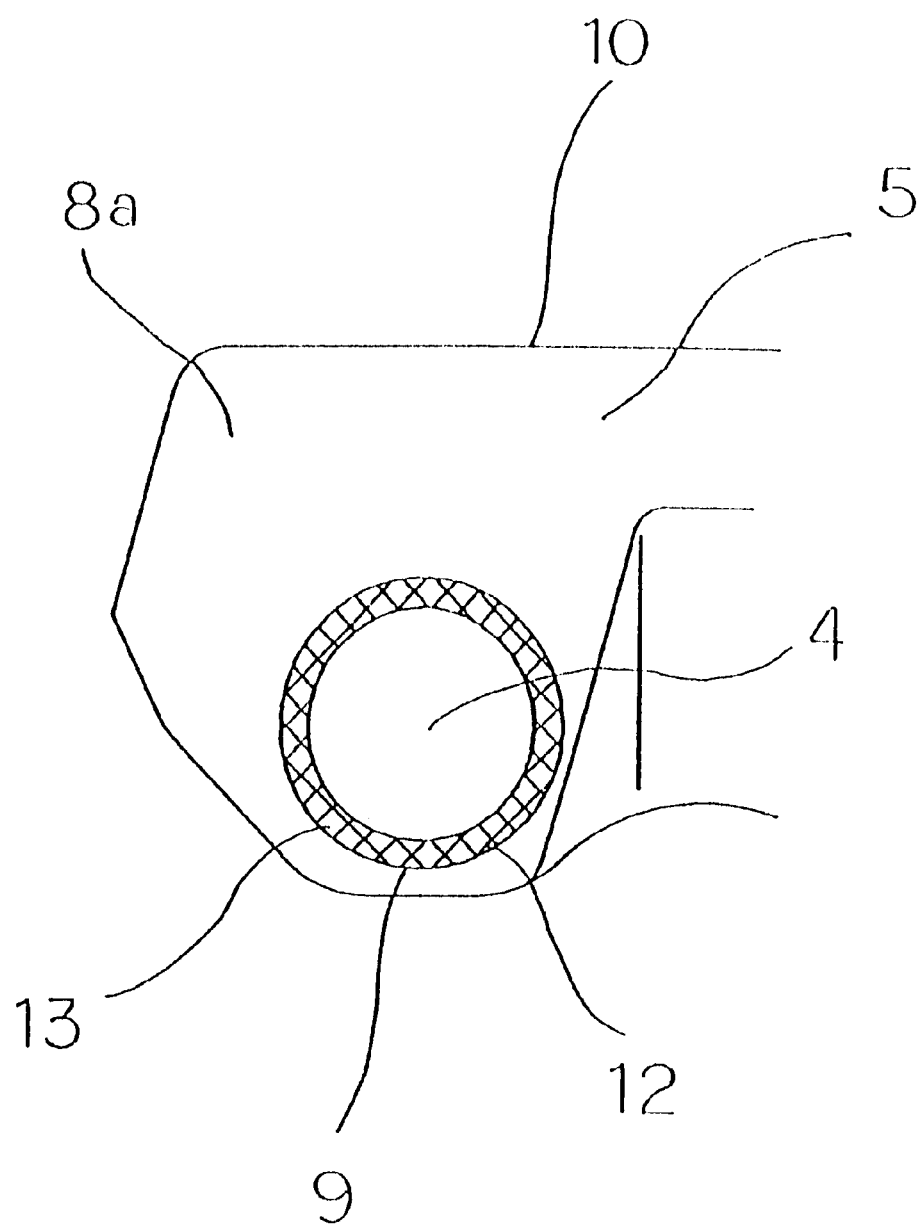
FIG. 8 is an assembly front view showing their combination state.
Figure 9:
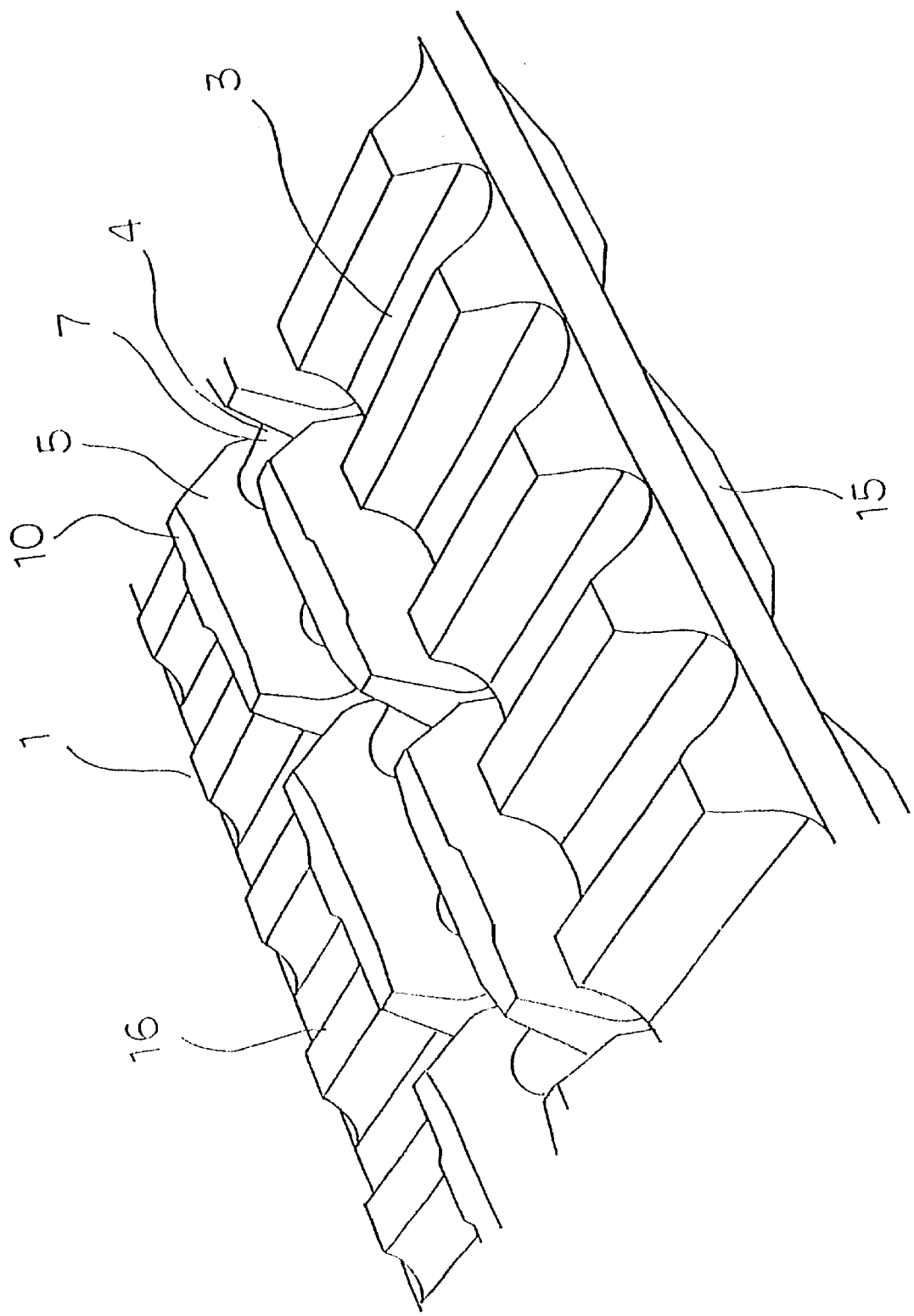
FIG. 9 is a perspective view of the rubber crawler of the 1st example.

Hereafter, examples of this invention will be described with reference to the drawings. FIG. 1 is a plan view showing an inner circumference side 16 (anti-tread side) of a rubber crawler of the 1st example of this invention. FIG. 2 is a plan view showing an outer circumference side (tread side) of the rubber crawler. FIG. 3 is an X—X line sectional view in FIG. 1. FIG. 4 is a Y—Y line sectional view in FIG. 1. FIG. 5 shows a generally parallelepiped, block 5 embedded in a rubber crawler body 3, FIG. 5A is a plan view thereof, FIG. 5B is a front view thereof, FIG. 5C is a back view thereof, and FIG. 5D is a side view thereof. FIG. 6A and FIG. 6B are perspective views of the generally parallelepiped block 5 and a bar 4 which are embedded in the rubber crawler body 3. FIG. 7 shows a combination view of the bar and the generally parallelepiped block 5. FIG. 8 is an assembly front view showing their combination state. FIG. 9 is a perspective view of the rubber crawler.

The rubber crawler 1 is provided a core consisting of the bar 4 and the generally parallelepiped blocks 5 within the endless rubber crawler body 3, which has two engaging holes 2 at the center, in alternately and at fixed interval. The bar 4 is a stick material having a circular section form, inserted in a through hole 9 provided in the generally parallelepiped blocks 5, embedded in the rubber crawler body 3. A central part 7 of the bar 4 engages with a sprocket (not shown).

Two through holes 9, 9 penetrate from a front face 8a to a back face 8b of the generally parallelepiped block 5 in the lower surface region in its length direction. Adjacent bars 4, 4 are inserted in alternately the through holes 9, 9, the generally parallelepiped block 5 being arranged in two series, with the blocks of one of the series laterally overlapping the blocks of the other series, and with engaging holes 2 disposed therebetween. Here, the bars 4 are connected within the generally parallelepiped block 5, and embedded in the rubber crawler body 3.

The inner diameter of the through hole 9 of the generally parallelepiped block 5 is larger than the outer diameter of the bar 4. A gap 12 between the through hole 9 and the bar 4 is made full of rubber 13, and the rubber 13 is pasted up on the generally parallelepiped block 5 and the bar 4.

An upper surface region of the generally parallelepiped block 5 protrudes to the inner circumference side (anti-tread side) 16 of the rubber crawler. A top face 10 of the protrusion is made flat, serving as a rolling contact surface on which a rolling wheel equipped in a machine travels. The protrusion serves as a slip-preventing guide of the rolling wheel or an idler wheel.

In this case, the top face 10 of the protrusion is not covered with rubber, or covered with thin rubber to a degree of burr. Moreover, both of the bar 4 and the generally parallelepiped block 5 are pasted up with a rubber part of the rubber crawler body 3.

As shown in FIGS. 1 and 7, the bars 4, 4 which adjoin in a circumferential direction of the crawler are inserted in alternately the through holes 9, 9 of the generally parallelepiped block 5 with the engaging hole 2 disposed therebetween, and connected. Since each bar 4 is supported by the generally parallelepiped block 5, it does not rock, thereby causing few oscillations and few twists. Accordingly the above-mentioned rubber crawler can lessen slip of the crawler.

Moreover, since the generally parallelepiped block 5 and the bar 4 are connected by the rubber 13 of an elastic material, the rubber crawler can extend to a certain degree, thereby hardly generating unusual tension. Accordingly, as long as the bar 4 and the generally parallelepiped block 5 are not broken, the rubber crawler is not fractured.

Figure 10:
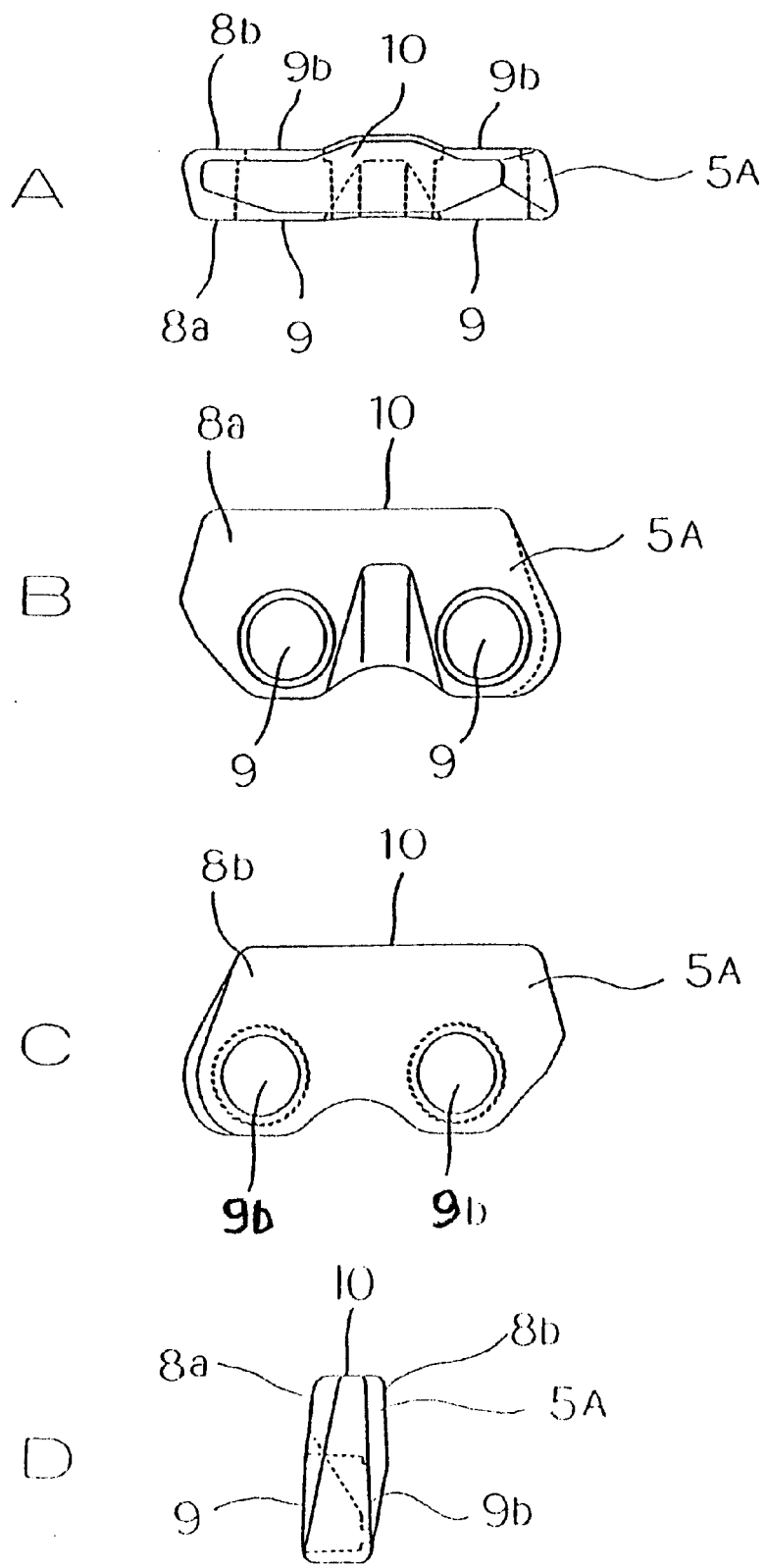
FIG. 10A is a plan view of a generally parallelepiped block of the 2nd example.
FIG. 10B is a front view thereof.
FIG. 10C is a back view thereof.
FIG. 10D is a side view thereof.
Figure 11:
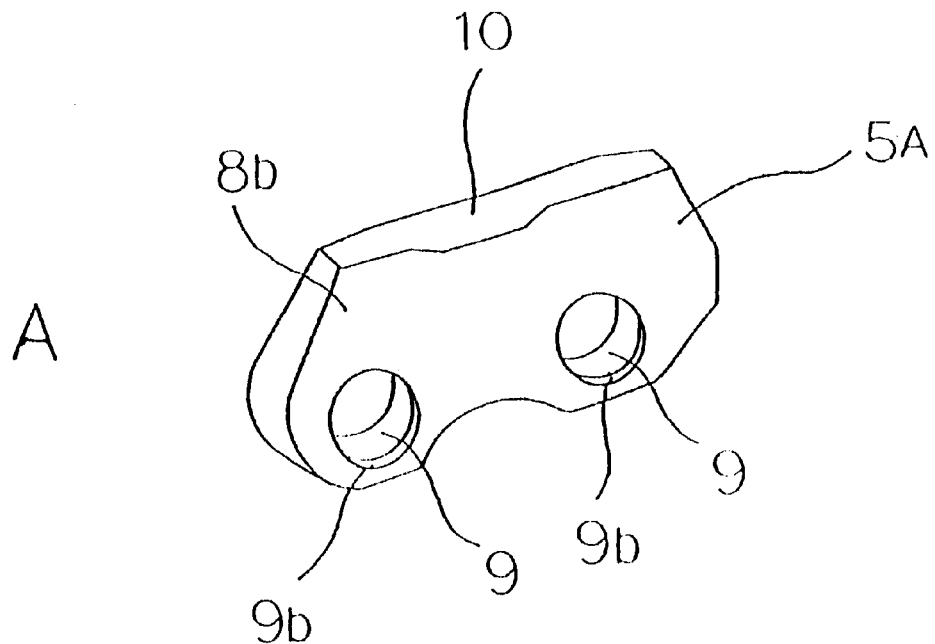
FIG. 11A is a perspective view showing the generally parallelepiped block of the 2nd example.
FIG. 11B is a perspective view showing a bar thereof.
Figure 11:
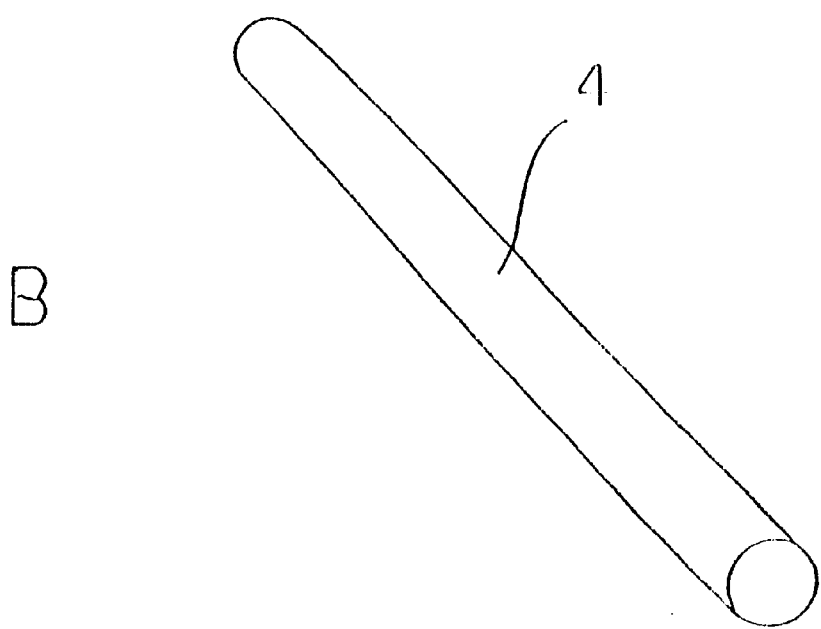
Figure 12:
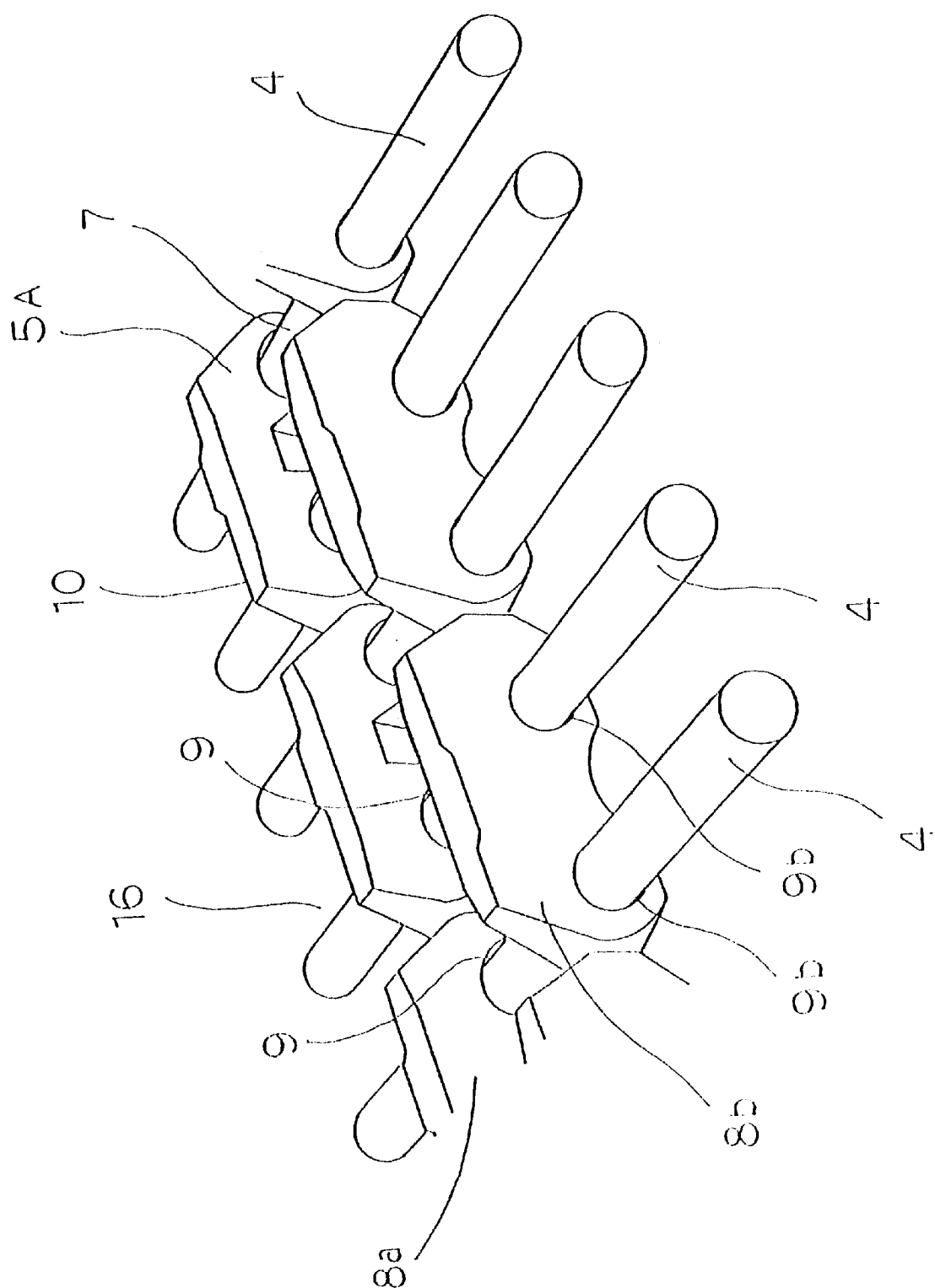
FIG. 12 is a combination view of the bar and the generally parallelepiped block of the 2nd example.
Figure 13:
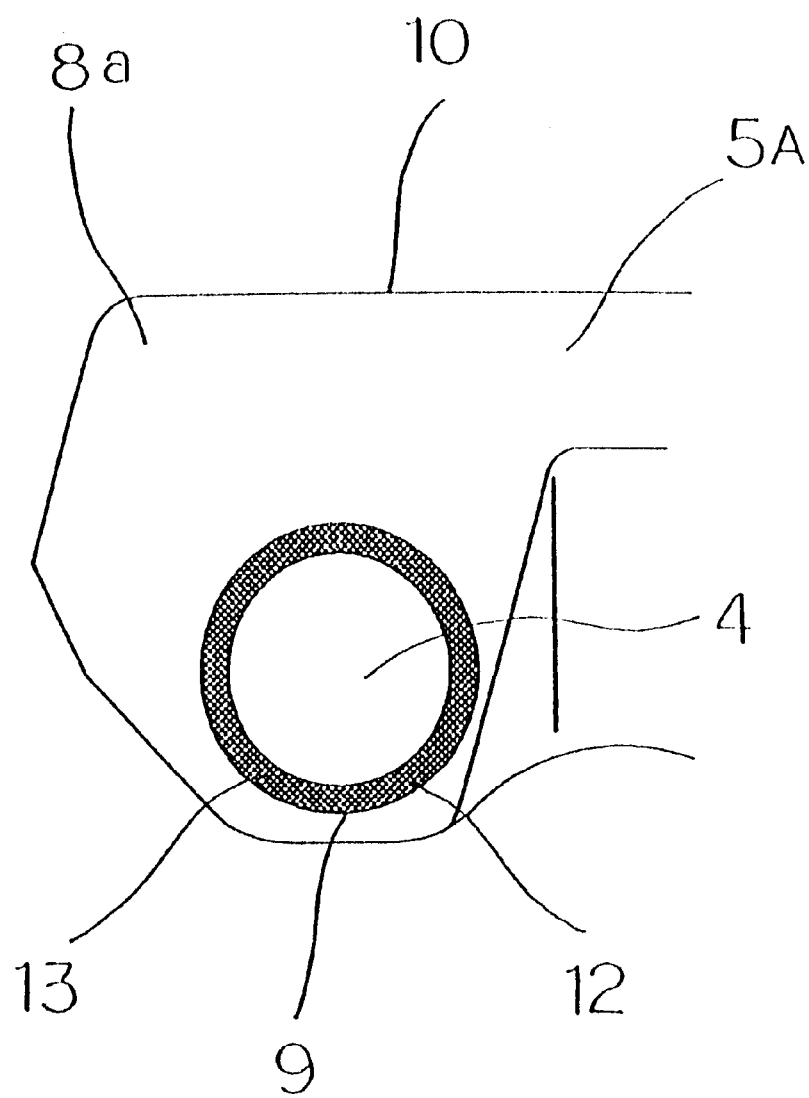
FIG. 13 is an assembly front view showing their combination state.
Figure 14:
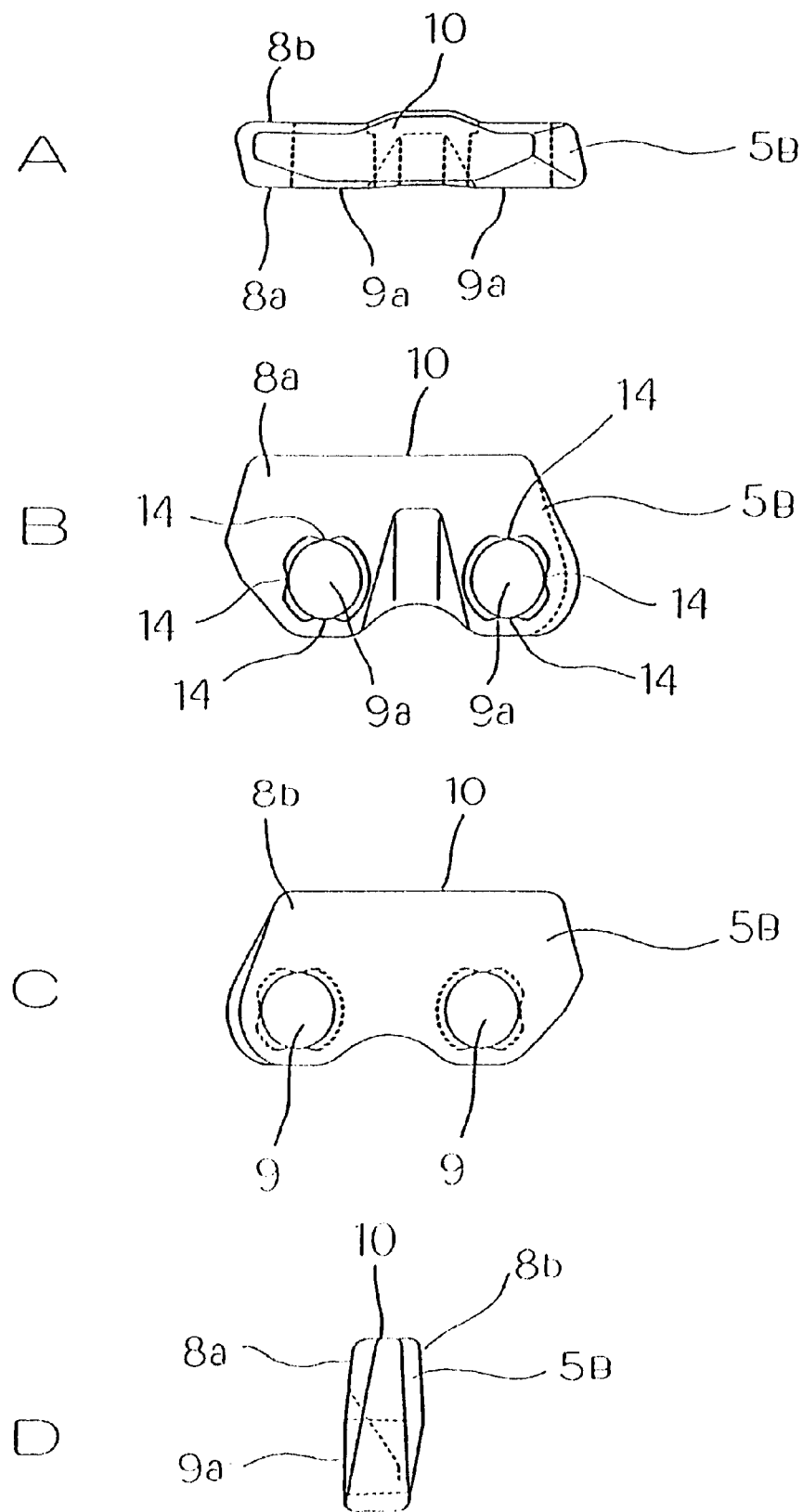
FIG. 14A is a plan view of a generally parallelepiped block of the 3rd example.
FIG. 14B is a front view thereof.
FIG. 14C is a back view thereof.
FIG. 14D is a side view thereof.
Figure 15:
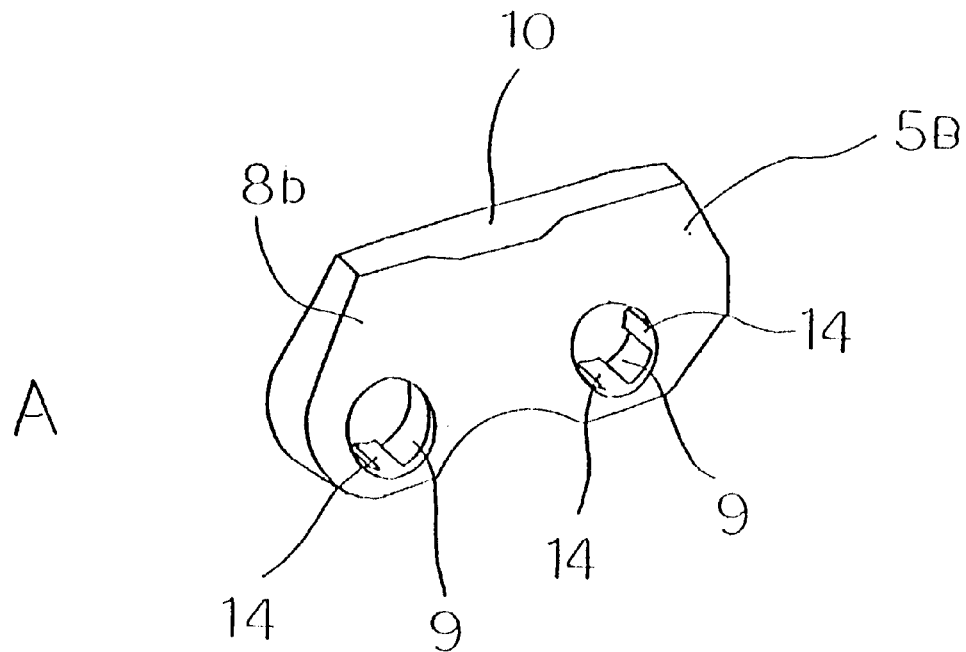
FIG. 15A is a perspective view showing the generally parallelepiped block of the 3rd example.
FIG. 15B is a perspective view showing a bar thereof.
Figure 15:
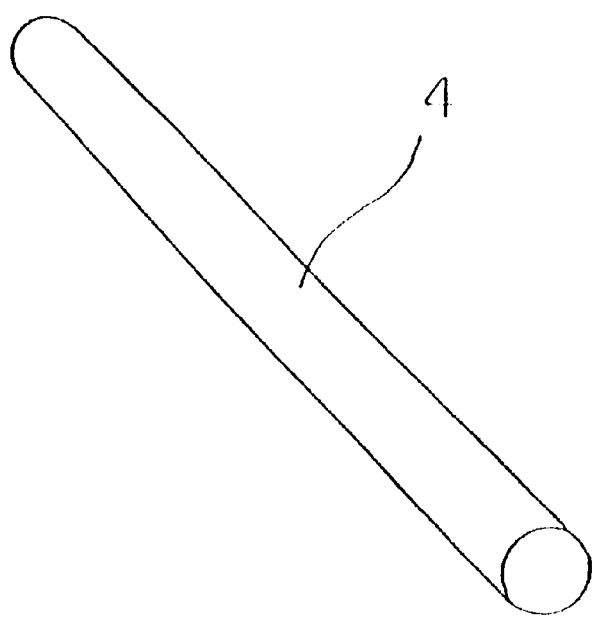
Figure 16:
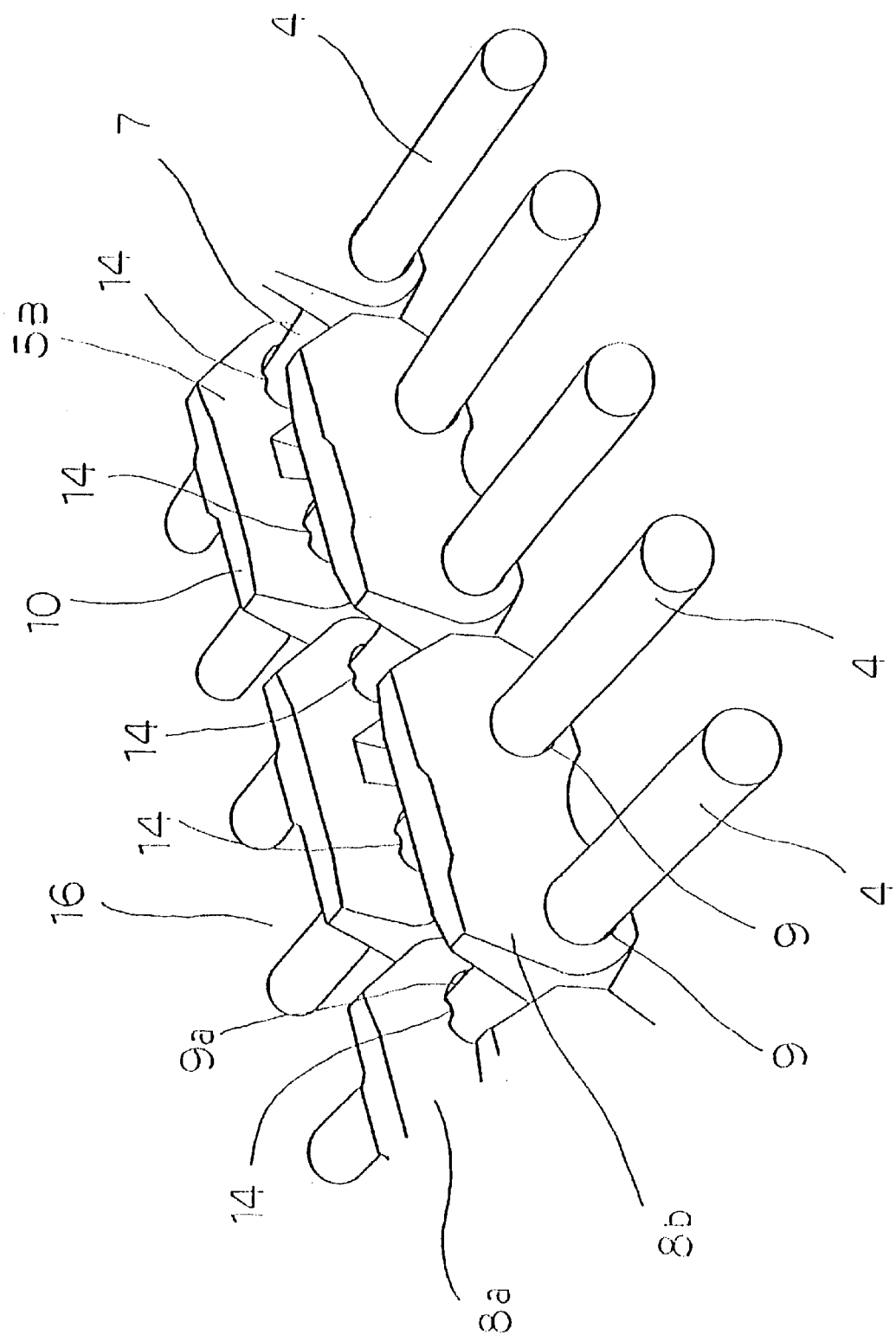
FIG. 16 is a combination view of the bar and the generally parallelepiped block of the 3rd example and FIG. 17 is an assembly front view showing their combination state.
Figure 17:
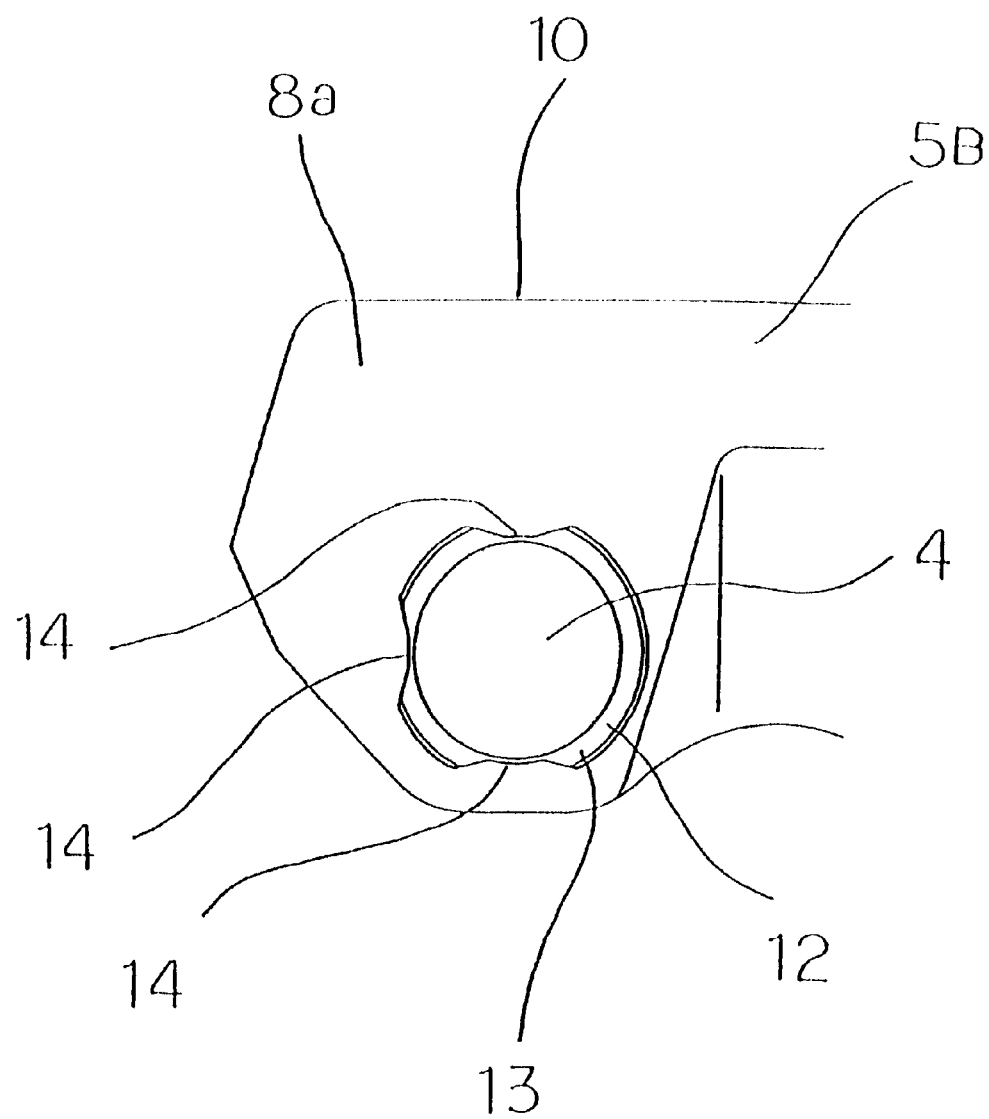
Figure 18:
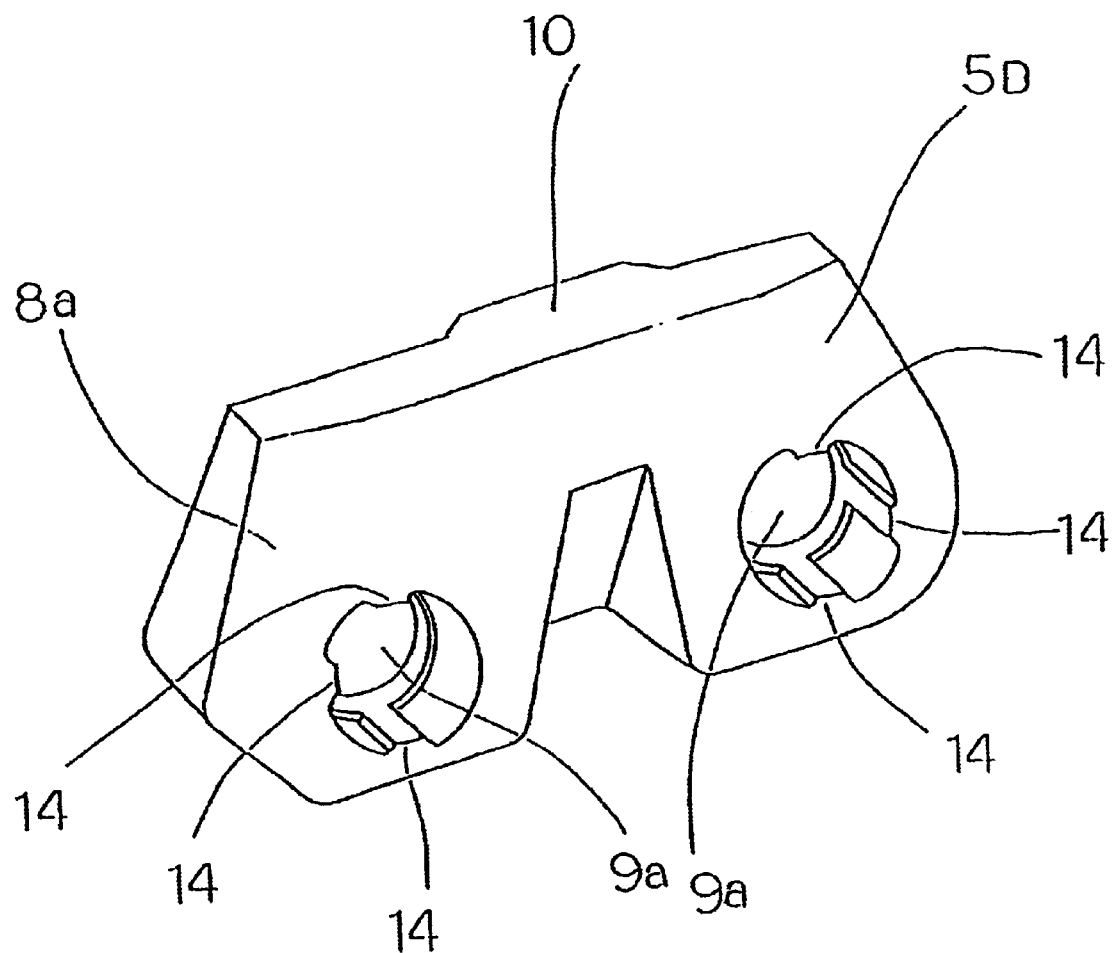
FIG. 18 is a perspective view of a generally parallelepiped block of the 3rd example.

FIGS. 10A to 10D, FIGS. 11A and 11B, FIG. 12 and FIG. 13 show the 2nd example of this invention. FIGS. 10A to 10D show a generally parallelepiped block 5A, FIG. 10A is a plan view, FIG. 10B is a front view, FIG. 10C is a back view, and FIG. 10D is a side view. FIGS. 11A and 11B are perspective views showing the generally parallelepiped block 5A and the bar 4, respectively. FIG. 12 is a combination view of the bar 4 and the generally parallelepiped block 5A. FIG. 13 is an assembly front view showing a combination state thereof.

The 2nd example has the composition of the 1st example. Besides, it narrows a gap 12 between a through hole 9b of a back face 8b of the generally parallelepiped block 5A (the outside in a crawler width direction) and the bar 4, thereby preventing the bar 4 swinging in the through hole 9 beyond a fixed level.

According to the composition of this example, it is easy to locate the bar 4 in the center of the through hole 9. Besides, the thickness of the rubber 13 filled in the gap 12 becomes almost uniform on the circumference of the bar 4, fatigue of the rubber 13 by twists of bar 4 and the generally parallelepiped block 5A becomes uniform, thereby preventing partial early destruction.

Next, the 3rd example of this invention is explained using FIGS. 14A to 14D, FIGS. 15A and 15B, FIG. 16, FIG. 17 and FIG. 18.

The 3rd example is characterized by forming protrusions 14, 14, and 14 to stop the bar 4 swinging in the through hole 9a of the front face 8a of the generally parallelepiped block 5B (the engaging hole side) in the composition of the 2nd example.

The protrusions 14 are provided at three positions in total which are the outside of the generally parallelepiped block 5B among top and bottom, right and left of the through hole 9a. The protrusions 14 prevent the bar 4 swinging beyond the fixed level in a vertical direction (a direction from the inner circumference to the outer circumference of the rubber crawler) and in an extending direction of the crawler circumferential direction.

According to the composition of this example, the bar 4 does not swing in the vertical direction and the extending direction beyond necessity, thereby causing few oscillations. Accordingly, it serves as a rubber crawler, which cannot carry out a crawler slip easily.

Figure 19:
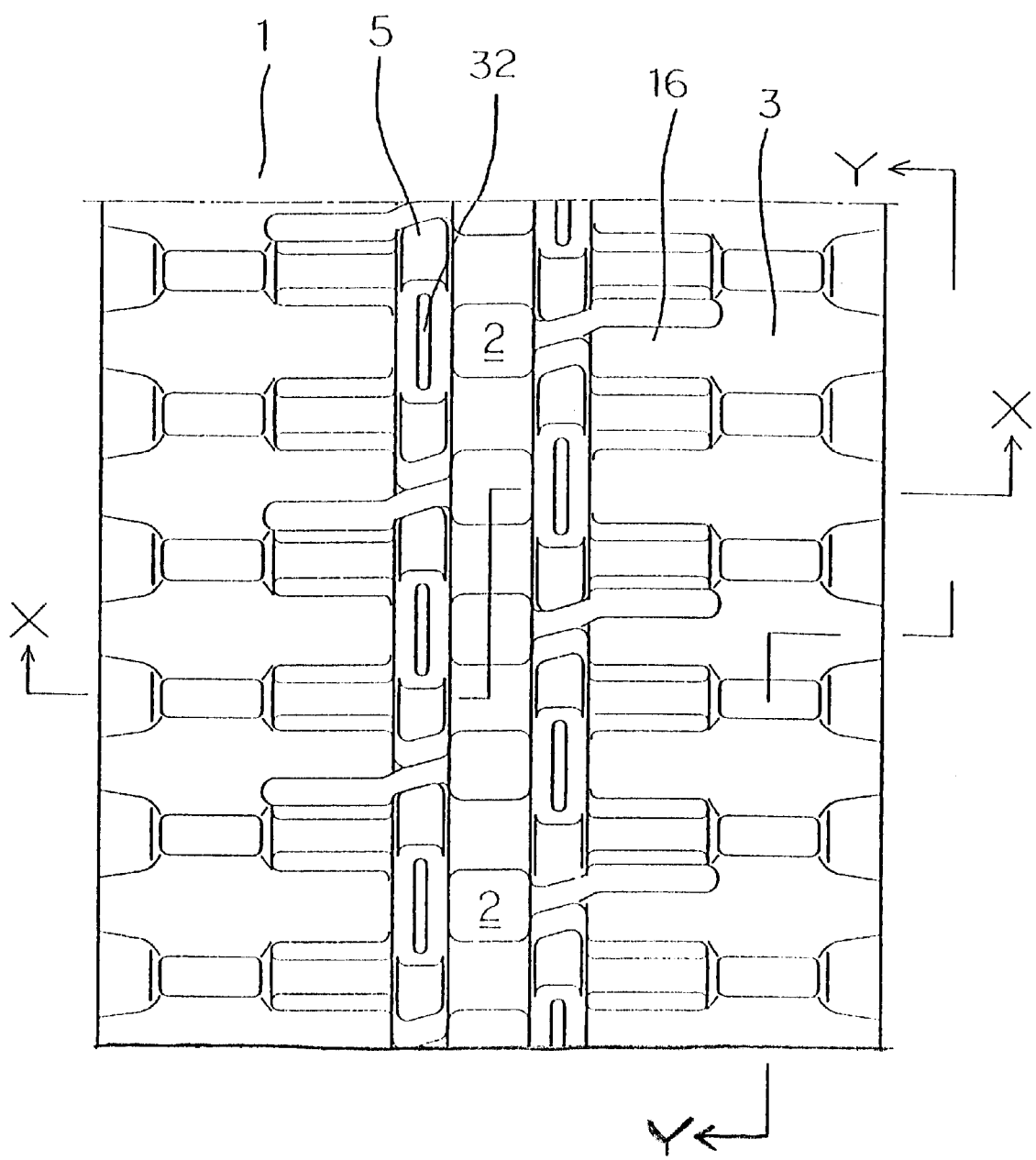
FIG. 19 is a plan view showing an inner circumference side of a rubber crawler of the 4th example.
Figure 20:
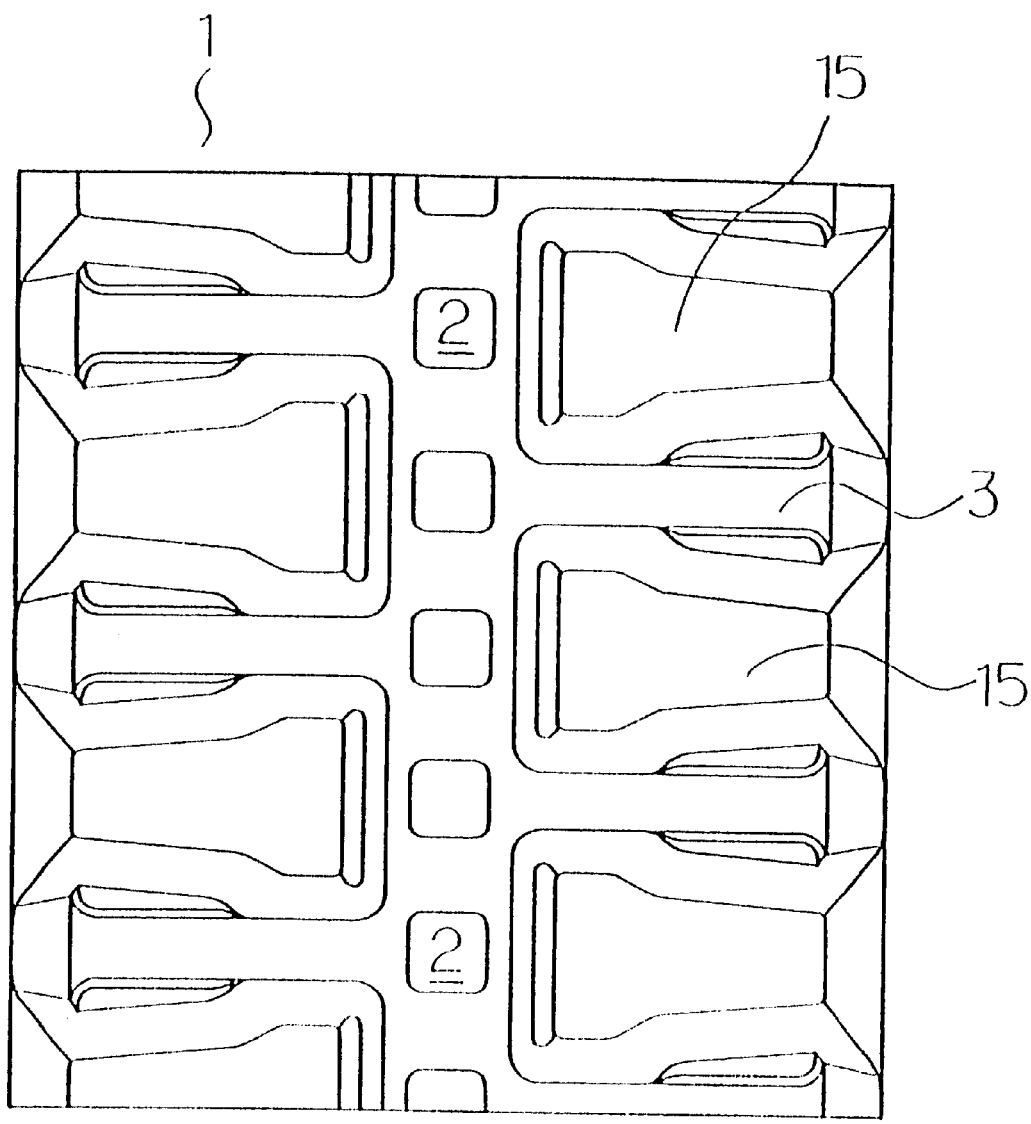
FIG. 20 is a plan view showing an outer circumference side thereof.
Figure 21:
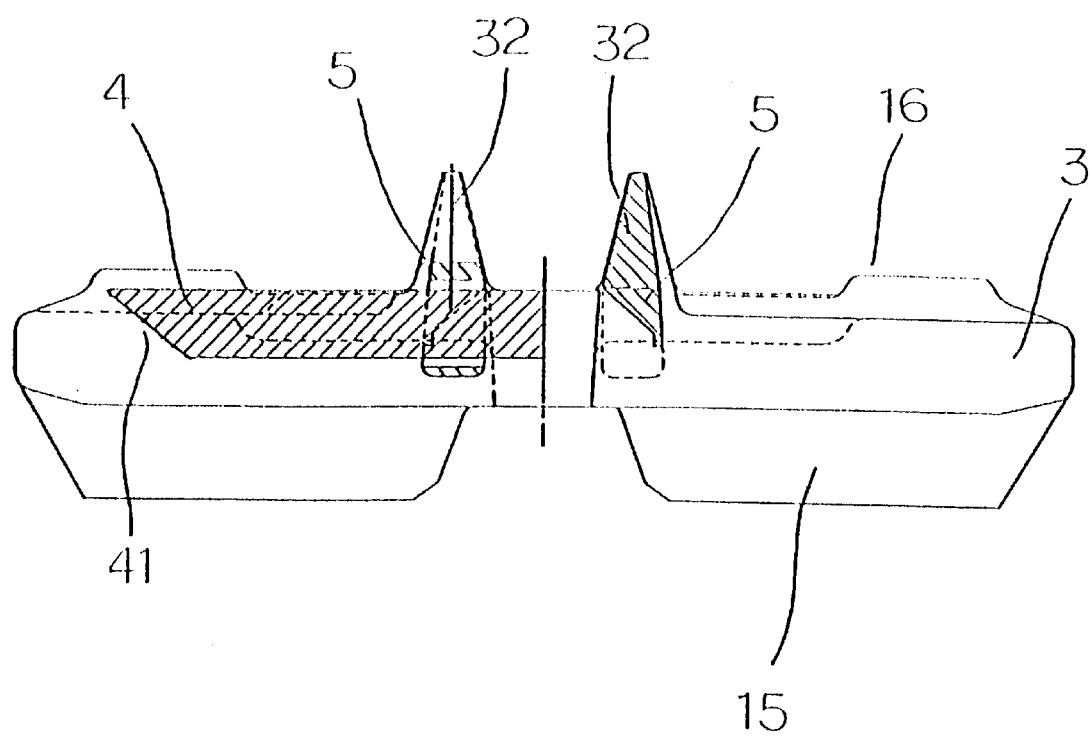
FIG. 21 is an X—X line sectional view in FIG. 19.
Figure 22:
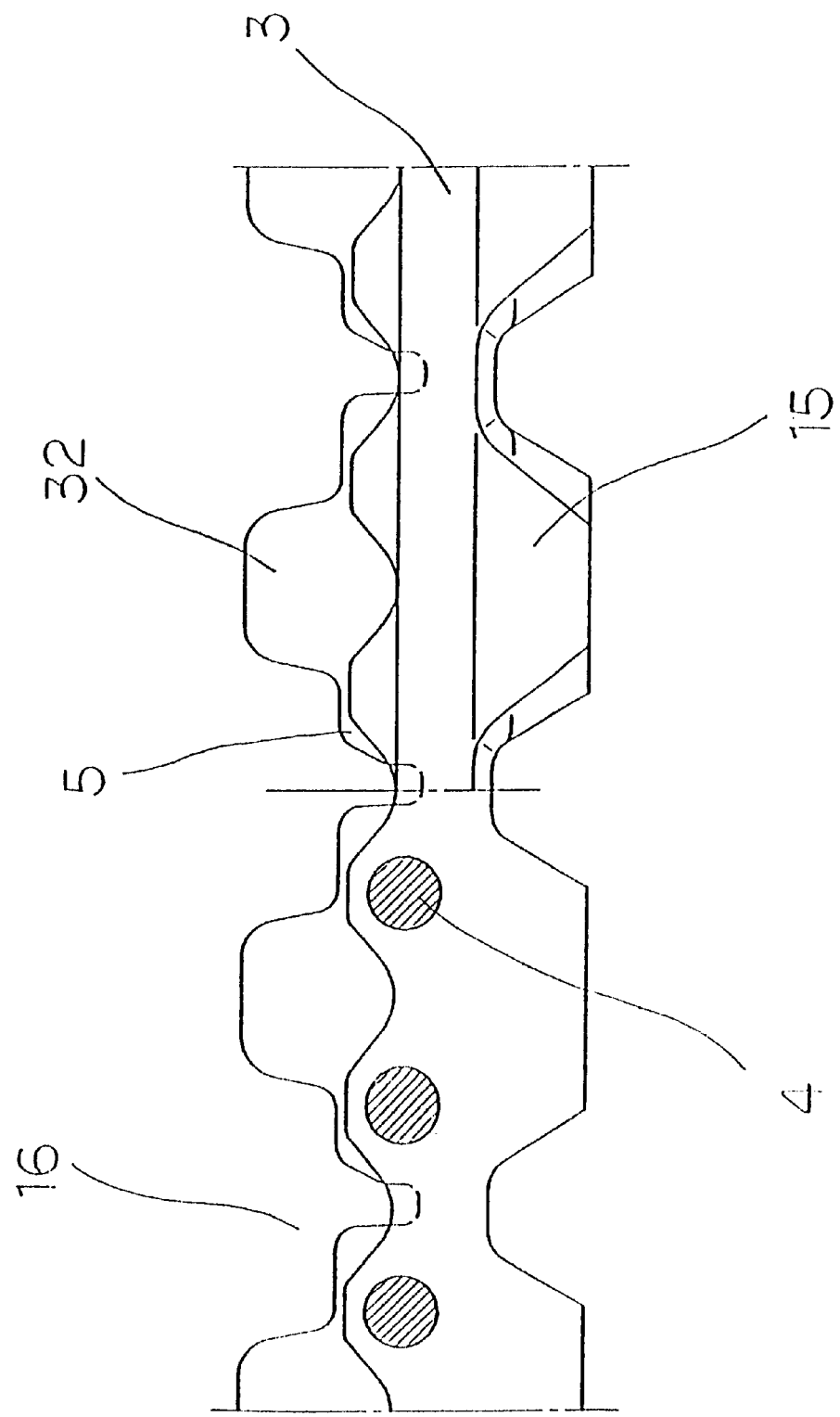
FIG. 22 is a Y—Y line sectional view in FIG. 19.

FIGS. 19 to 22 show the 4th example of this invention. FIG. 19 is a plan view showing an inner circumference side 16 of the rubber crawler. FIG. 20 is a plan view showing an outer circumference side of the rubber crawler. FIG. 21 is an X—X line sectional view in FIG. 19, and FIG. 21 is a Y—Y line sectional view in FIG. 19.

In the 4th example, the protrusion of the generally parallelepiped block 5 in the inner circumference side of the rubber crawler (anti-tread side) is formed as a protrusion 32 in a horn shape. This protrusion 32 serves as a slip-preventing guide of the rolling wheel or the idler wheel.

Moreover, in the 4th example, a slope 41 is provided to the tread, side of both ends of the bar 4 in its length direction. Accordingly, breakage (ear piece) of both ends of the rubber crawler in its width direction, which occurs when the rubber crawler runs aground to curbstones on a road surface etc., can be prevented, thereby increasing their durability.

FIGS. 23 to 26 and FIGS. 27A to 27D show the 5th example of this invention. The 5th example is characterized by providing wing parts 11a and 11b on the back face 8b of the generally parallelepiped block 5C, in other words, the outside of the rubber crawler in its width direction in a state where they are embedded in the rubber crawler body 3, in the composition of the 1st example.

Figure 23:
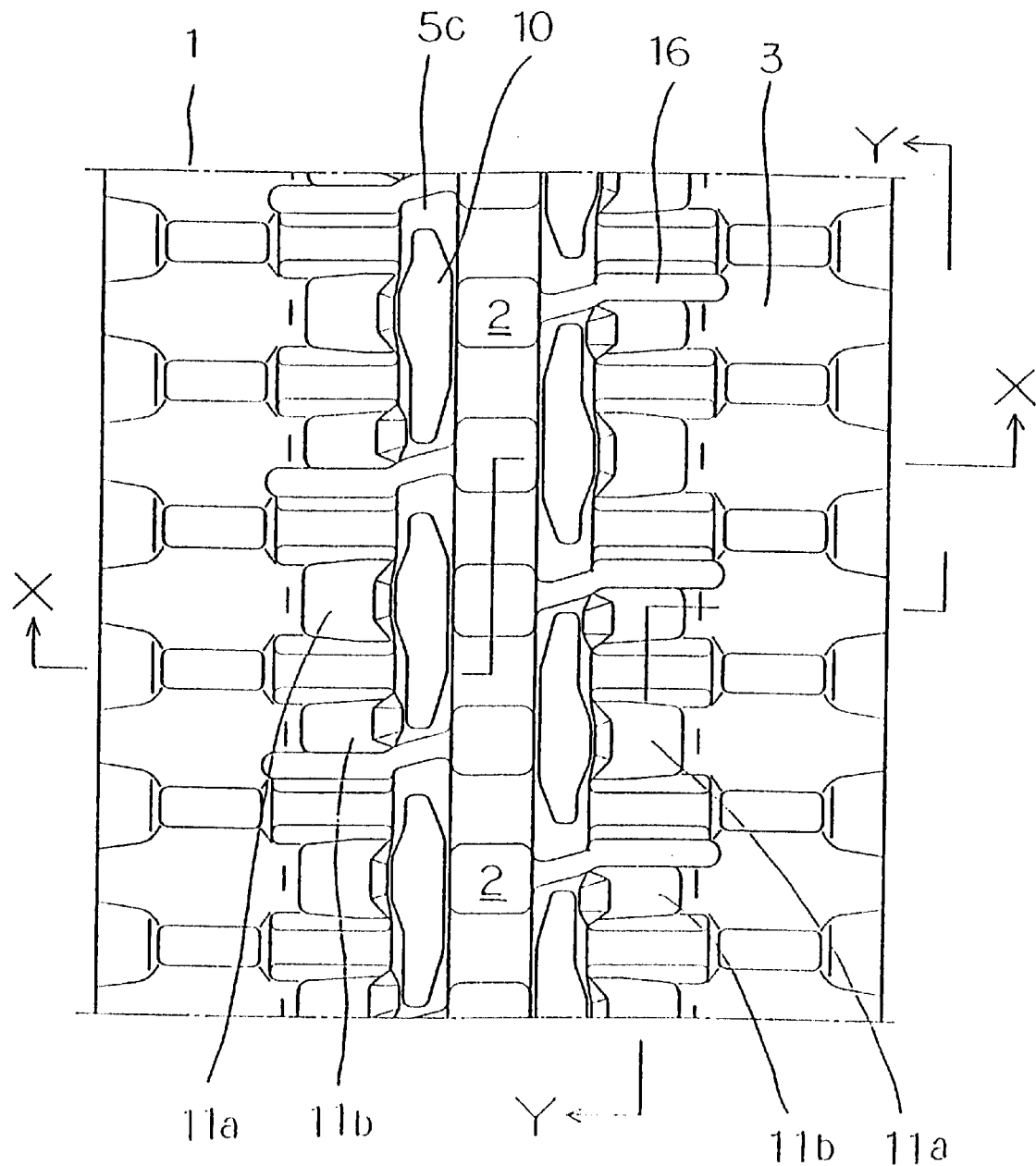
FIG. 23 is a plan view showing an inner circumference side of a rubber crawler of the 5th example.
Figure 24:
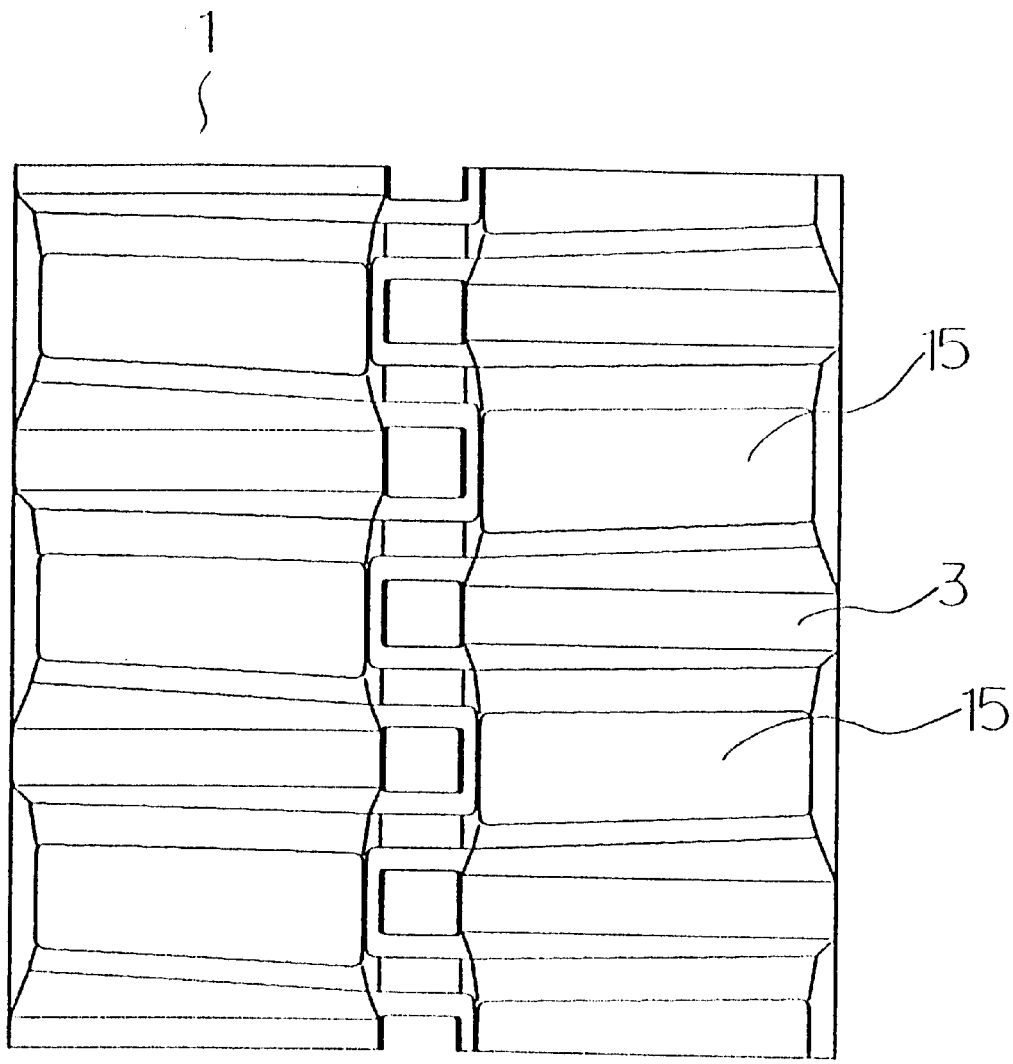
FIG. 24 is a plan view showing an outer circumference side thereof.
Figure 25:
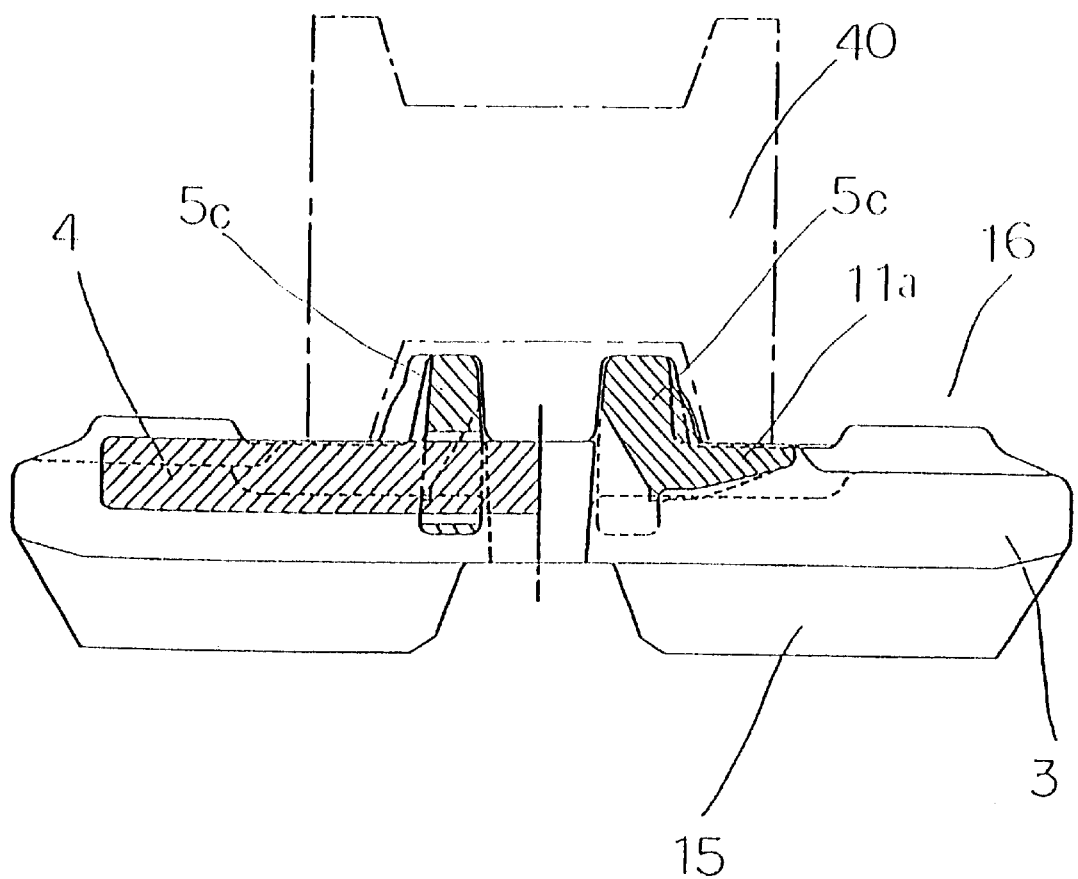
FIG. 25 is an X—X line sectional view in FIG. 23.
Figure 26:
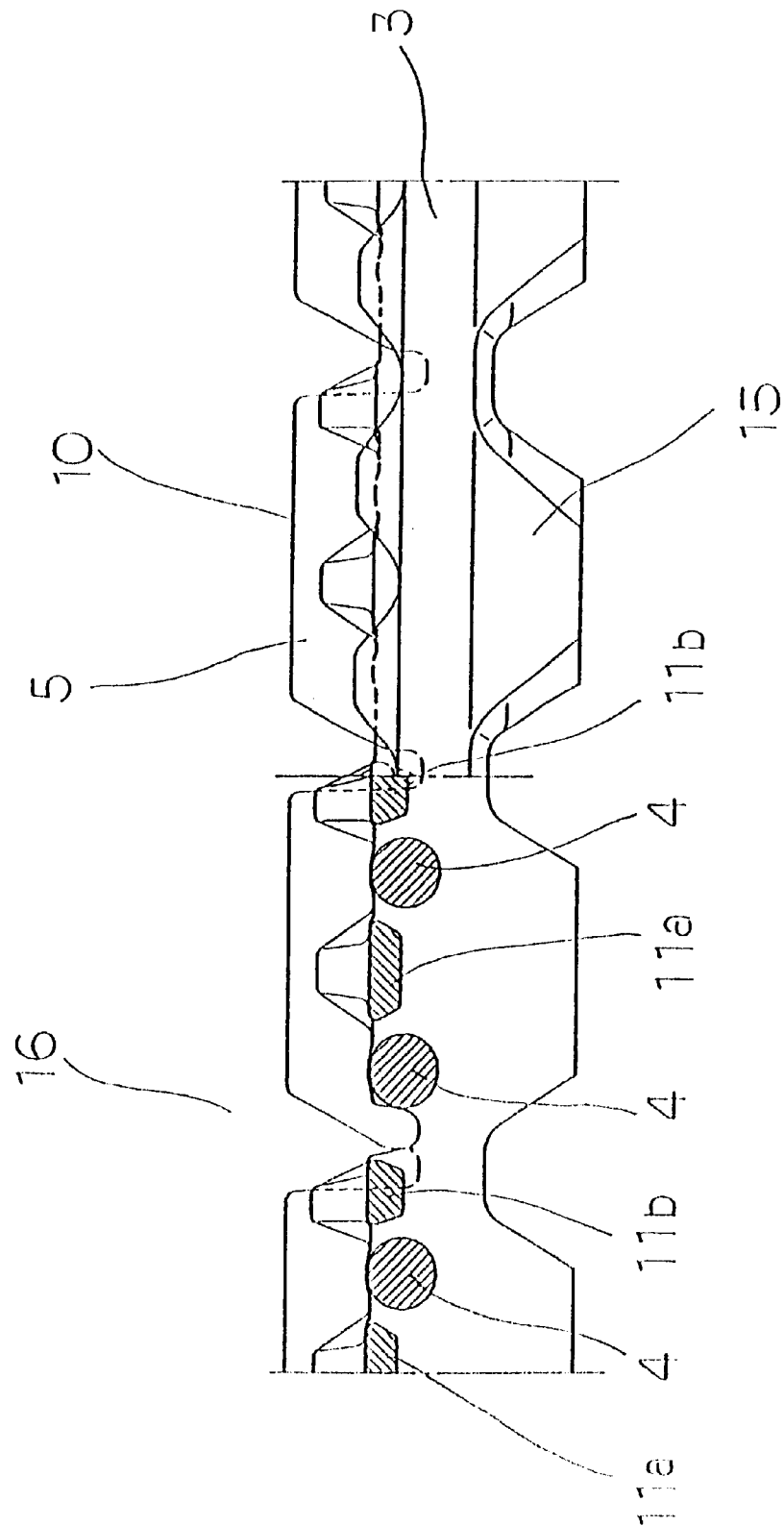
FIG. 26 is a Y—Y line sectional in FIG. 23.
Figure 27:
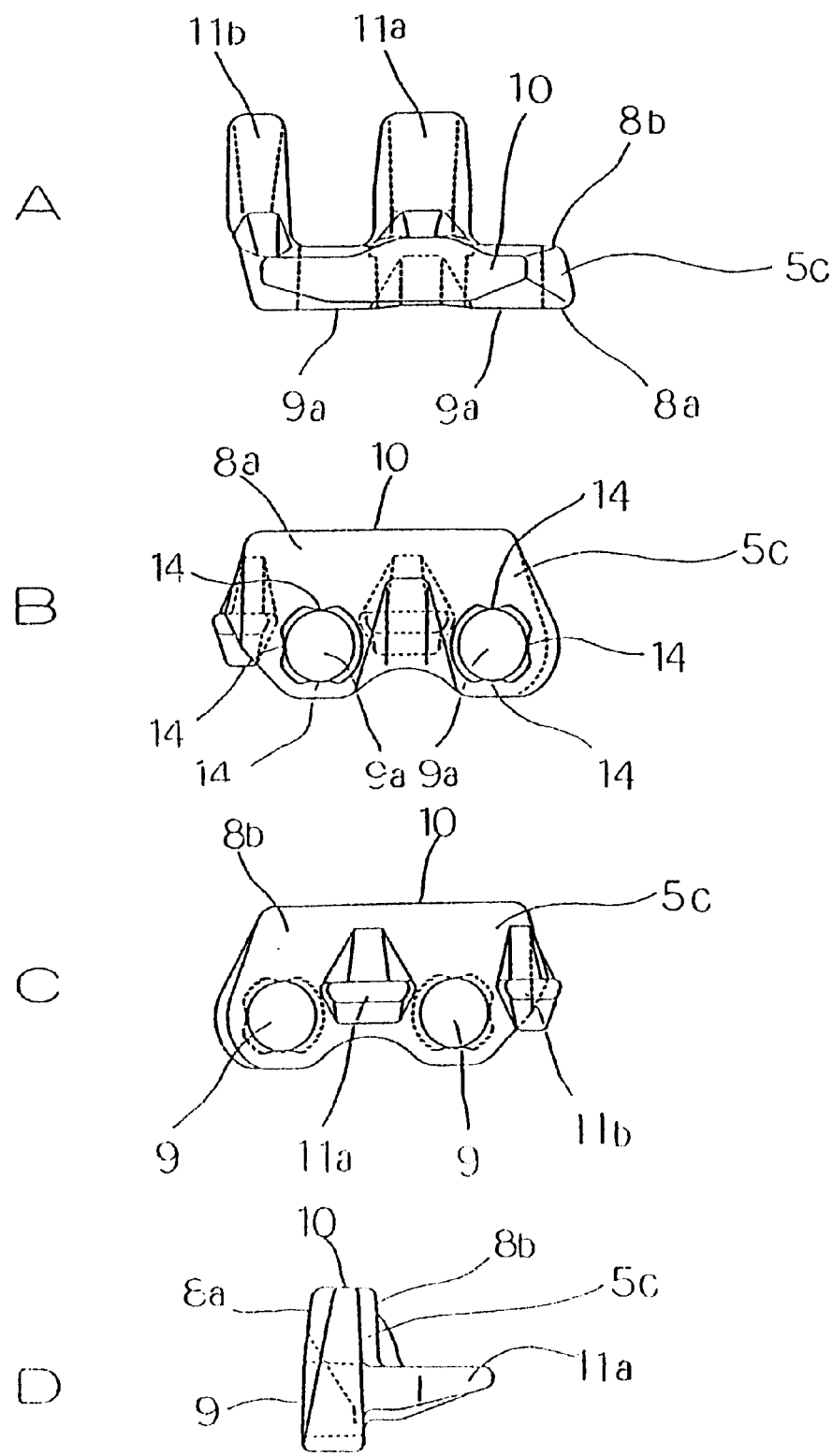
FIG. 27A is a plan view of a generally parallelepiped block of the 5th example.
FIG. 27B is a front view thereof.
FIG. 27C is a back view thereof.
FIG. 27D is a side view thereof.

FIG. 23 is a plan view showing the inner circumference side 16 (anti-tread side) of the rubber crawler of this example. FIG. 24 is a plan view showing the tread side of the rubber crawler. FIG. 25 is an X—X line sectional view in FIG. 23, and FIG. 26 is a Y—Y line sectional view in FIG. 23. FIG. 27 shows the generally parallelepiped block 5C of this example. FIG. 27A is a plan view, FIG. 27B is a front view, FIG. 27C is a back view, and FIG. 27D is a side view.

The wing parts 11a, 11b are provided to the back face 8b of the generally parallelepiped block 5C (the outside of the crawler width direction) of this example, connected with adjacent bars 4, 4 in the crawler circumferential direction, and embedded in the rubber crawler body 3. The wing parts 11a, 11b are located between the bar 4 and the bar 4, respectively, and an outer rolling wheel 40 prevents the rolling wheel falling in between the bar 4 and the bar 4 during the rolling wheel running, thereby enabling a smooth running.

Figure 28:
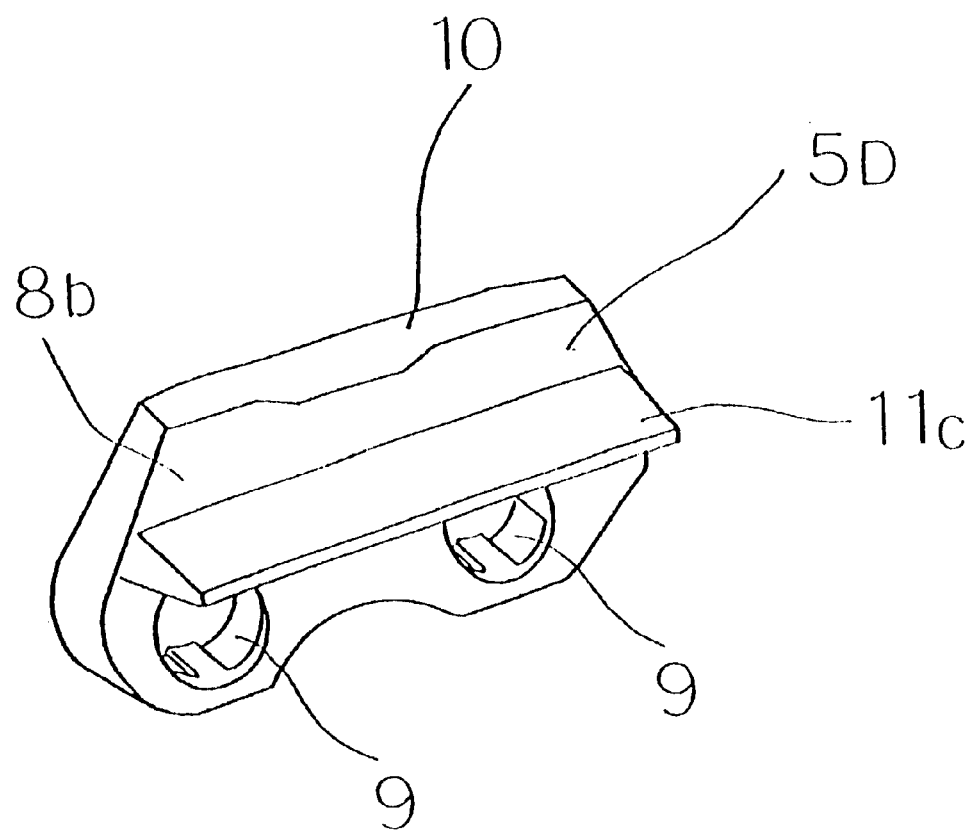
FIG. 28 is a perspective view showing the generally parallelepiped block of the 6th example.

FIG. 28 shows the 6th example of this invention. In the 6th example, the wing parts 11a, 11b of the generally parallelepiped block 5C in the 5th example are made into one wing part 11c, extended in the crawler circumferential direction.

The wing part 11c of the generally parallelepiped block 5D is exposed to the inner circumference side of the rubber crawler, or covered with rubber to a degree of burr. It serves as a rolling contact surface of the outer wheel 40, which the rolling wheel travels on.

Figure 29:
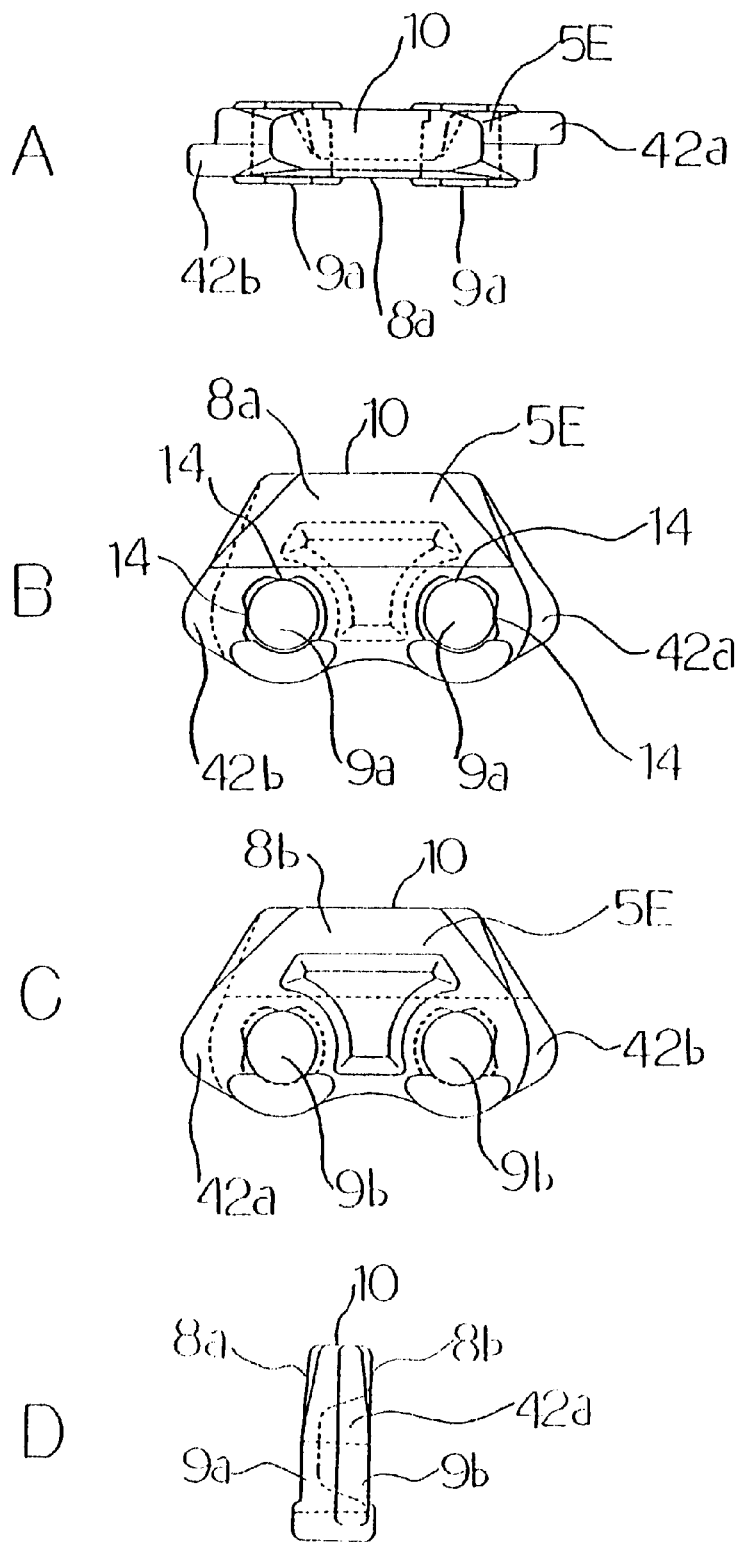
FIG. 29A is a plan view of a generally parallelepiped block of the 7th example.
FIG. 29B is a front view thereof.
FIG. 29C is a back view thereof.
FIG. 29D is a side view thereof.
Figure 30:
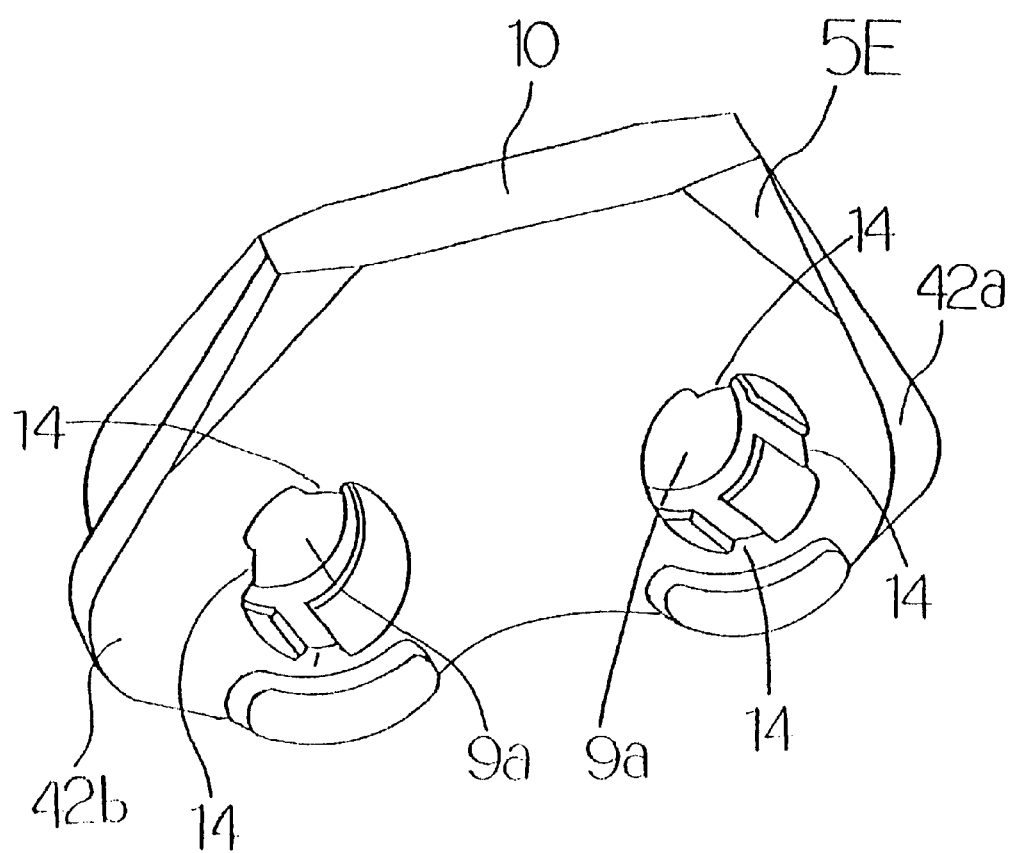
FIG. 30 is a perspective view showing the generally parallelepiped block of the 7th example.
Figure 31:
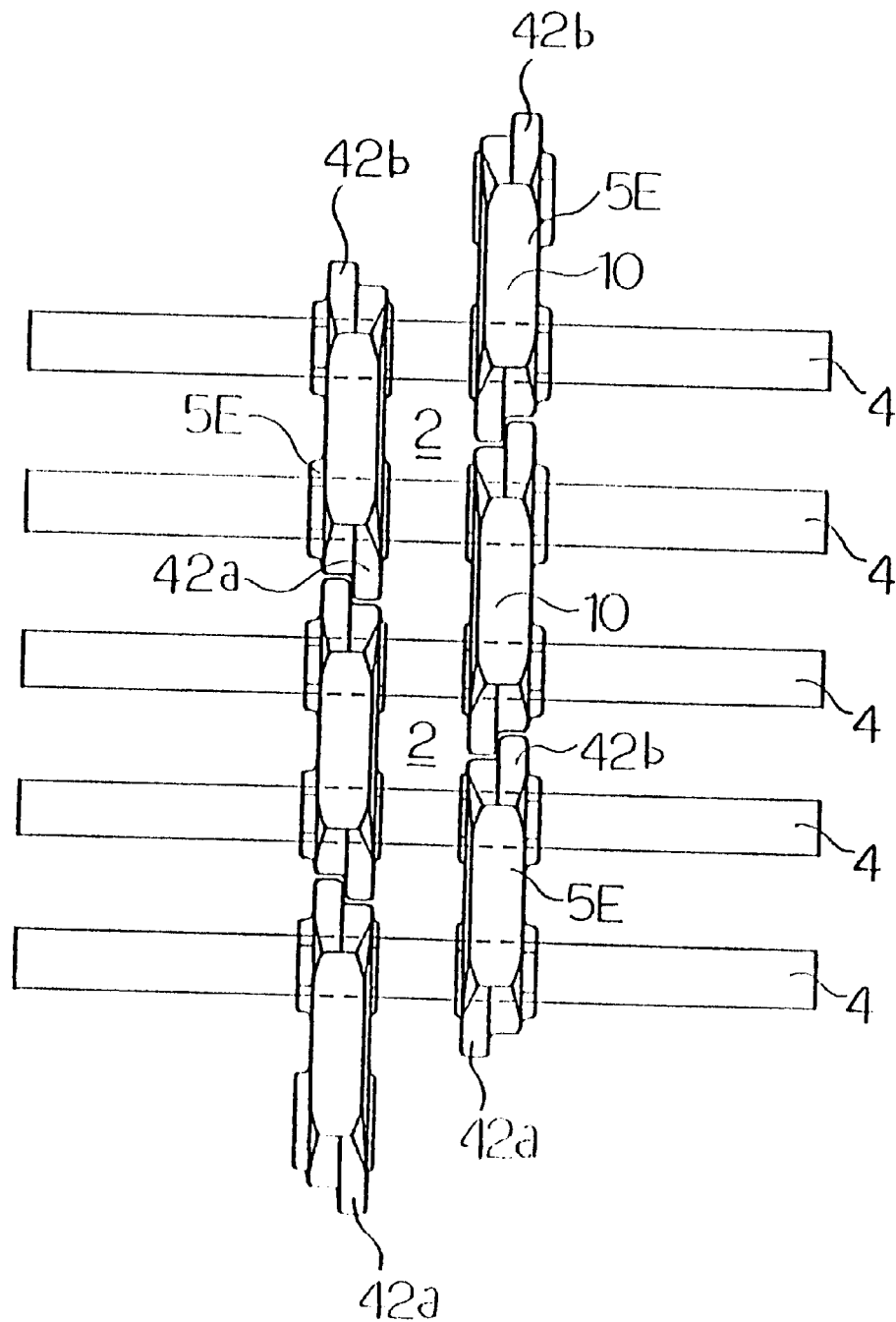
FIG. 31 is a plan view showing a combination state of the generally parallelepiped block and the bar in the 7th example.

FIGS. 29 to 31 show the 7th example of this invention. In the 7th example, a lateral shift control part 42 is provided to both ends of a generally parallelepiped block 5E in its length direction.

The lateral shift control part 42 comprises a lateral shift control part 42a provided at one end of the generally parallelepiped block 5E in its length direction, and a lateral shift control part 42b provided at the other end thereof The lateral shift control parts 42*a*, 42*b* of adjacent generally parallelepiped blocks in the crawler circumferential direction are overlapped in view of the crawler circumferential direction respectively, thereby preventing the rubber crawler slipping and derailing from a travel gear.

Figure 32:
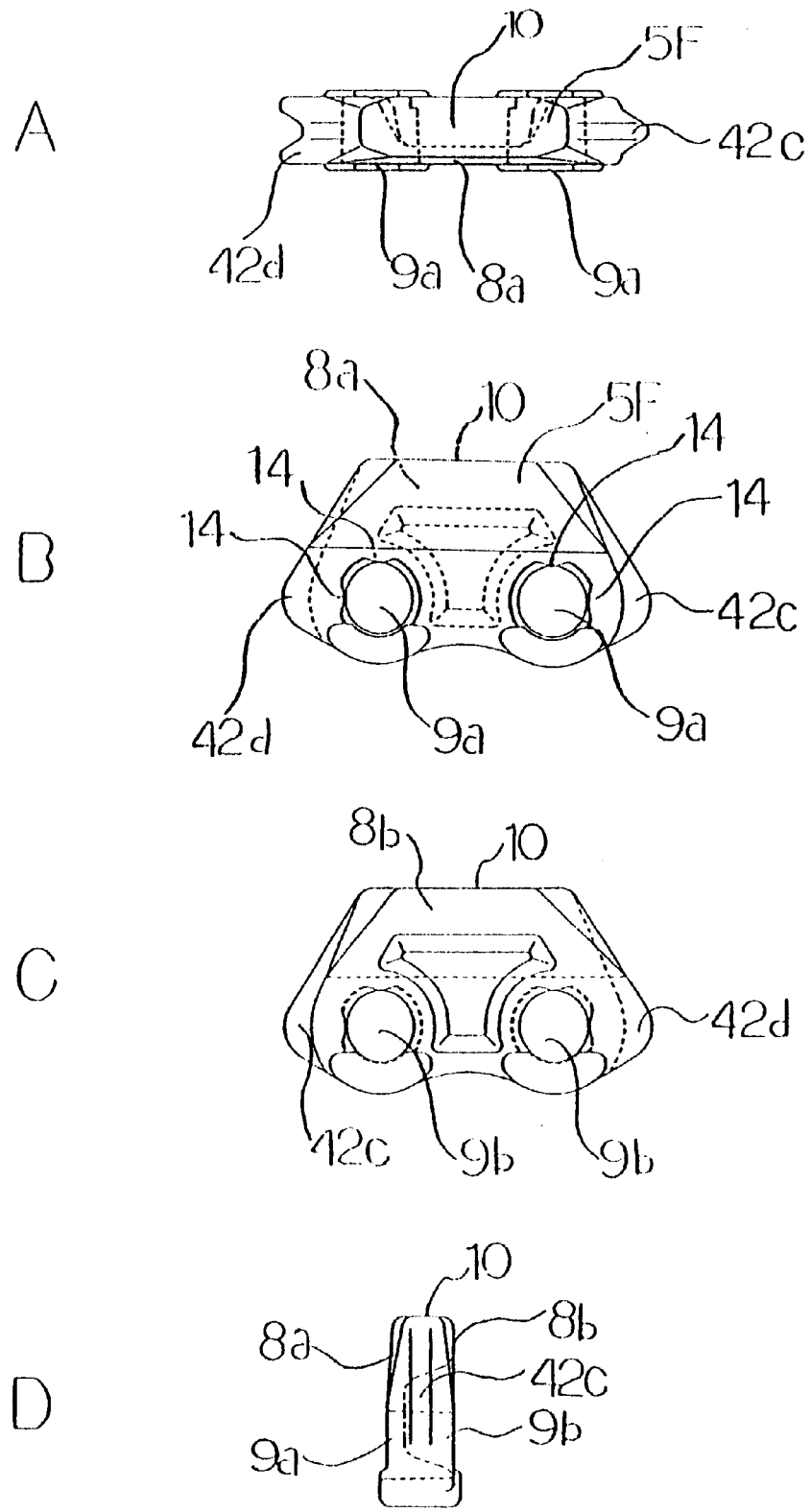
FIG. 32A is a plan view of a generally parallelepiped block of another 7th example.
FIG. 32B is a front view thereof.
FIG. 32C is a back view thereof.
FIG. 32D is a side view thereof.

FIG. 32 shows another embodiment of the 7th example of this invention. In this embodiment, a convex lateral shift control part 42*c* is provided at one end of a generally parallelepiped block 5F in its length direction, and a convex lateral shift control part 42*d* is provided at the other end thereof. These lateral shift control parts 42*c*, 42*d* of adjacent generally parallelepiped blocks in the crawler circumferential direction are overlapped nestedly in view of the rubber crawler circumferential direction, thereby preventing the rubber crawler twisting as well as slipping. Accordingly, the rubber crawler is prevented derailing more effectively.

FIGS. 33 to 35, FIG. 36A and FIG. 36B show the 8th example of this invention. The 8th example is characterized by providing a bush 24 to a sprocket engaging part 7 of the bar 4 in the composition of the 1st example.

Figure 33:
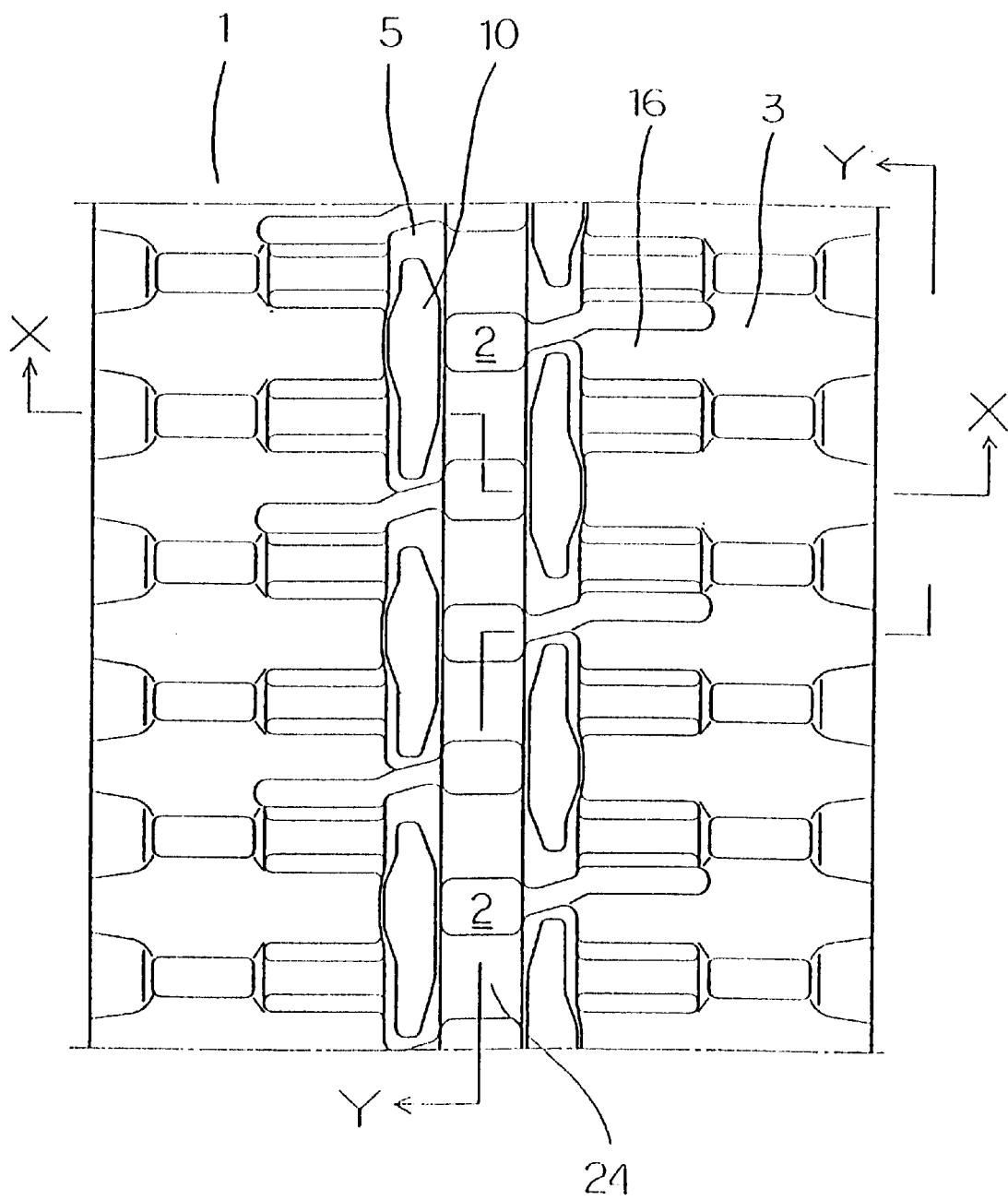
FIG. 33 is a plan view showing an inner circumference side of a rubber crawler of the 8th example.
Figure 34:
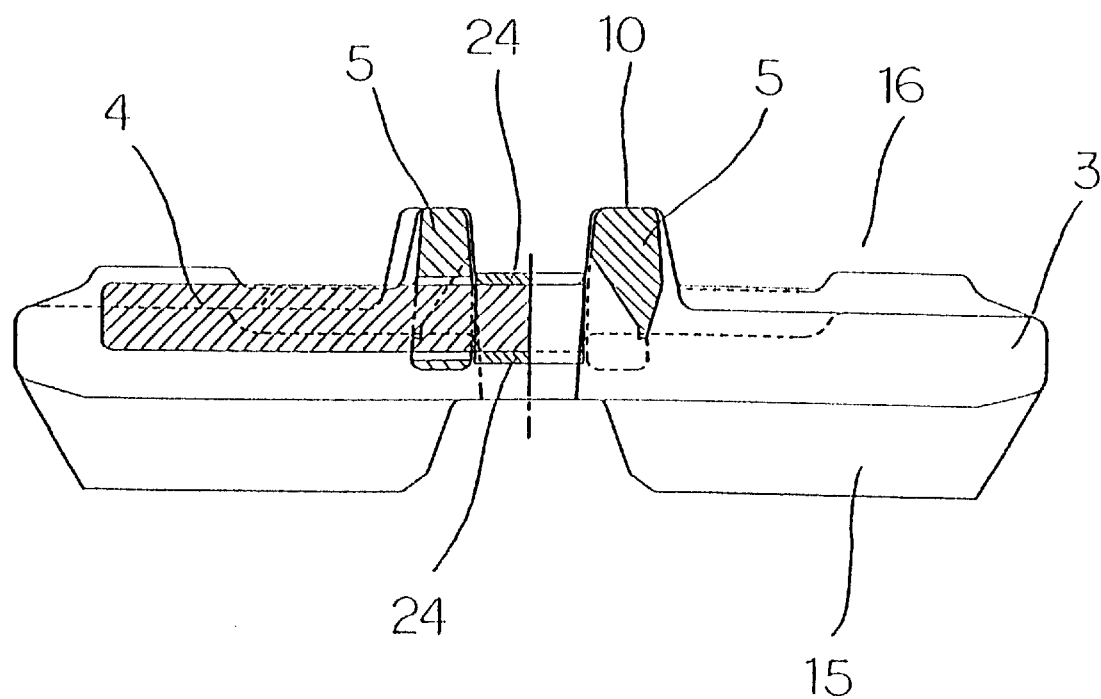
FIG. 34 is an X—X line sectional view therein.
Figure 35:
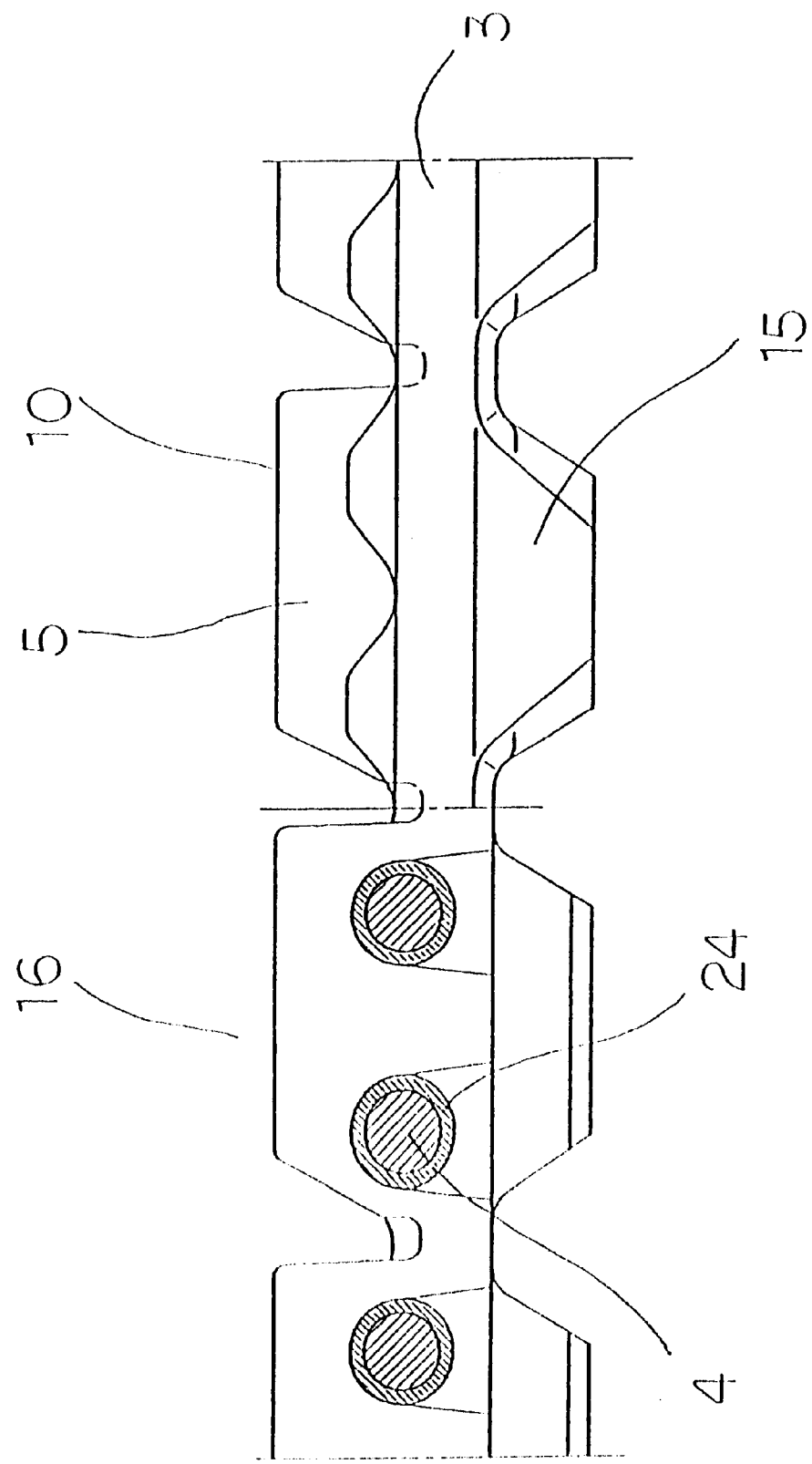
FIG. 35 is a Y—Y line sectional view therein.
Figure 36:
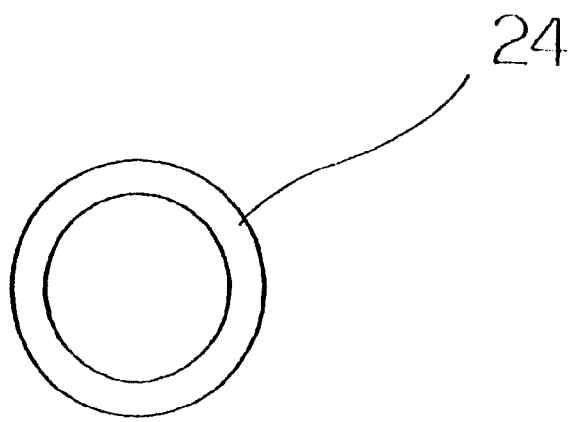
FIG. 36A is a front view of a bush of the 8th example.
FIG. 36B is a side view thereof.
Figure 36:
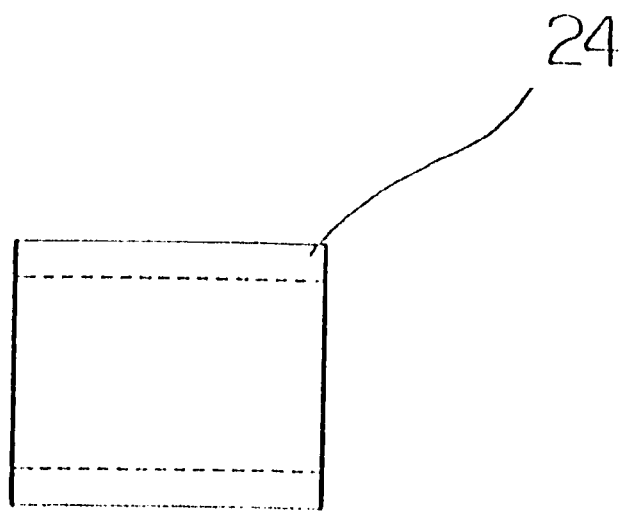

FIG. 33 is a plan view showing the inner circumference side 16 (anti-tread side) of the rubber crawler in this example. FIG. 34 is an X—X line sectional view in FIG. 33, and FIG. 35 is a Y—Y line sectional view in FIG. 33. FIG. 36A is a front view of the bush 24, and FIG. 36B is a side view of the bush 24.

The rubber crawler of this example can respond to various sprockets by changing size and form of the bush 24, without changing size of the bar 4. When using a wear-resistant bush 24, a durable rubber crawler can be obtained.

This example is not limited to the composition of the 1st example, but can be arbitrarily applied to other examples.

Figure 37:
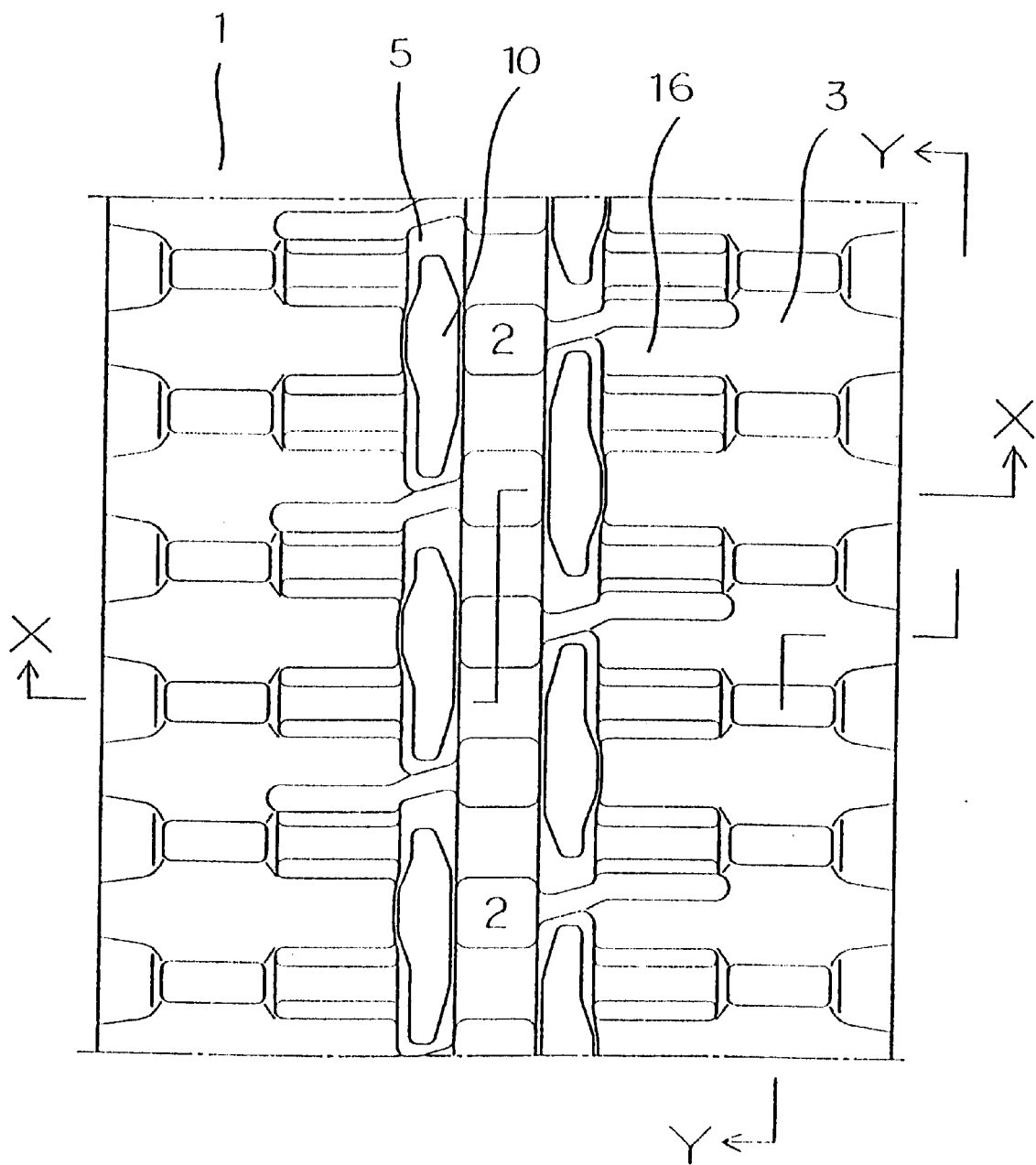
FIG. 37 is a plan view showing an inner circumference side of a rubber crawler of the 9th example.
Figure 38:
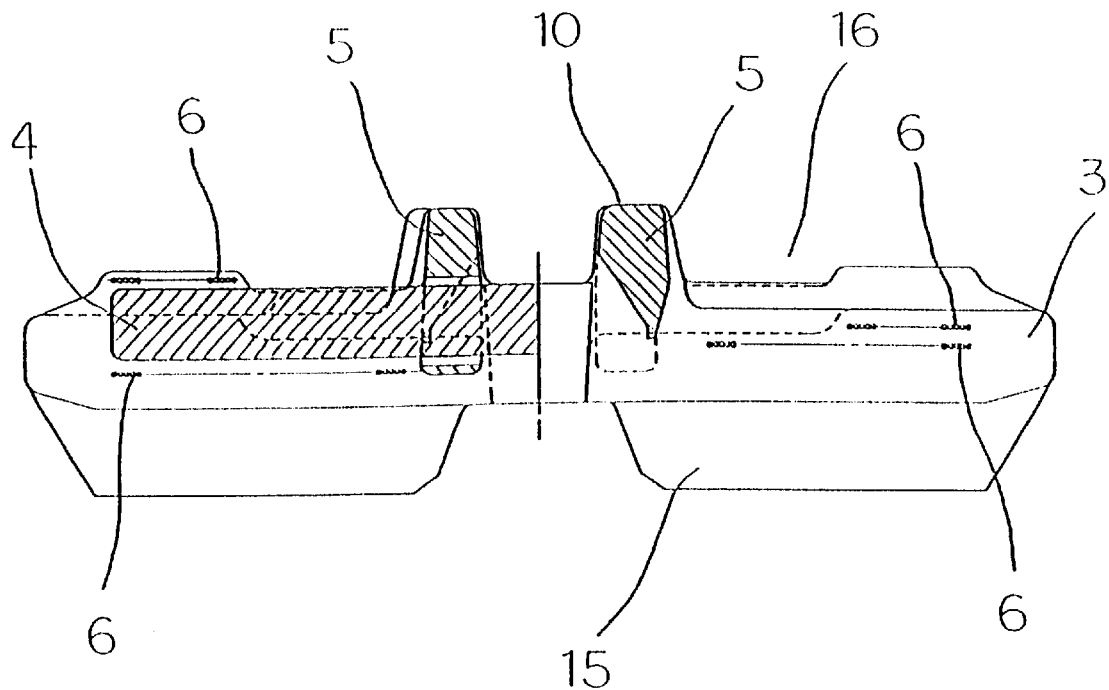
FIG. 38 is an X—X line sectional view therein.
Figure 39:
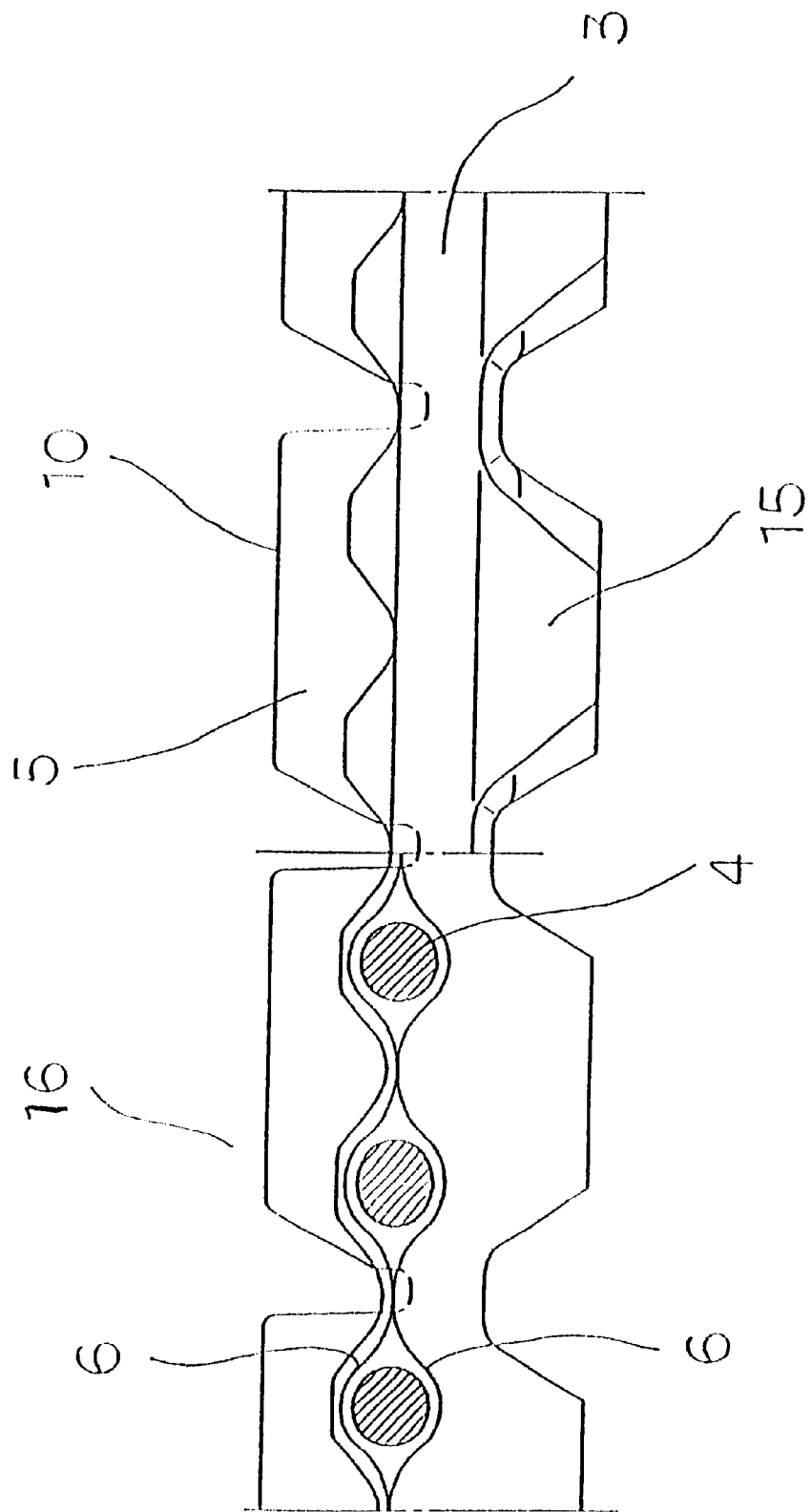
FIG. 39 is a Y—Y line sectional view therein.

FIGS. 37 to 39 show the 9th example of this invention. FIG. 37 is a plan view of an inner circumference of the 9th example. FIG. 38 is an X—X line sectional view in FIG. 37, and FIG. 39. is a Y—Y line sectional view in FIG. 37.

The 9th example is characterized by embedding a reinforcing layer 6 in the rubber crawler body 3 in all its circumference at both the outer circumference side (tread side) and the inner circumference side 16 of the bar 4 to the crawler width direction, in the composition of the 1st example. Here, the reinforcing layer 6 is distributed to both sides in the crawler width direction.

As shown in FIG. 39, the reinforcing layer 6 is made to meander (is made to wave) on inclining towards the center of the thickness of the rubber crawler between the bar 4 and the bar 4. The reinforcing layer 6 is embedded along the surface of the bar 4, and is pasted up on rubber of the rubber crawler body 3.

The rubber crawler of this example can uniformly distribute the driving force conveyed to the bar 4 and transmit the force to a lug 15 by having the reinforcing layer 6 embedded therein. Accordingly, positive traction is obtained. In addition, the local stress around the bar 4 is eased, thereby improving durability of the rubber crawler.

In this case, the reinforcing layer 6 may be embedded in either one of the outer circumference or the inner circumference.

Besides, this example is not limited to the composition of the 1st example, but can be arbitrarily applied to other examples.

Figure 40:
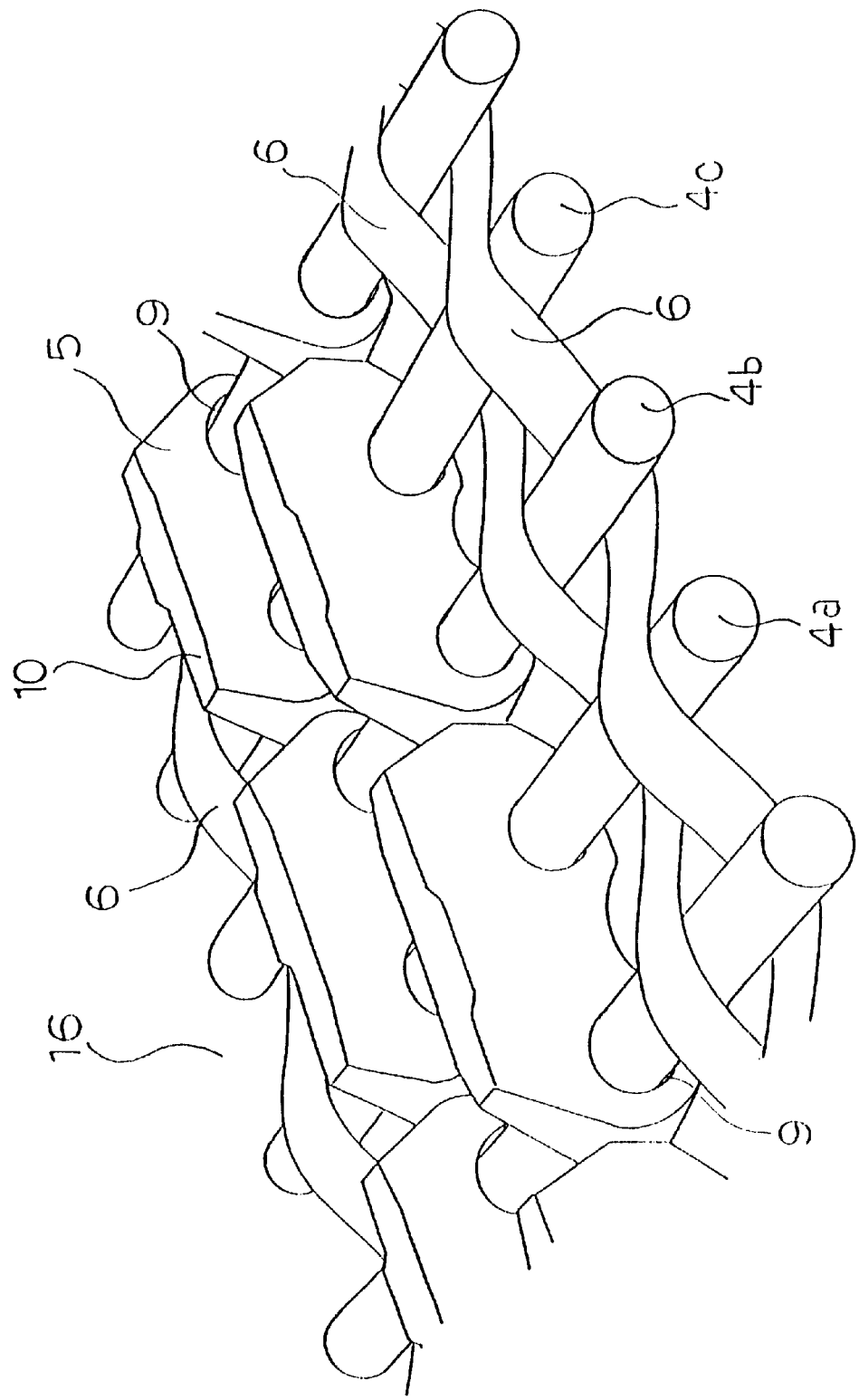
FIG. 40 is a combination perspective view showing an arrangement relation of a reinforcing layer and a bar of another embodiment 1 of the 9th example.
Figure 41:
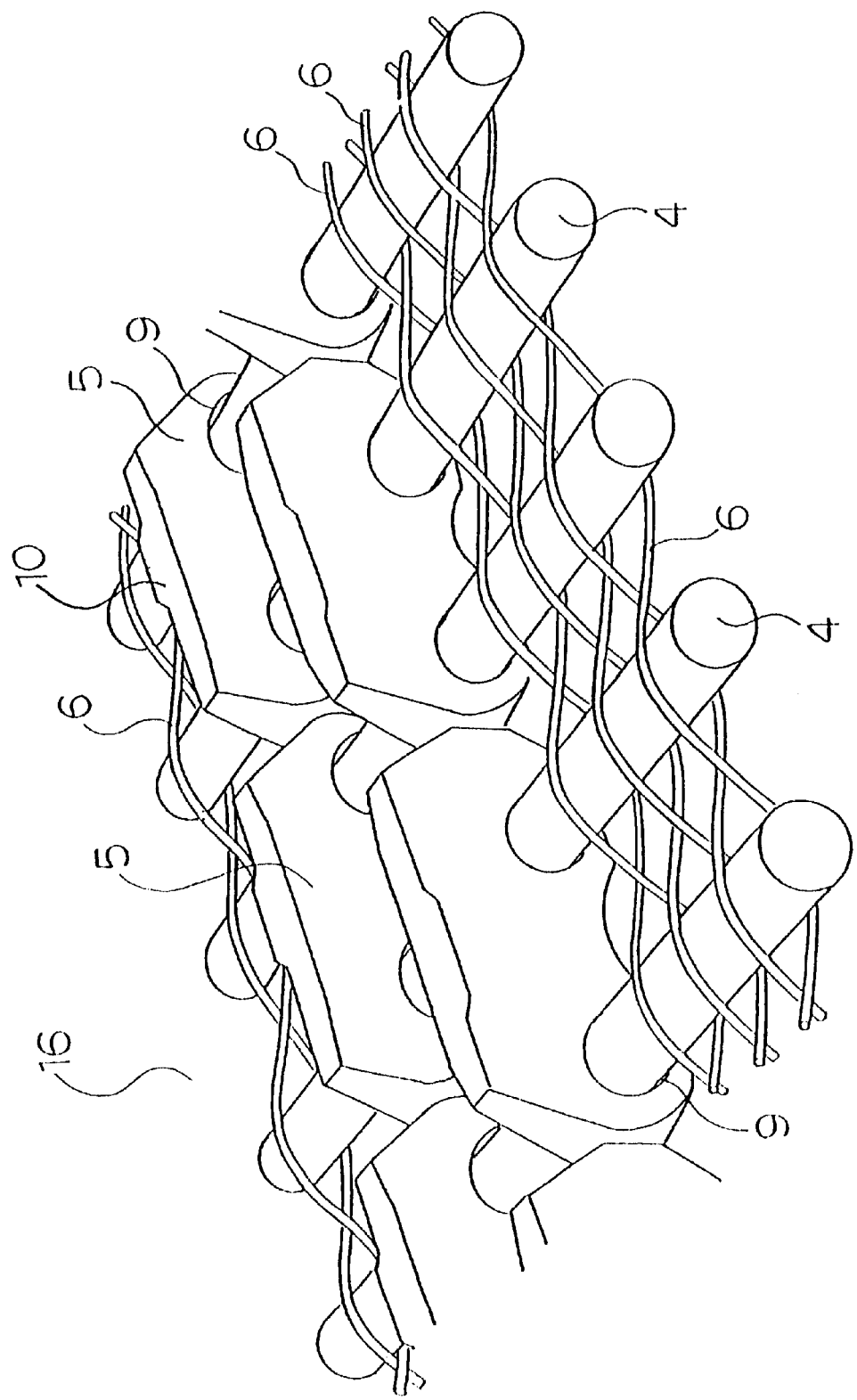
FIG. 41 is one of another embodiment 2.

FIG. 40 and FIG. 41 show other embodiments of the 9th example of this invention. These are combination perspective views showing each arrangement of the reinforcing layer 6 and the bar 4.

As shown in FIG. 40, the reinforcing layer 6 may be embedded in a woven pattern with the bars 4. The reinforcing layer 6 passes along an inner circumference side of the bar 4*a*, an outer circumference side of the next bar 4*b*, and again an inner circumference side of the next bar 4*c*, so that it may be arranged to the inner circumference and the outer circumference of the bar 4 by turns.

In the example shown in FIG. 40, the reinforcing layer 6, which is embedded in both the outsides of the center part of the rubber crawler having an engaging part and generally parallelepiped blocks, is divided into two right and left. The right and left reinforcing layer 6 are embedded in the inner circumference and the outer circumference of the bar 4 by turns so that each arrangement of them is opposite. Moreover, the reinforcing layer may be divided further as shown in FIG. 41.

The 10th example of this invention is explained using FIGS. 42 to 44, and FIGS. 45A to 45C.

The 10th example is characterized by providing a connecting ring 21 in the composition of the 1st example.

Figure 42:
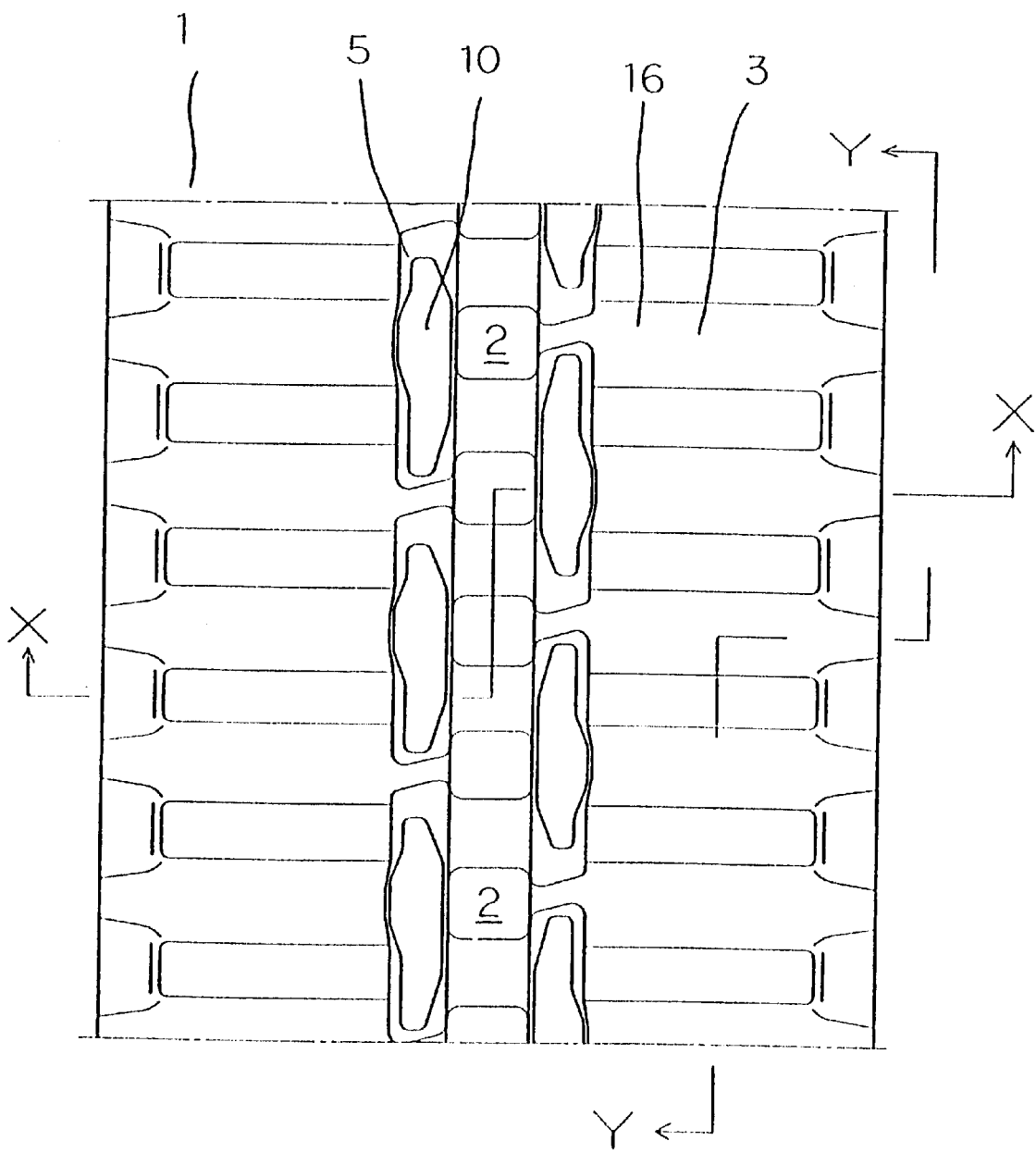
FIG. 42 is a plan view showing an inner circumference side of a rubber crawler of the 10th example.
Figure 43:
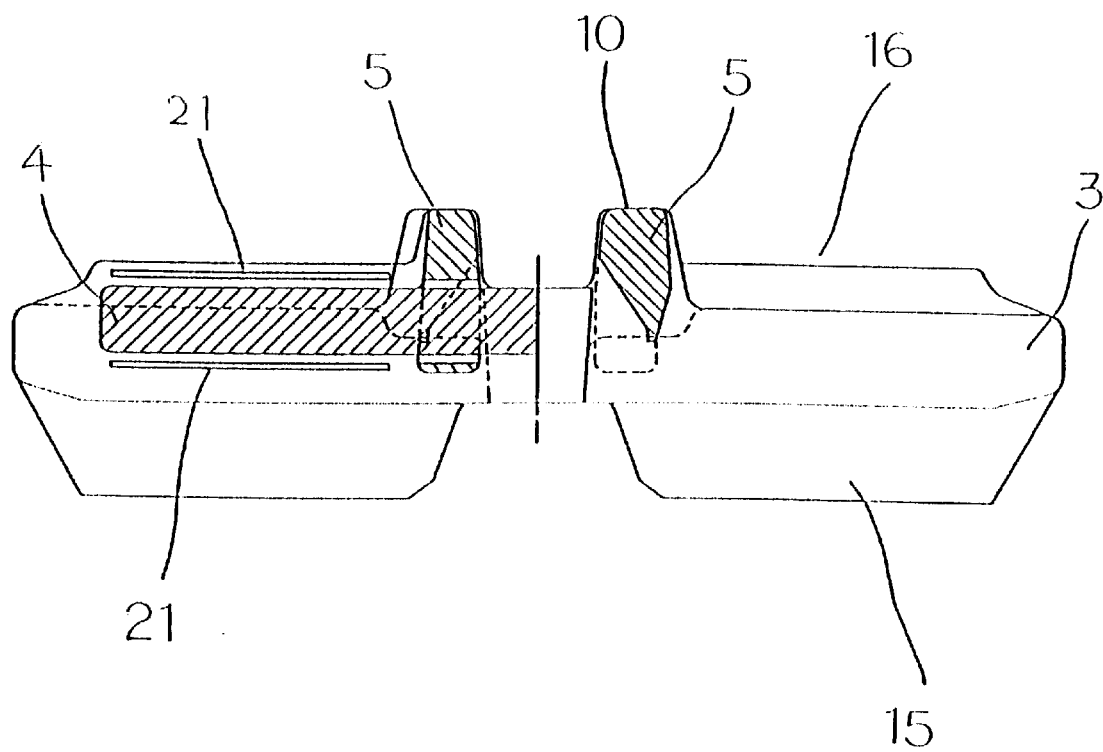
FIG. 43 is an X—X line sectional view therein.
Figure 44:
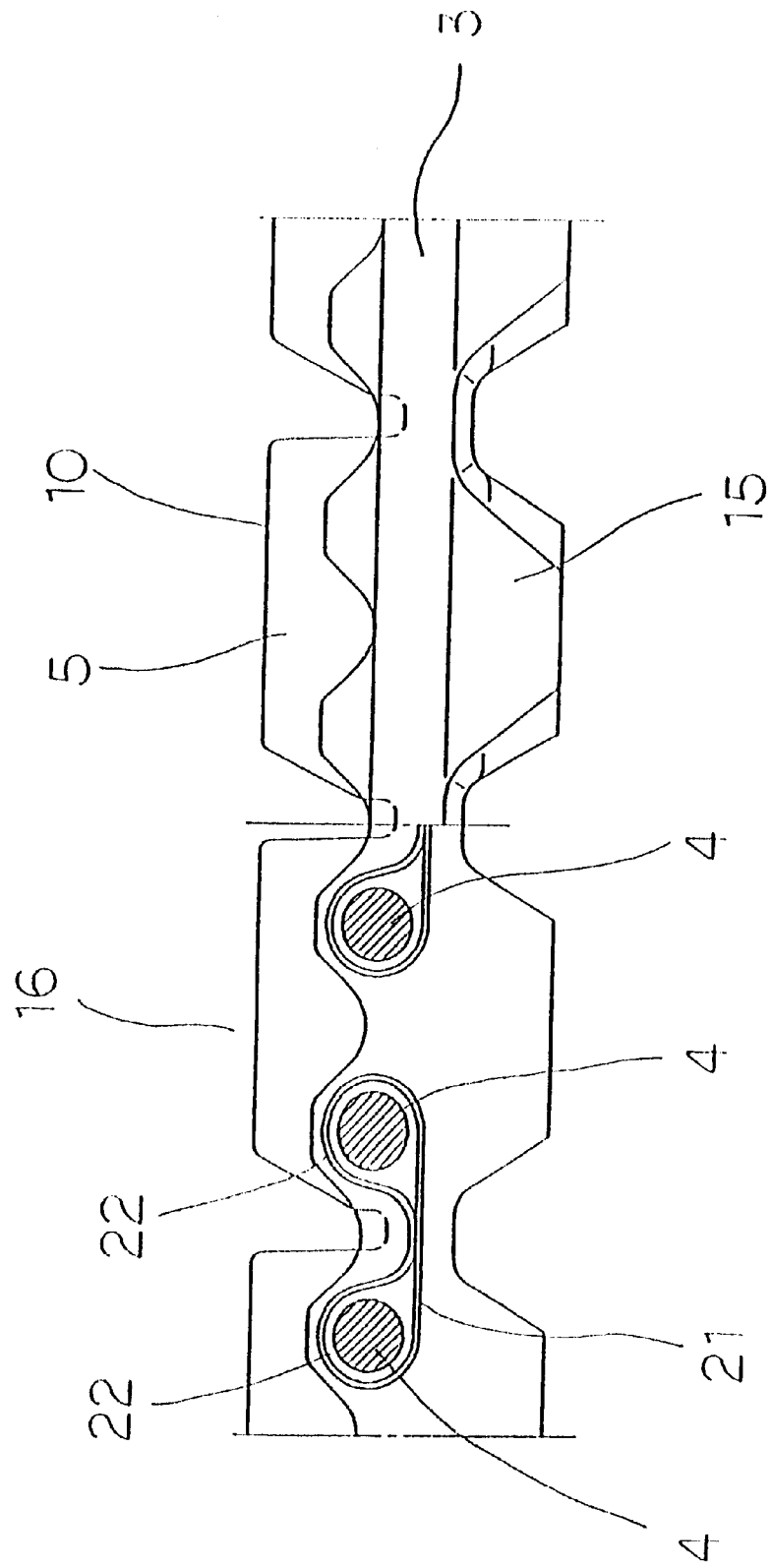
FIG. 44 is a Y—Y line sectional view therein.
Figure 45:
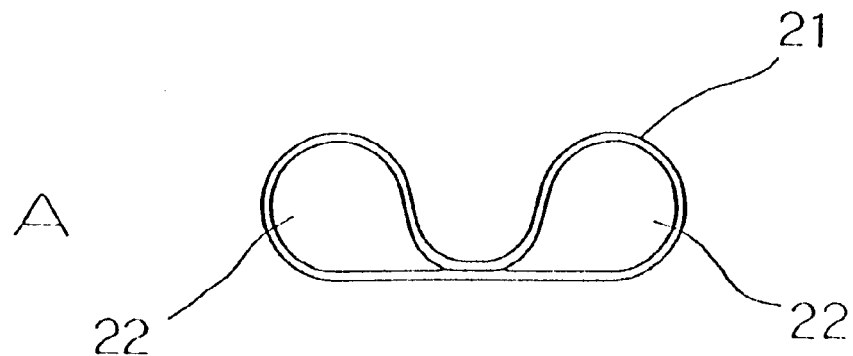
FIG. 45A is a side view of a connecting ring of the 10th example in a crawler circumferential direction.
FIG. 45B is a plan view thereof.
FIG. 45C is a side view thereof in a crawler width direction.
Figure 45:
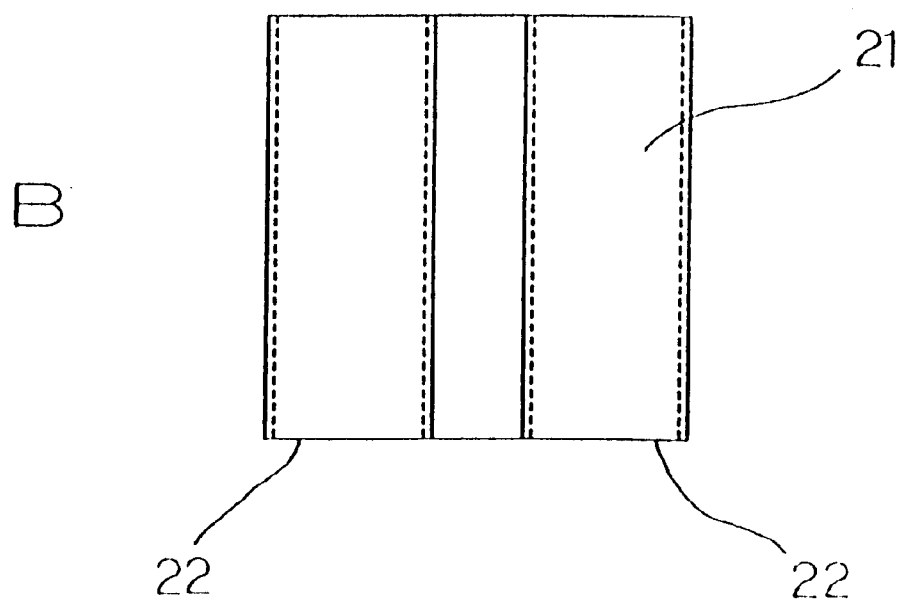
Figure 45:
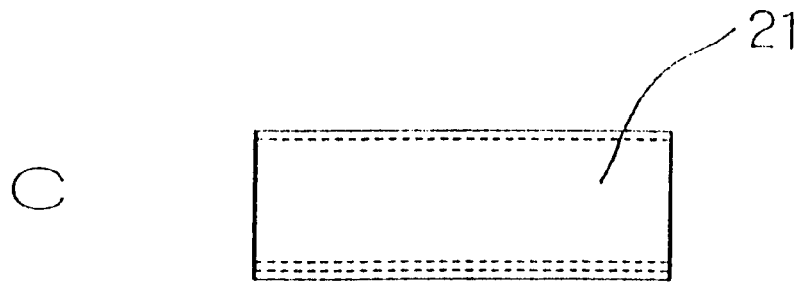
Figure 46:
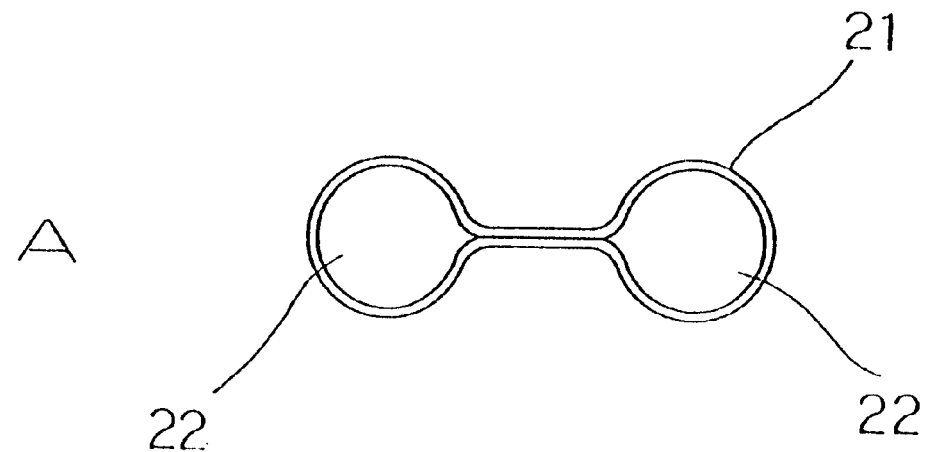
FIG. 46A is a side view of another embodiment 1 of the connecting ring of the 10th example in a crawler circumferential direction.
FIG. 46B is a plan view of it.
FIG. 46C is a side view thereof in crawler width direction.
Figure 46:
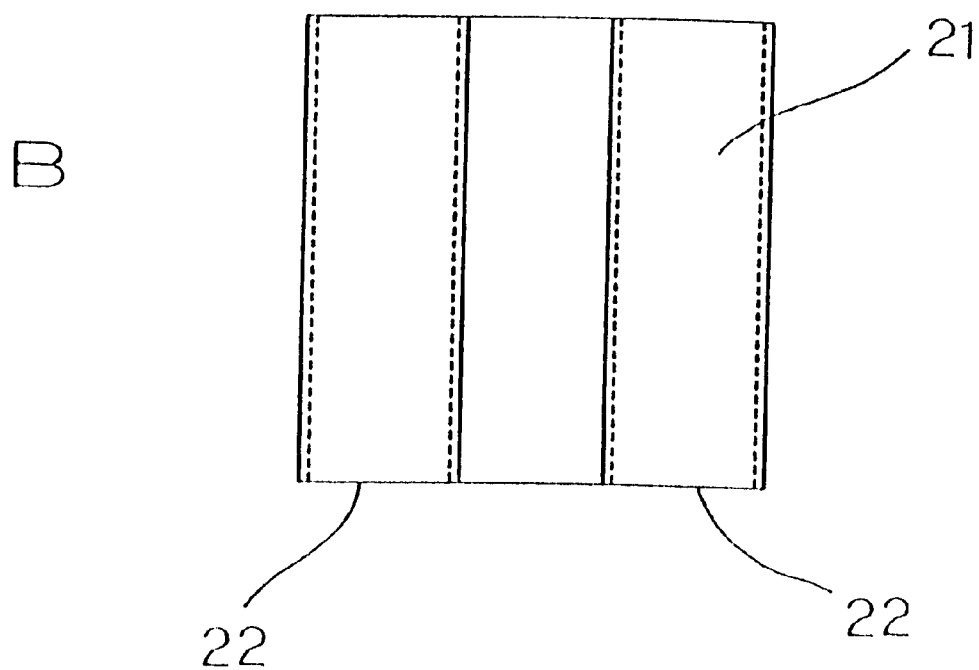
Figure 46:
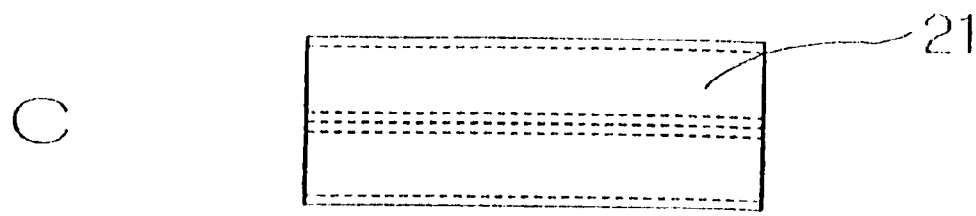
Figure 47:
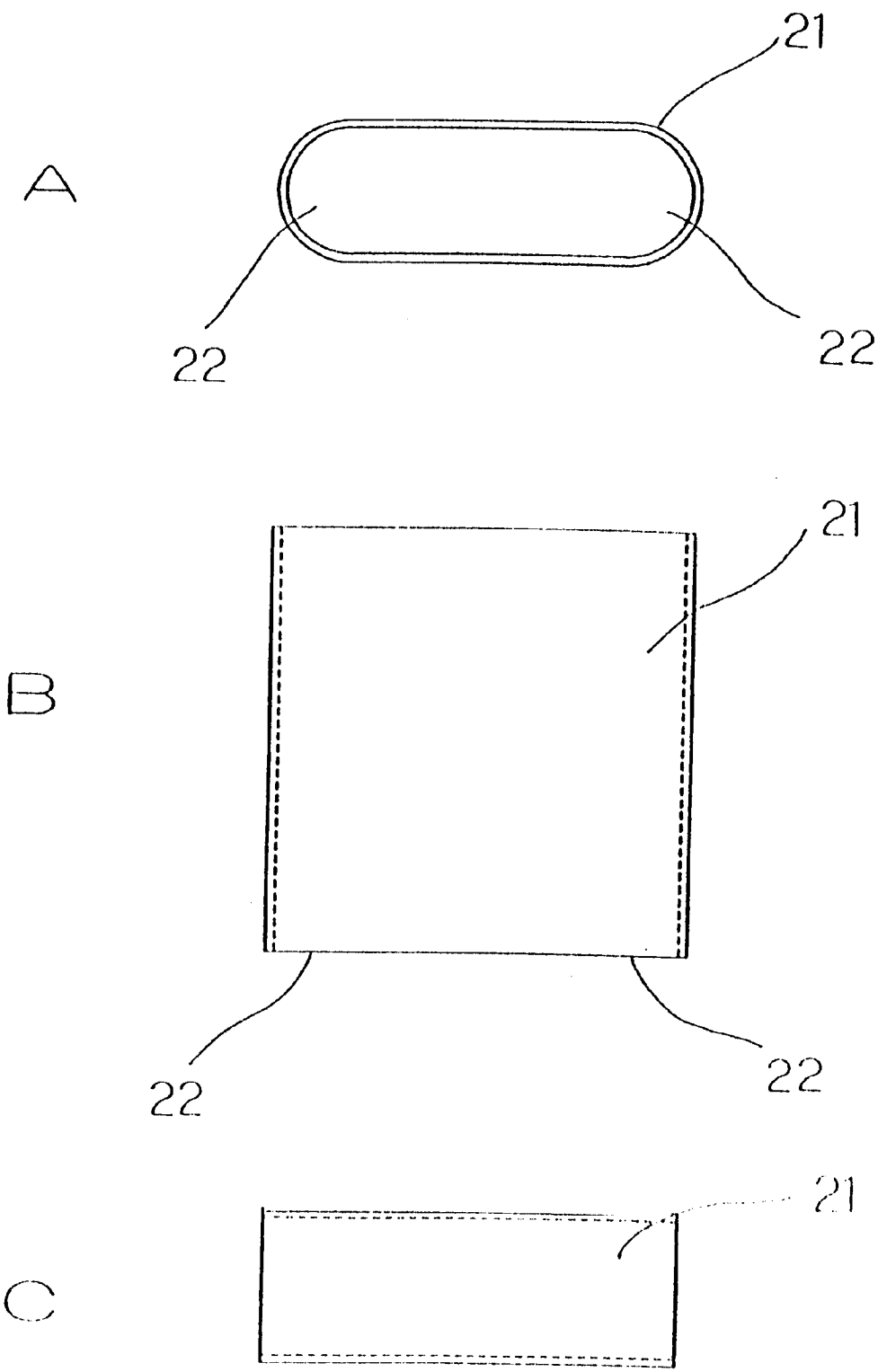
FIG. 47A is a side view of another embodiment 2 of the connecting ring of the 10th example in a crawler circumferential direction.
FIG. 47B is a plan view thereof.
FIG. 47C is a side view thereof in a crawler width direction.
Figure 48:
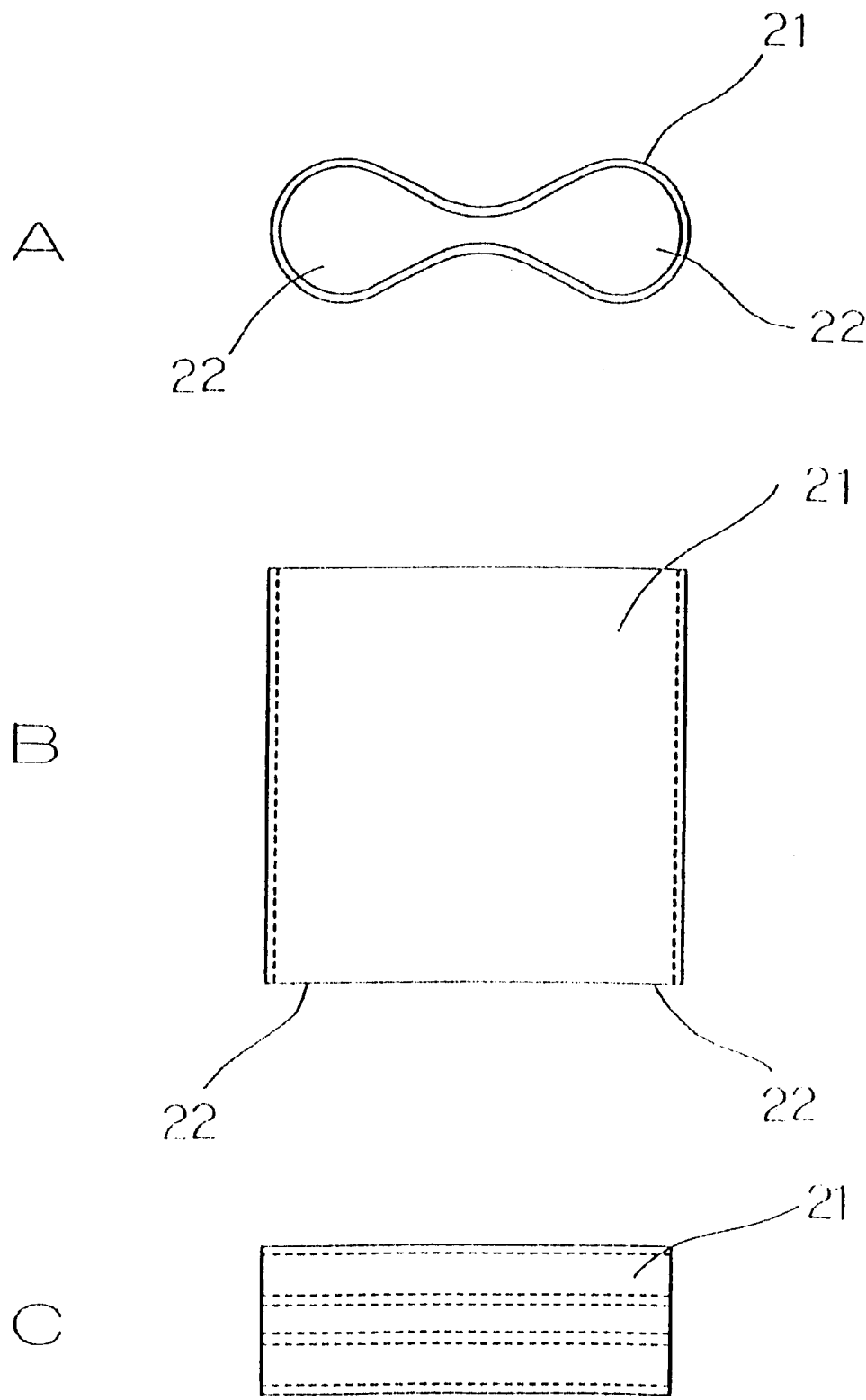
FIG. 48A is a side view of another embodiment 3 of the connecting ring of the 10th example in a crawler circumferential direction.
FIG. 48B is a plan view thereof.
FIG. 48C is a side view thereof in a crawler width direction.

FIG. 42 is a plan view showing the inner circumference side 16 of the rubber crawler of this example. FIG. 43 is an X—X line sectional view in FIG. 42, and FIG. 44 is a Y—Y line sectional view in FIG. 42. FIGS. 45A to 45C show the connecting ring 21, FIG. 45A is a side view in the crawler circumferential direction, FIG. 45B is a plan view, and FIG. 45C is a side view in the crawler width direction.

The connecting ring 21 is shifted by half a pitch relative to the generally parallelepiped block 5 in the crawler circumferential direction, and on the outside of it in the crawler width direction. Adjacent bars 4 and 4 are inserted into both sides 22 and 22 of the connecting ring 21, and embedded in the rubber crawler body 3.

According to the above-mentioned composition, the bars 4 are connected with each other at both sides of the engaging hole 2, thereby causing few oscillations and few twists on the crawler. Besides, the connecting ring 21 is made of spring steel, steel cord, high intensity fiber etc., and has spring nature due to its form effect, thereby serving as a rubber crawler that hardly generates unusual tension and is hardly broken.

The connecting ring 21 is not limited to forms shown in FIGS. 45A to 45C, but may be any form shown in FIGS. 46A to 46C, FIGS. 47A to 47C, and FIGS. 48A to 48C etc. If only the connecting ring 21 is embedded in rubber and has spring nature, any form is usable.

Figure 49:
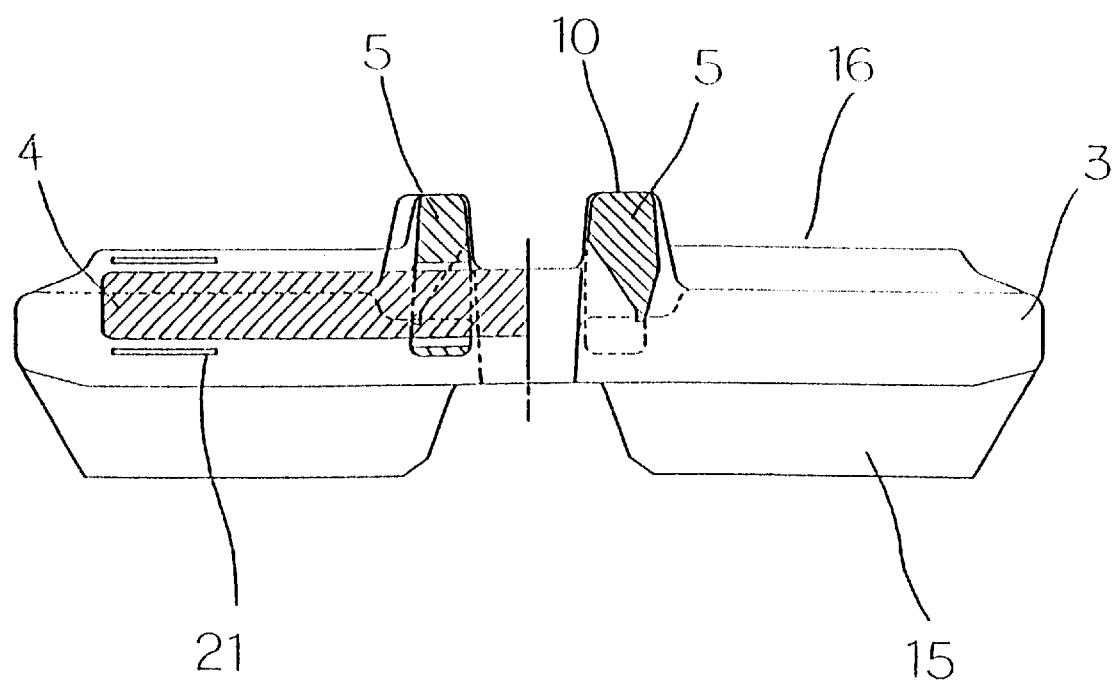
FIG. 49 is a sectional view of another embodiment 1 of the rubber crawler in the 10th example.
Figure 50:
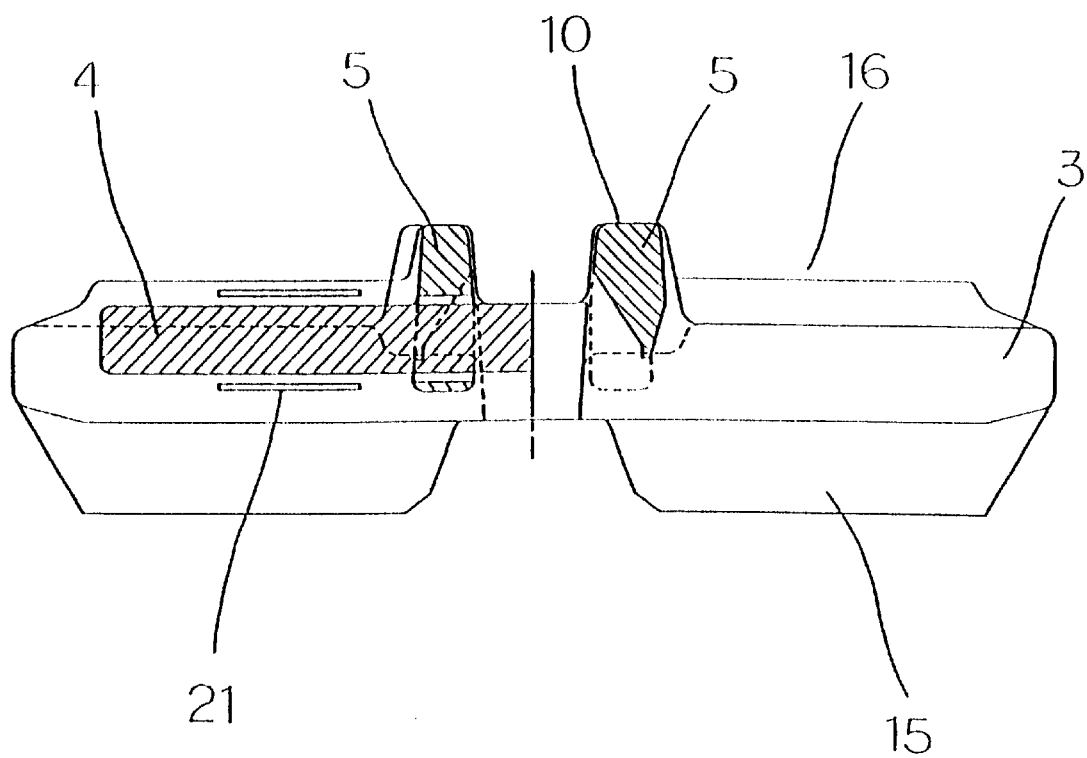
FIG. 50 is one of another embodiment 2.

In addition, a width of the connecting ring 21 and an inserting position to the crawler width direction is freely chosen. An example is shown in FIG. 49 or FIG. 50.

Figure 51:
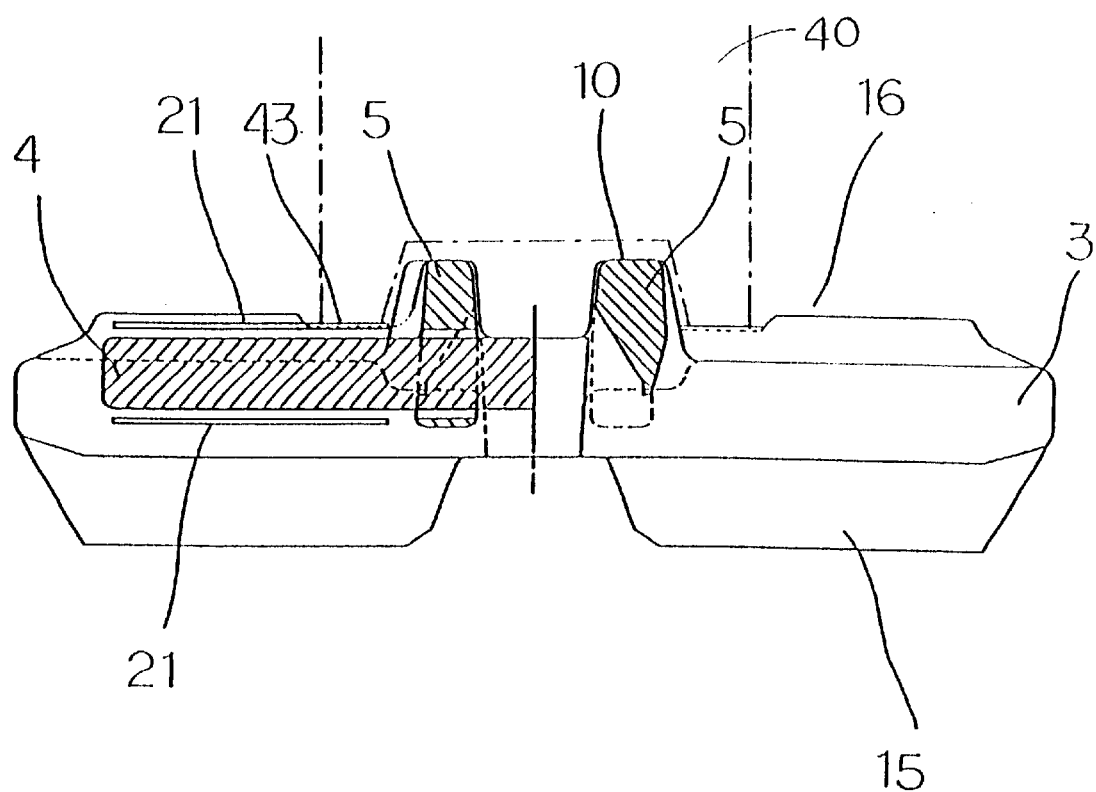
FIG. 51 is one of another embodiments 4.
Figure 52:
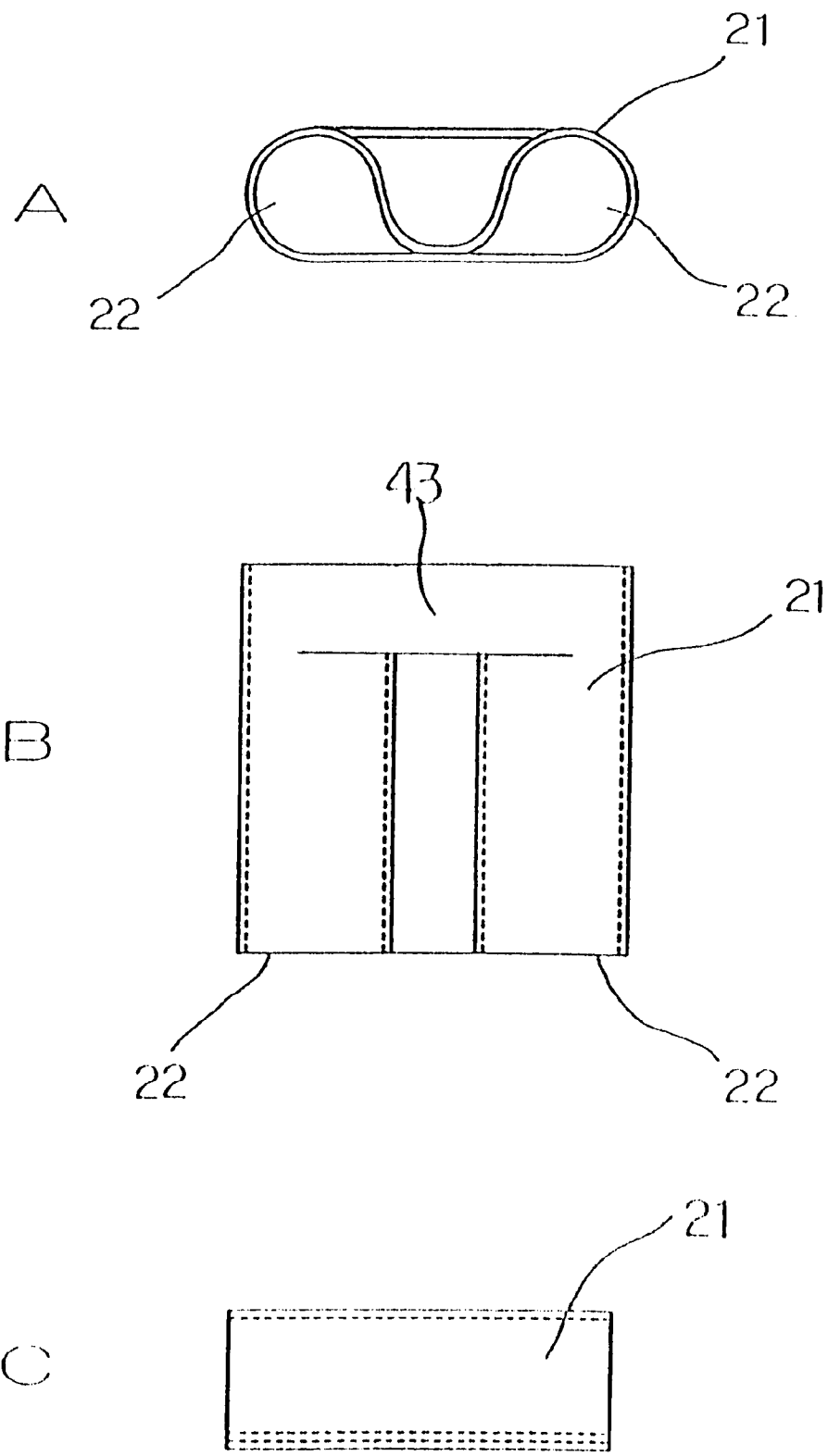
FIG. 52A is a side view of another embodiment 4 of the connecting ring in the 10th example in a crawler circumferential direction.
FIG. 52B is a plan view thereof.
FIG. 52C is a side view thereof in a crawler width direction.
Figure 53:
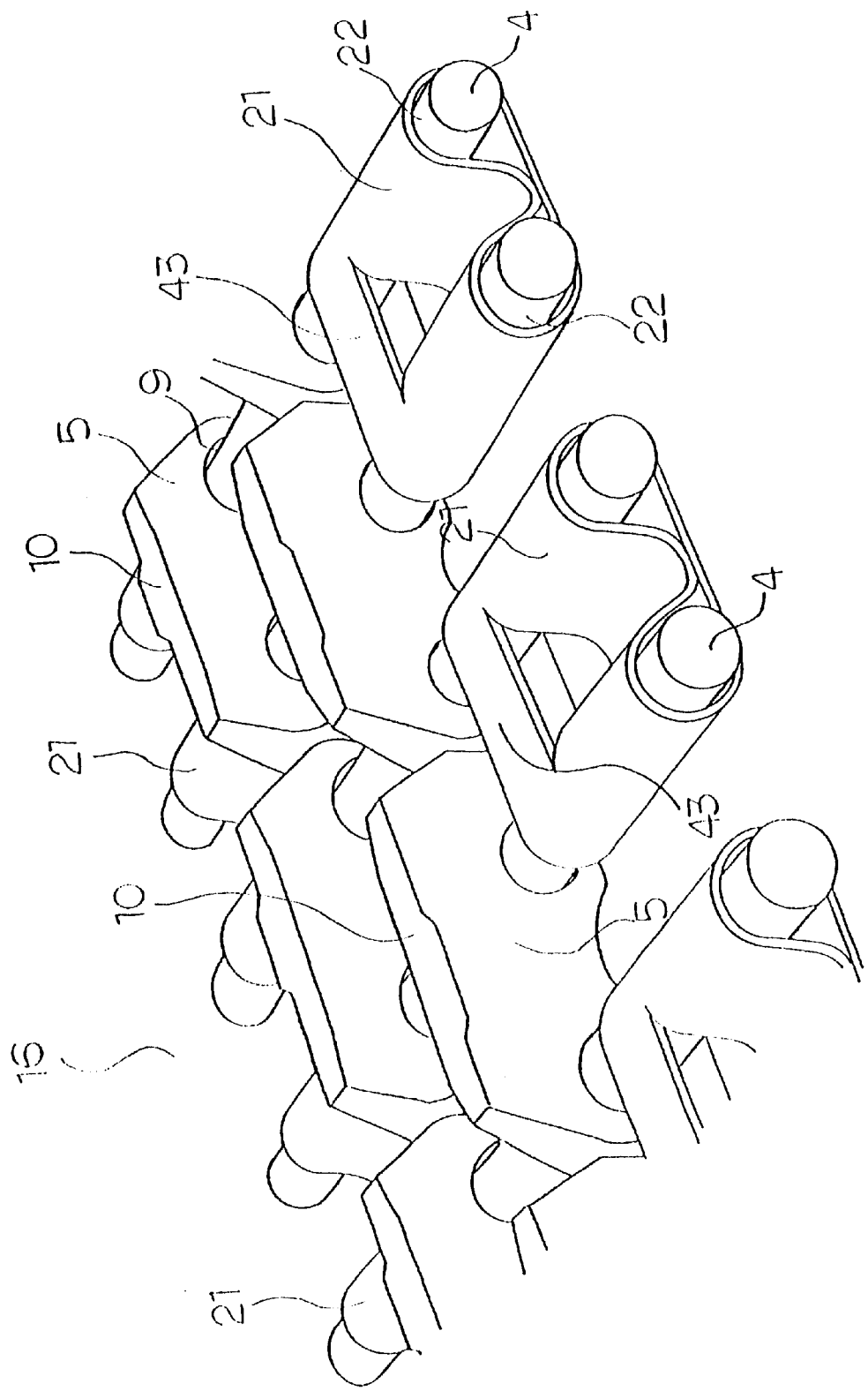
FIG. 53 is a combination view of the bar, the generally parallelepiped block and the connecting ring of another embodiment 4 of the rubber crawler in the 10th example.

Moreover, as shown in FIGS. 51 to 53, at least one part of the connecting ring 21 which is adjacent to the generally parallelepiped block is made flat on the top face of the inner circumference side and made into a rolling contact surface 43. It is exposed to the inner circumference side 16 of the rubber crawler, or covered with rubber to a degree of burr. Then, the outer rolling wheel 40 equipped with the machine can be traveled thereon.

In each example, the lug 15 is arbitrarily arranged. If the lug 15 is shifted by half a pitch to the connecting ring 21 (a pitch to the bar 4), it locates between the connecting ring 21 and the, connecting ring 21, thereby preventing the rigidity therebetween falling. Since the whole crawler has balanced rigidity, traction force is efficiently transmitted to the lug 15.

Figure 54:
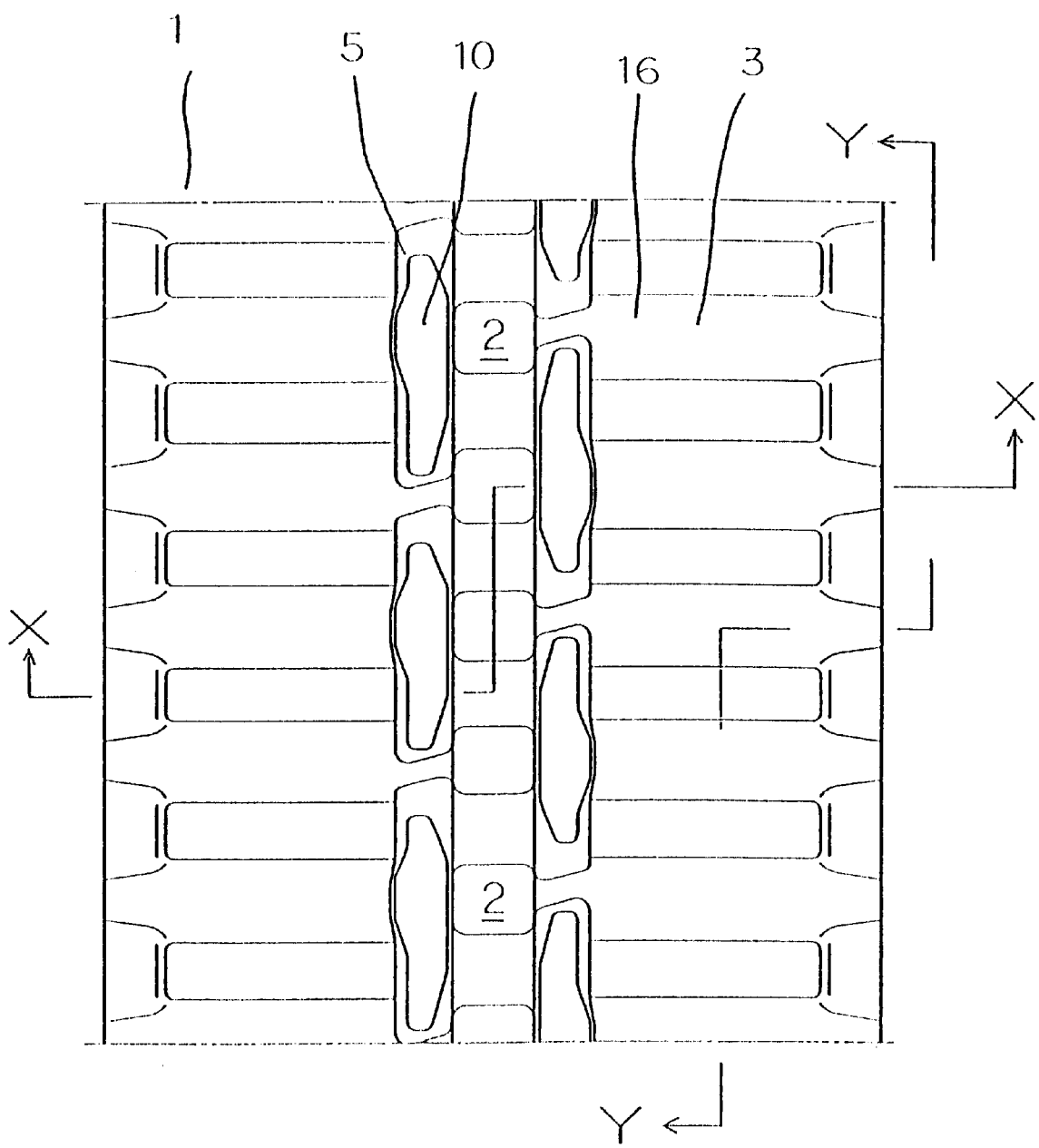
FIG. 54 view showing an inner circumference side of a rubber crawler of the 11th example.
Figure 55:
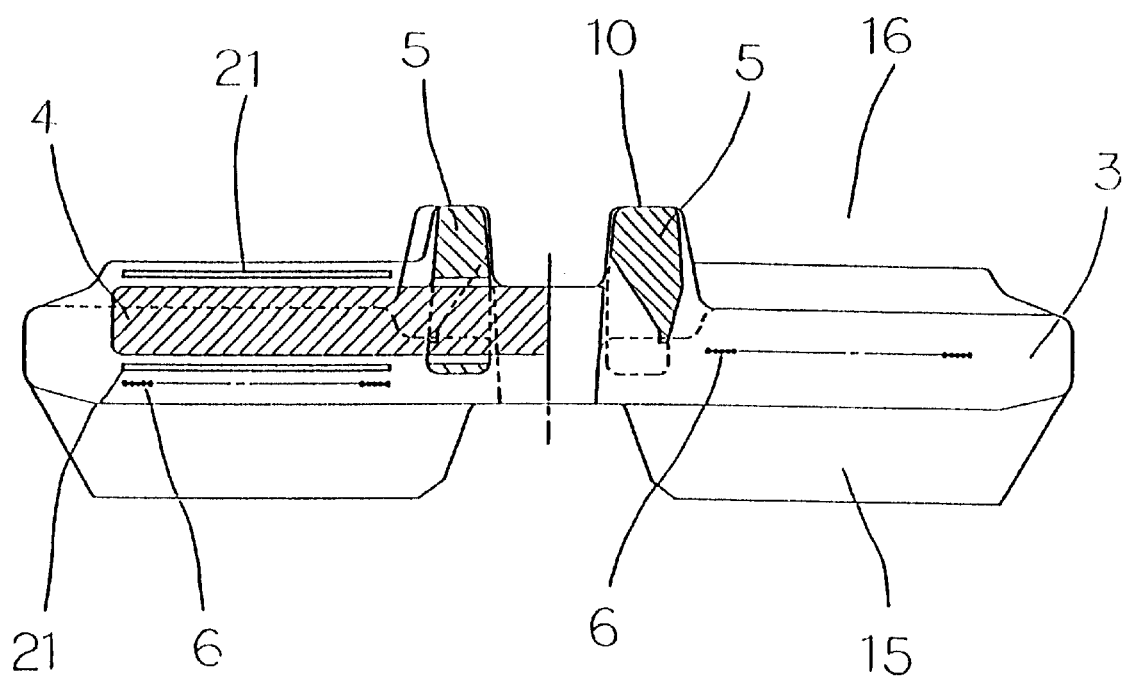
FIG. 55 is an X—X line sectional view therein.
Figure 56:
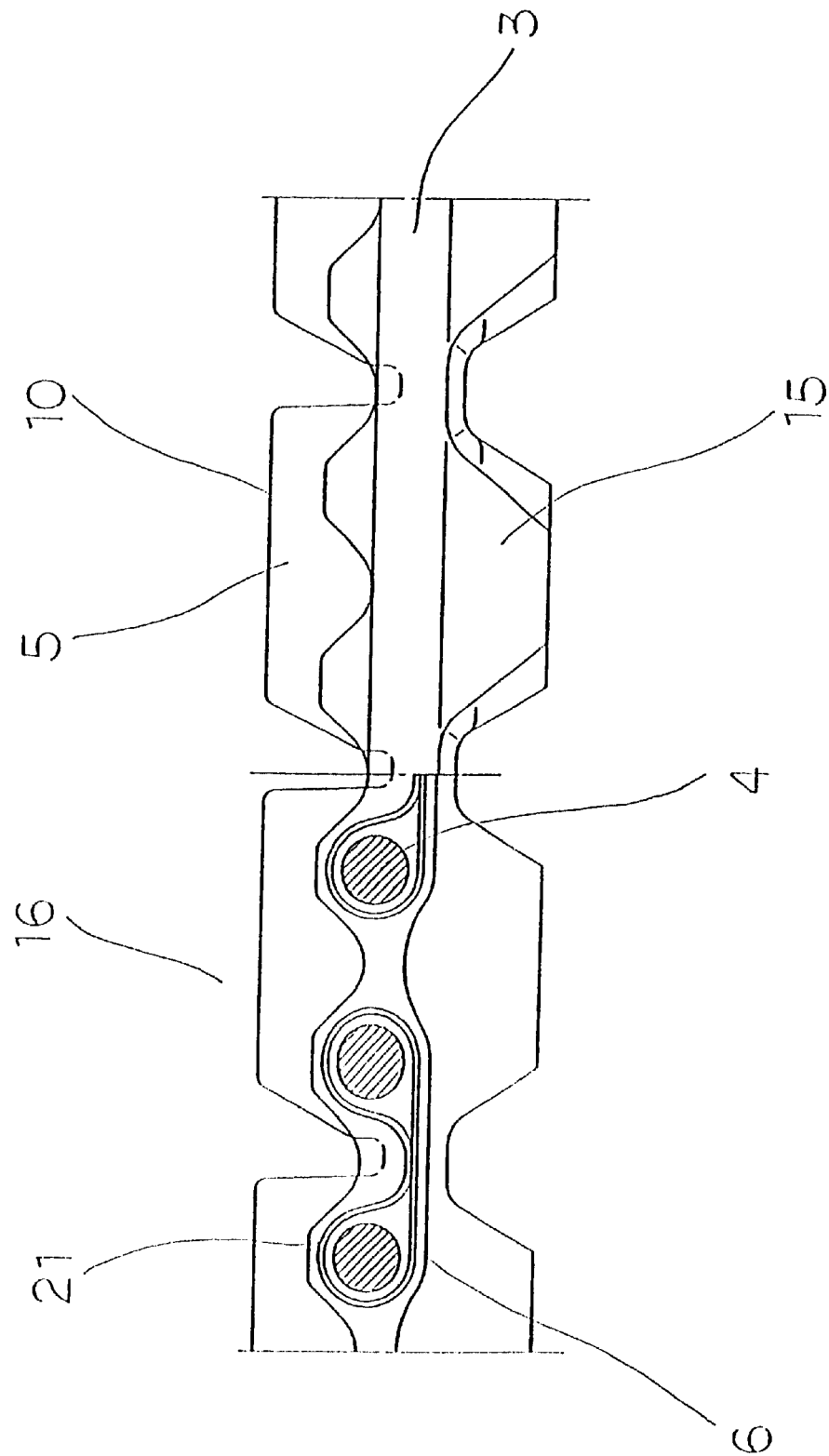
FIG. 56 is a Y—Y line sectional view therein.

The 11th example of this invention is explained using FIGS. 54 to 56. The 11th example is characterized by embedding the reinforcing layer 6 in the rubber crawler body 3 in its all circumference in the composition of the 10th example. The reinforcing layer 6 is divided among the crawler width direction, and embedded in the outer circumference side (tread side) of the connecting ring 21.

The reinforcing layer 6, as shown in FIG. 56, is embedded along a surface of the connecting ring 21, and meanders on the inner circumference side 16 (anti-tread side) of the crawler between the connecting ring 21 and an adjacent connecting ring 21.

The 11th example has both effects of the 10th example and the 9th example, thereby serving as a rubber crawler that causes few twists and firm traction, and that is hardly broken.

Next, the 12th example of this invention is explained using FIG. 57, FIG. 58, FIGS. 59A to 59C, and FIG. 60. The 12th example is characterized by providing a generally parallelepiped auxiliary block 17 in the composition of the 1st example.

Figure 57:
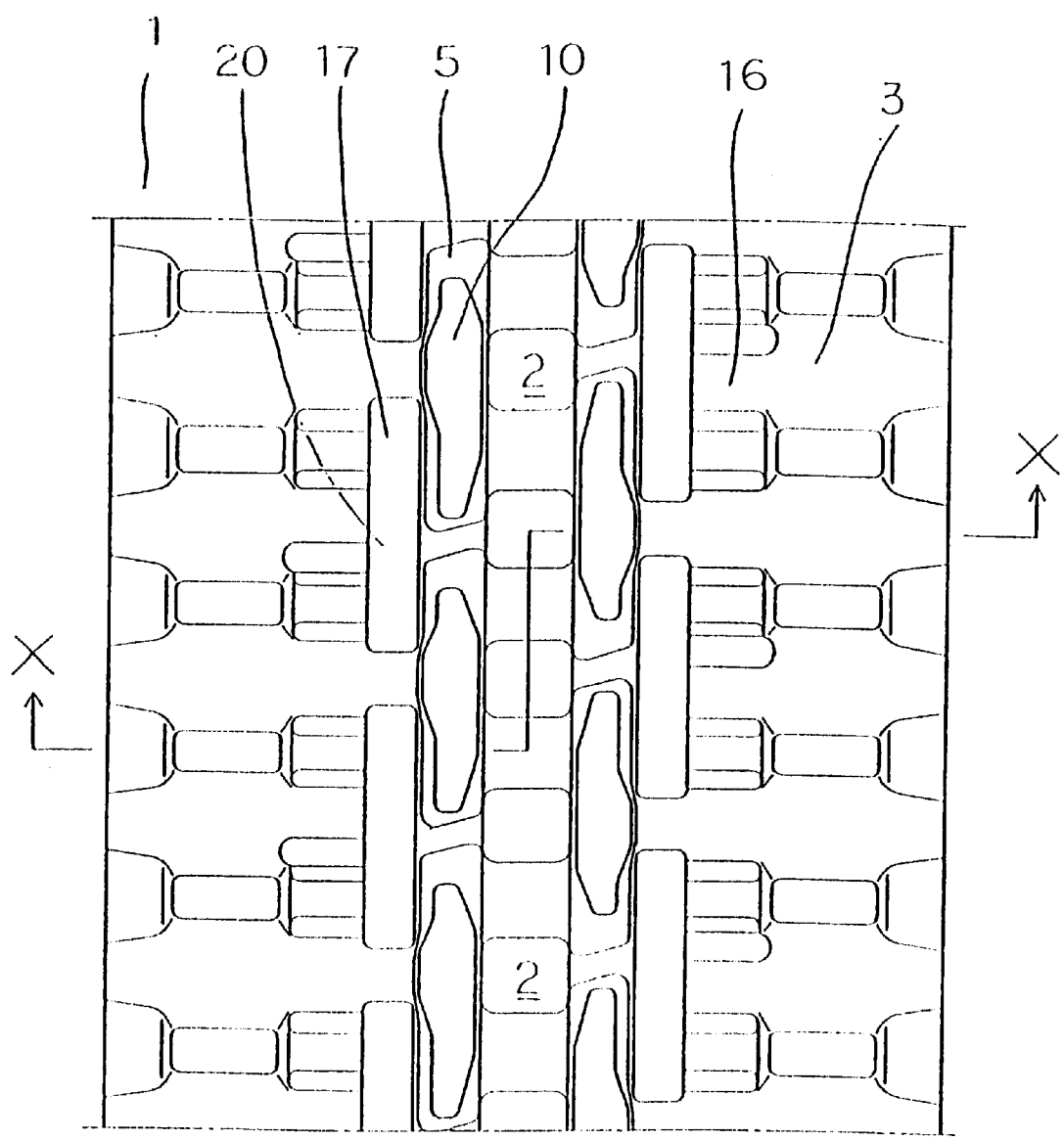
FIG. 57 is a plan view showing an inner circumference side of a rubber crawler of the 12th example.
Figure 58:
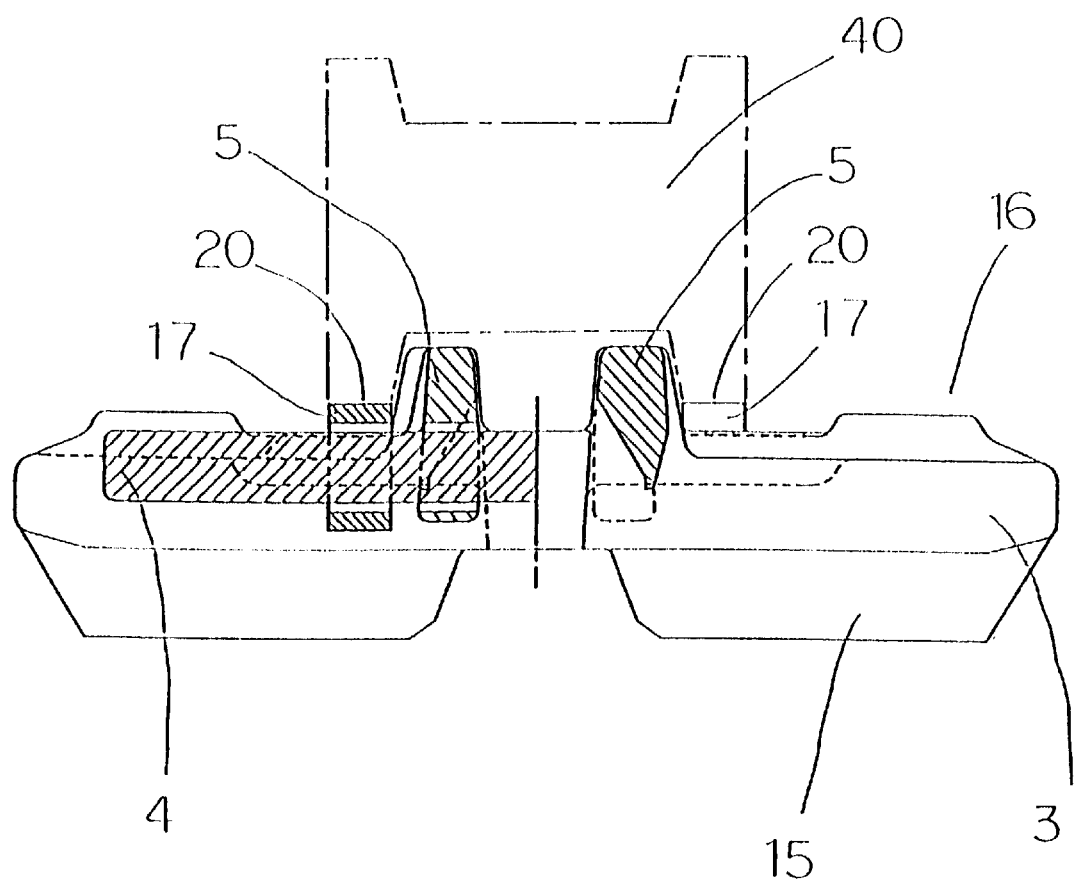
FIG. 58 is an X—X line sectional view in FIG. 57.
Figure 59:
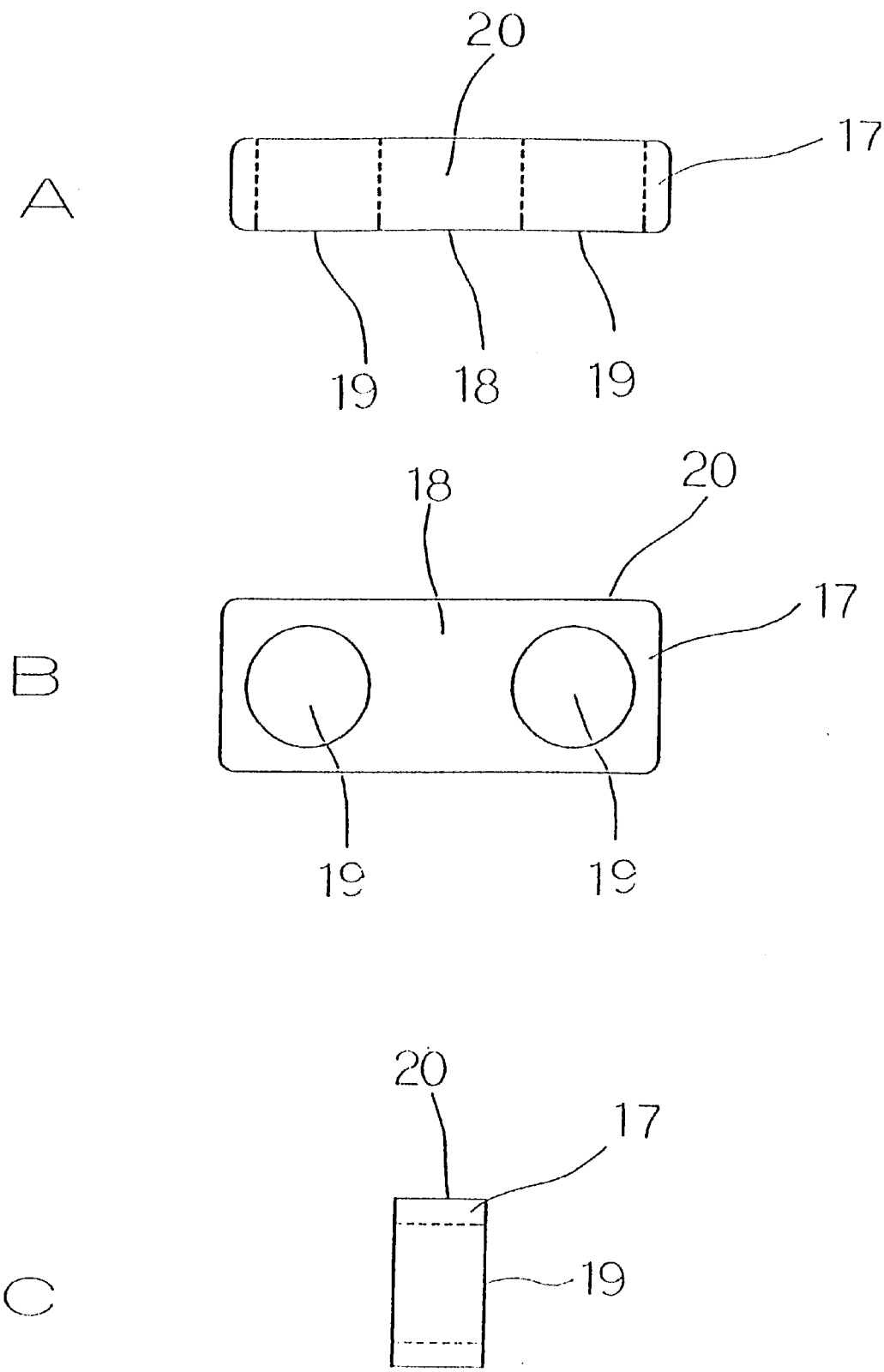
FIG. 59A is a plan view of a generally parallelepiped auxiliary block of the 12th example.
FIG. 59B is a front view thereof.
FIG. 59C is a side view thereof.
Figure 60:
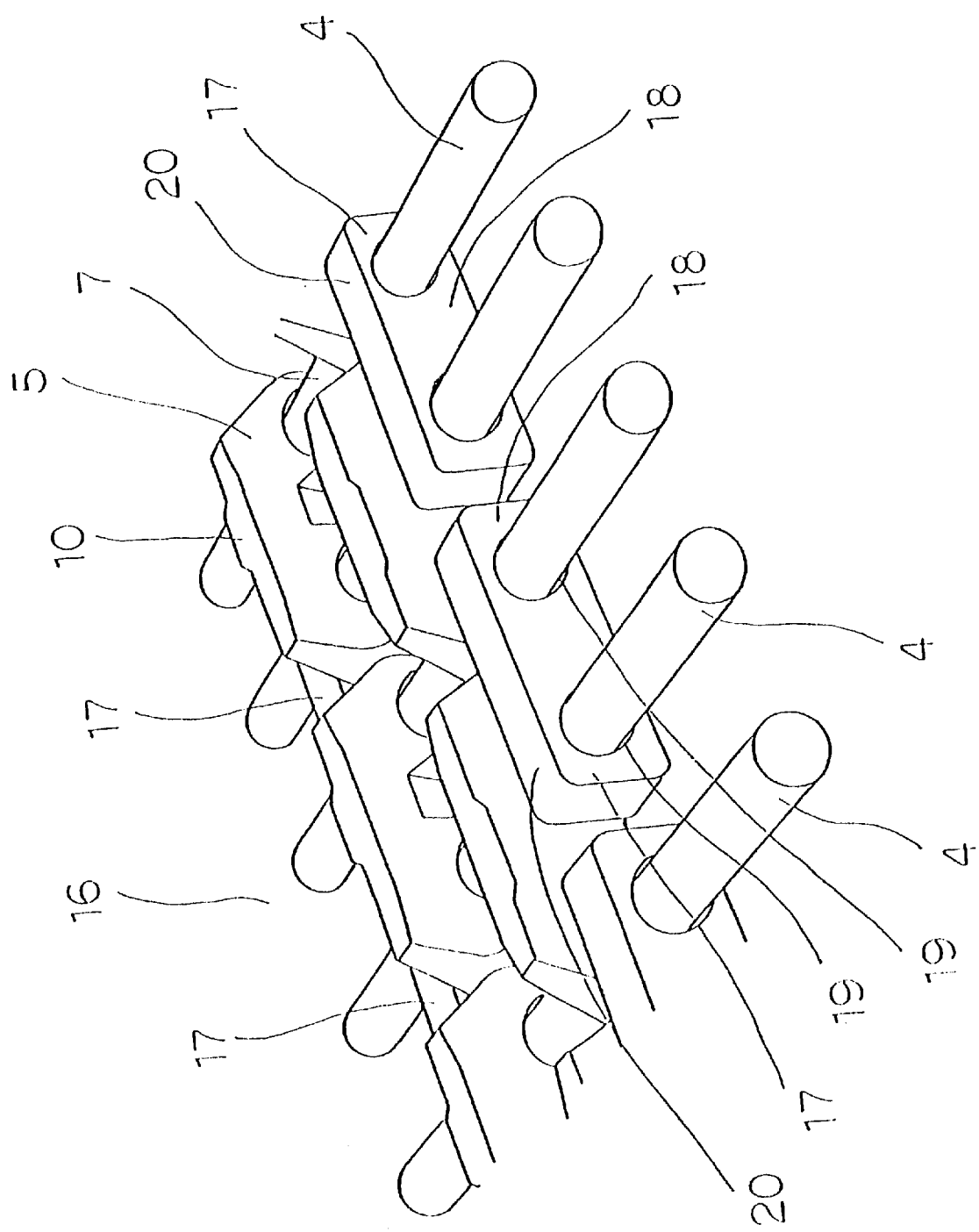
FIG. 60 is a combination view of the bar, the generally parallelepiped block and the generally parallelepiped auxiliary block of the 12th example.

FIG. 57 is a plan view showing the inner circumference side 16 (anti-tread side) of a rubber crawler of this example. FIG. 58 is an X—X sectional view in FIG. 57. FIGS. 59A to 59C show the generally parallelepiped auxiliary block 17 of this example, respectively. FIG. 59A is a plan view, FIG. 59B is a front view, and FIG. 59C is a side view. FIG. 60 is a combination view of the bar, the generally parallelepiped block, and the generally parallelepiped auxiliary block.

Through holes 19 and 19 are provided on a front face 18 of the generally parallelepiped auxiliary block 17 so as to be located at front and back portions in the crawler circumferential direction. The generally parallelepiped auxiliary block 17 is shifted by half a pitch in the crawler circumferential direction to the adjacent generally parallelepiped block 5, and on the outside of the generally parallelepiped block 5 in the crawler width direction. Adjacent bars 4 and 4 are inserted in the through holes 19 and 19, and embedded in the rubber crawler body 3.

Moreover, a top face 20 of the generally parallelepiped auxiliary block 17 is made flat, exposed to the inner circumference side 16 (anti-tread side) of the rubber crawler, or covered with rubber to a degree of burr. The outer rolling wheel 40 equipped with the machine can travel thereon.

The diameter of the through hole 19 provided in the generally parallelepiped auxiliary block 17 is larger than the outer diameter of the bar 4, and rubber is filled in the gap between the through hole 19 and the bar 4. If the rubber is pasted up to the through hole 19 and the bar 4, the bar 4 is fixed to the generally parallelepiped auxiliary block 17 through the rubber which is an elastic material. Therefore, the rubber crawler acquires moderate spring nature and sufficient rigidity.

Figure 61:
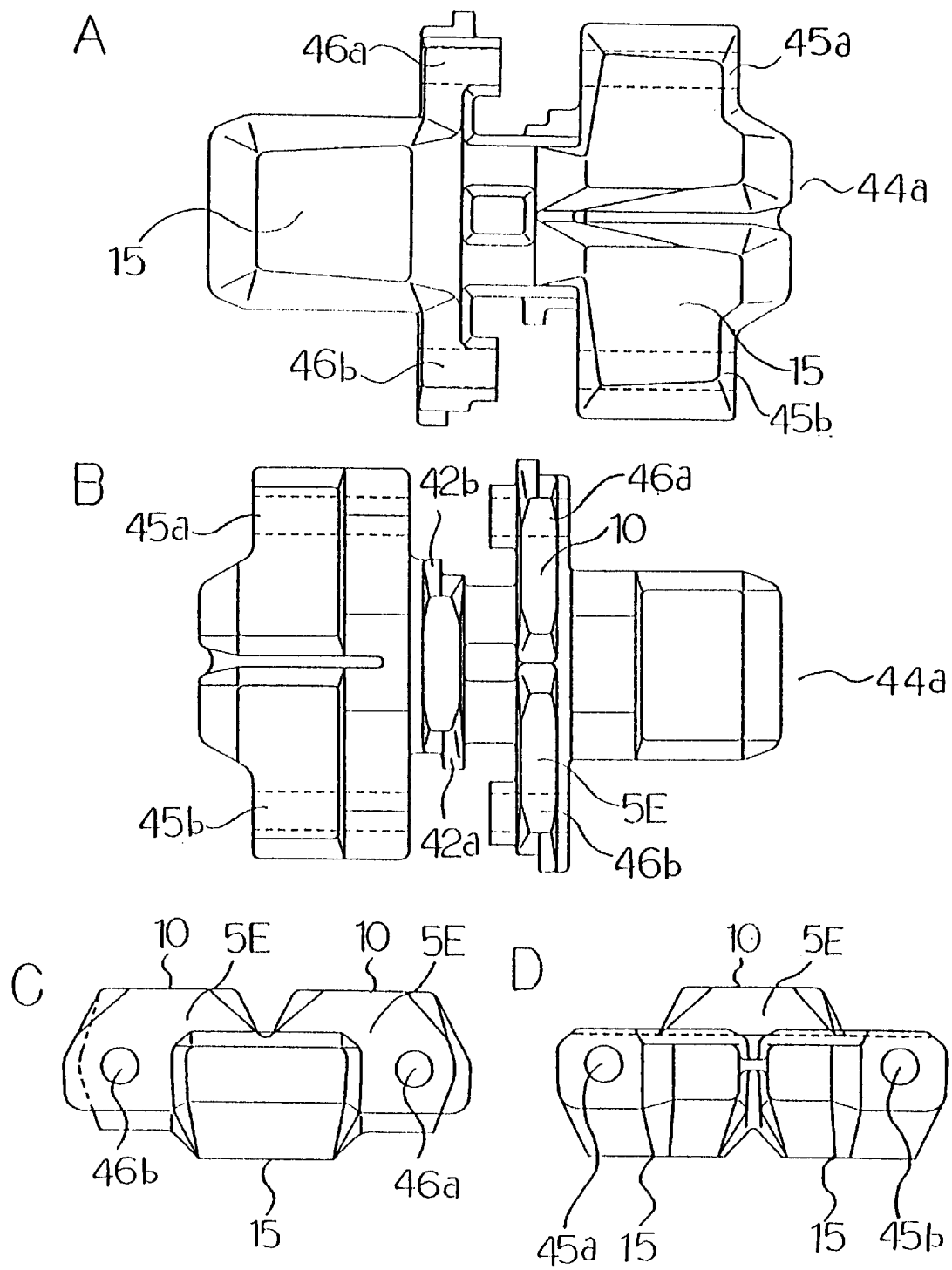
FIG. 61A is a plan view showing the outer circumference side of a rubber crawler unit of the 13th example.
FIG. 61B is one showing an inner circumference side.
FIG. 61C is a left-hand side/view.
FIG. 61D is a right-hand side view.
Figure 62:
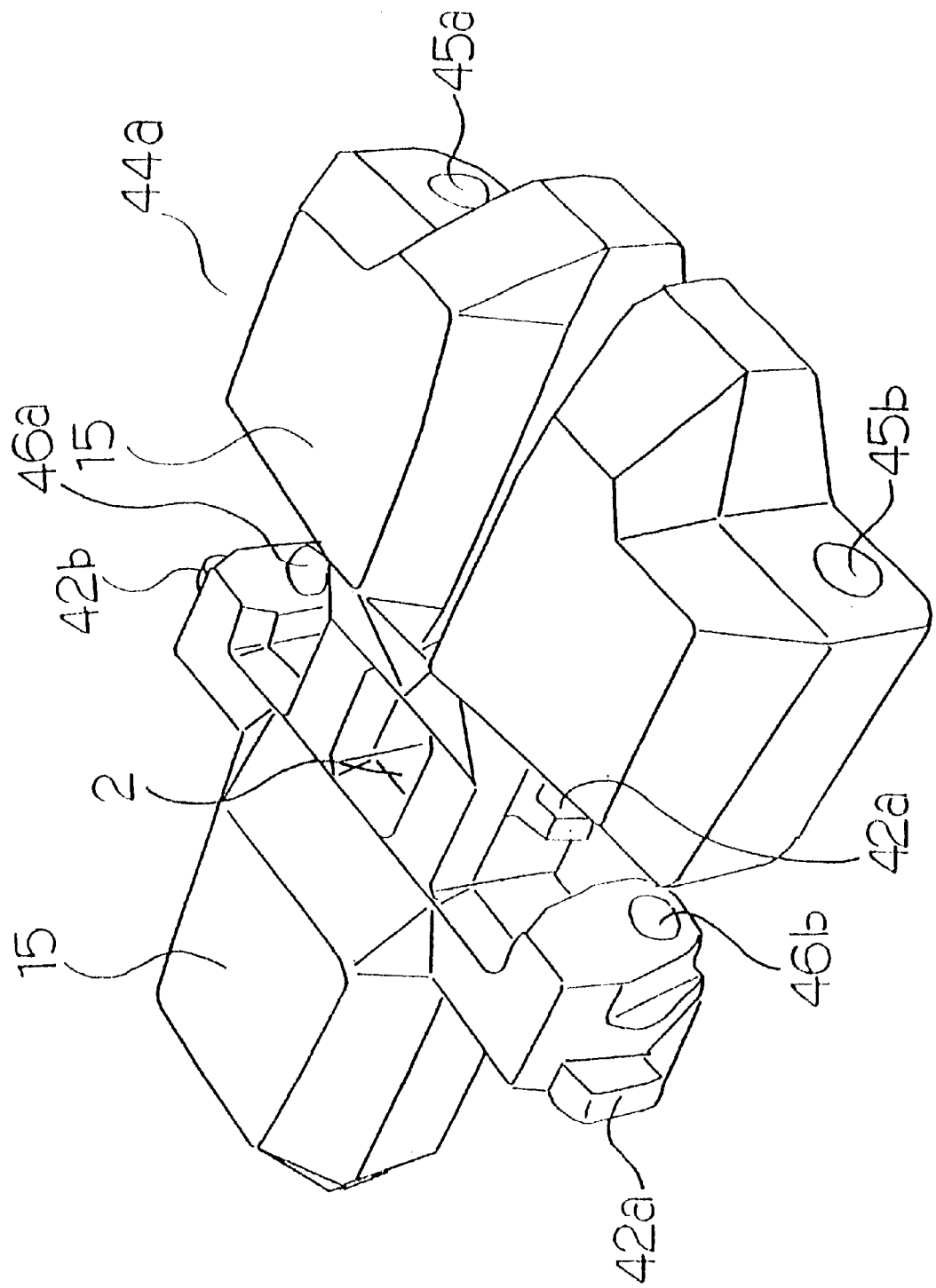
FIG. 62 is a perspective view seen from the outer circumference side of the rubber crawler unit of the 13th example.
Figure 63:
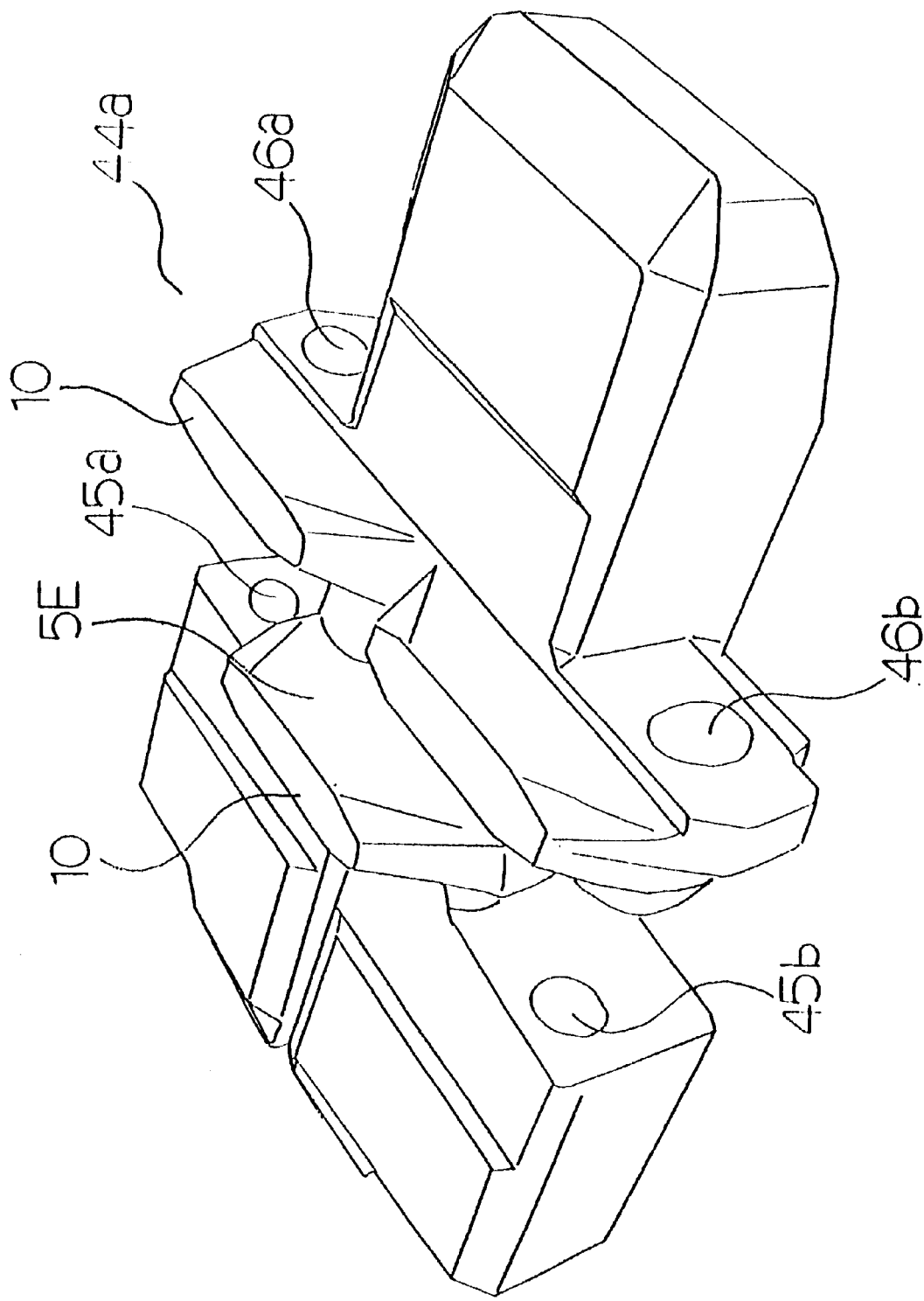
FIG. 63 is one seen from the inner circumference side.
Figure 64:
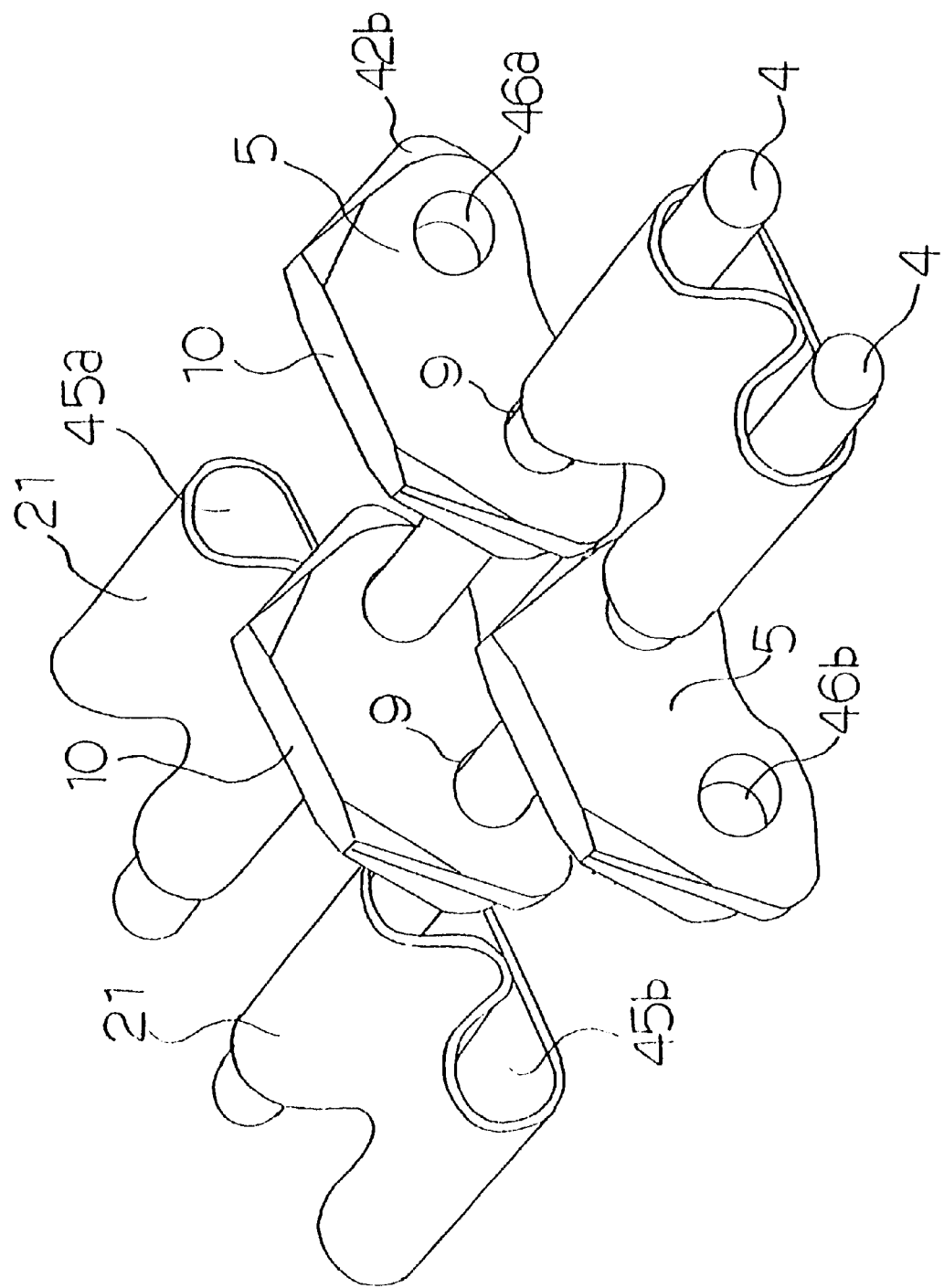
FIG. 64 is an assembly view showing a combination state of the bar, the generally parallelepiped block and the connecting ring which are embedded in the rubber crawler unit of the 13th example.

FIGS. 61A to 61D and FIGS. 62 to 64 show a rubber crawler unit 44a of the 13th example. FIG. 61A is a plan view showing an outer circumference side (tread side), FIG. 61B is a plan view showing an inner circumference side (anti-tread side), FIG. 61C is a left side view, and FIG. 61D is a right side view. FIG. 62 is a perspective view seen from the outer circumference side of the rubber crawler unit 44a. FIG. 63 is a perspective view seen from the inner circumference side of the rubber crawler unit 44a. FIG. 64 is an assembly view showing the combination state of the bar 4, the generally parallelepiped block 5 and the connecting ring 21 which are embedded in the rubber crawler unit 44a.

As shown in FIG. 64, the rubber crawler unit 44a of this example comprises three generally parallelepiped blocks 5E, two bars 4, and three connecting ring 21, embedded in the rubber crawler unit 44a.

The rubber crawler unit 44a of the 13th example is provided with a connecting part on vertical ends (that the ends in the crawler circumferential direction) as shown in FIG. 61A. Adjacent rubber crawler units 44a are connected one after another on each connecting part, and made into an endless rubber crawler.

Figure 65:
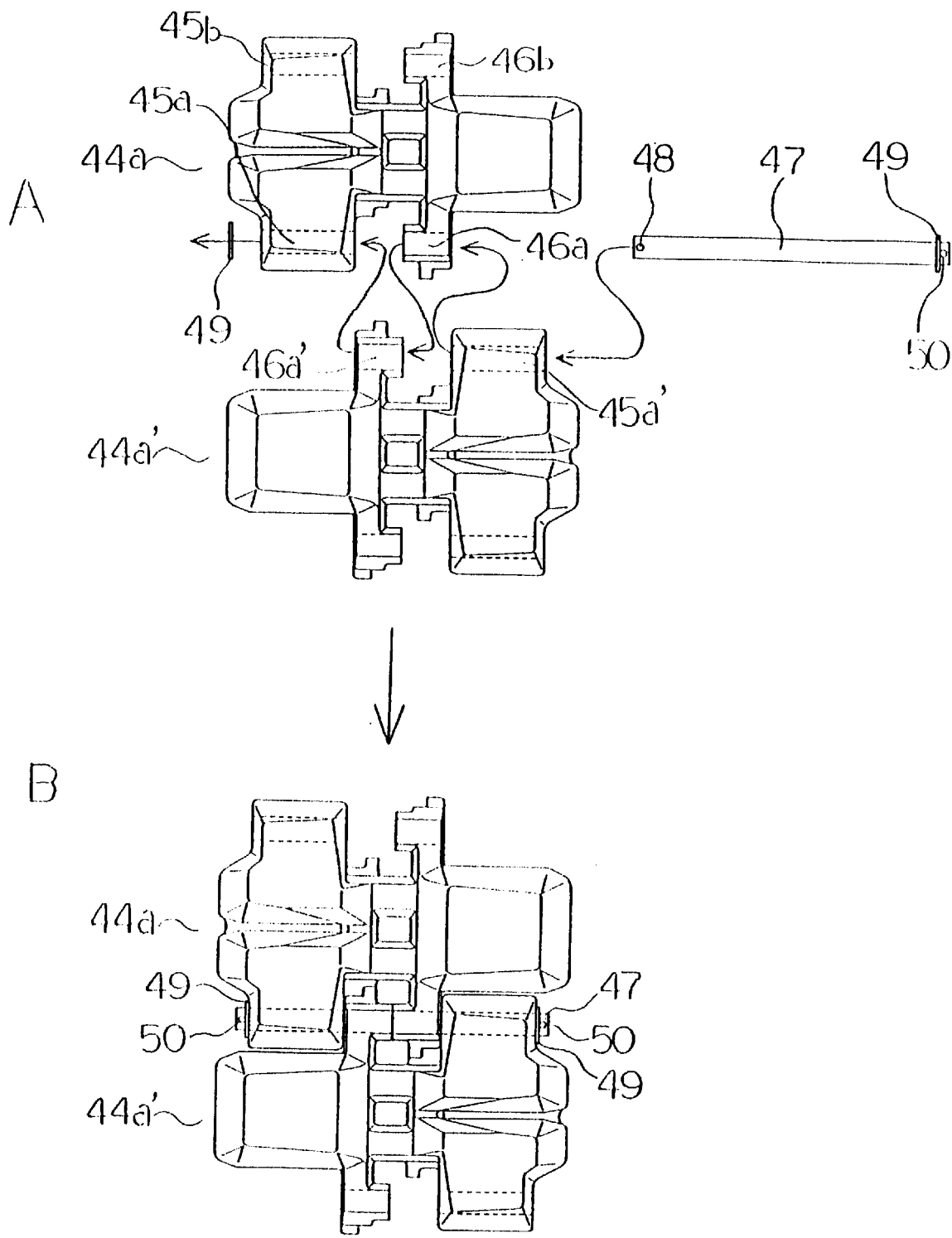
FIG. 65 is an explanatory view about a connection of adjacent rubber crawler units of the 13th example.

The upper end in FIG. 61A is provided with a connecting bar insertion hole 45a on its right side, and a connecting generally parallelepiped block through hole 46a on its left side. The lower end is provided with a connecting bar insertion hole 45b on its right side, and a connecting generally parallelepiped block through hole 46b on its left side. As shown in FIG. 65, the rubber crawler unit 44a is adjoined to the rubber crawler unit 44a that the rubber crawler unit 44a is made to rotate by 180 degree in the opposite direction. The adjacent rubber crawler units 44a and 44a' are connected using the insertion hole 45a and the through hole 46a of the rubber crawler unit 44a, as well as the insertion hole 45a' and the through hole 46a' of the rubber crawler unit 44a'. A connecting bar 47 having pin holes 48 on both ends is inserted into the insertion hole 45a', the through hole 46a, the through hole 46a' and the insertion hole 45a in order. Washers 49 are put on both ends of the connecting bar 47, and pins 50 are driven in the pinholes 48, thereby fixing the connecting bar 47 not to come off. Therefore, the following rubber crawler unit is connected to an adjoining rubber crawler unit by inserting the connecting bar 47 in the insertion hole 45b and the through hole 4b.

Figure 66:
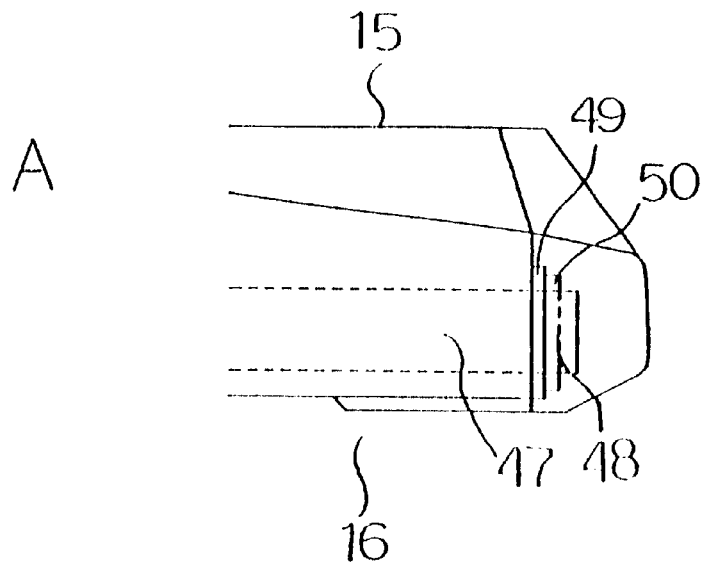
FIG. 66A is a principal part side view of a fixed part of a connecting bar of the rubber crawler unit of the 13th example.
FIG. 66B is one of another embodiment 1.
FIG. 66C is one of another embodiment 2.
Figure 66:
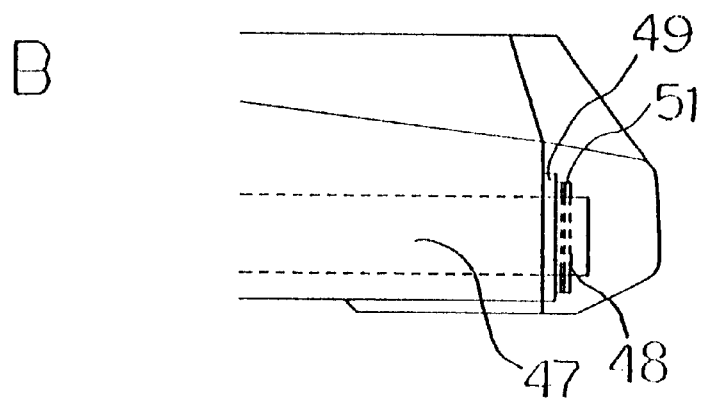
Figure 66:
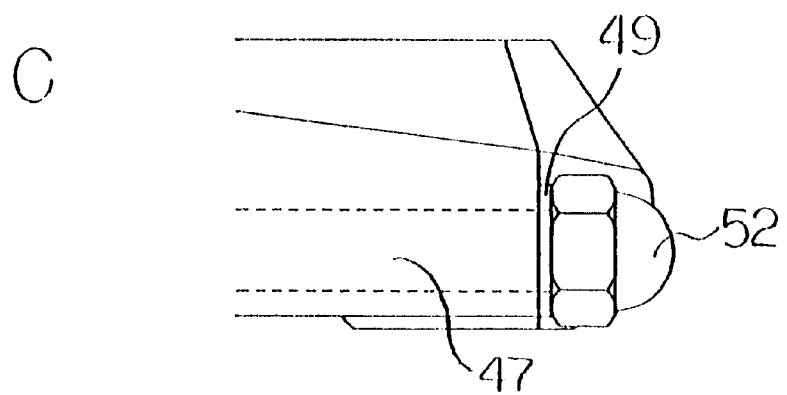

Next, FIG. 66A is a principal part front view of a fixed part of the connecting bar 47 of the 13th example. As shown in FIG. 66A, the pinhole 48 is provided to the end of the connecting bar 47. A washer 49 is put on the pinhole 48 in the crawler width direction, and the pin 50 is driven therein, thereby fixing the connecting bar 47 not to come off.

FIGS. 66B and 66C respectively show other methods for fixing the connecting bar 47. In FIG. 66B, the washer 49 is put on the connecting bar 47, and a rolling pin 51 is driven in the pinhole 48, thereby fixing the connecting bar 47 not to come off. In FIG. 66C, a screw is engraved on both ends of the connecting bar 47, and a ball head lock nut 52 is attached and fixed thereon.

The connecting bar 47 is not limited to fixation shown in the above-mentioned example, but it must be fixed so as not to come off during the crawler traveling.

Figure 67:
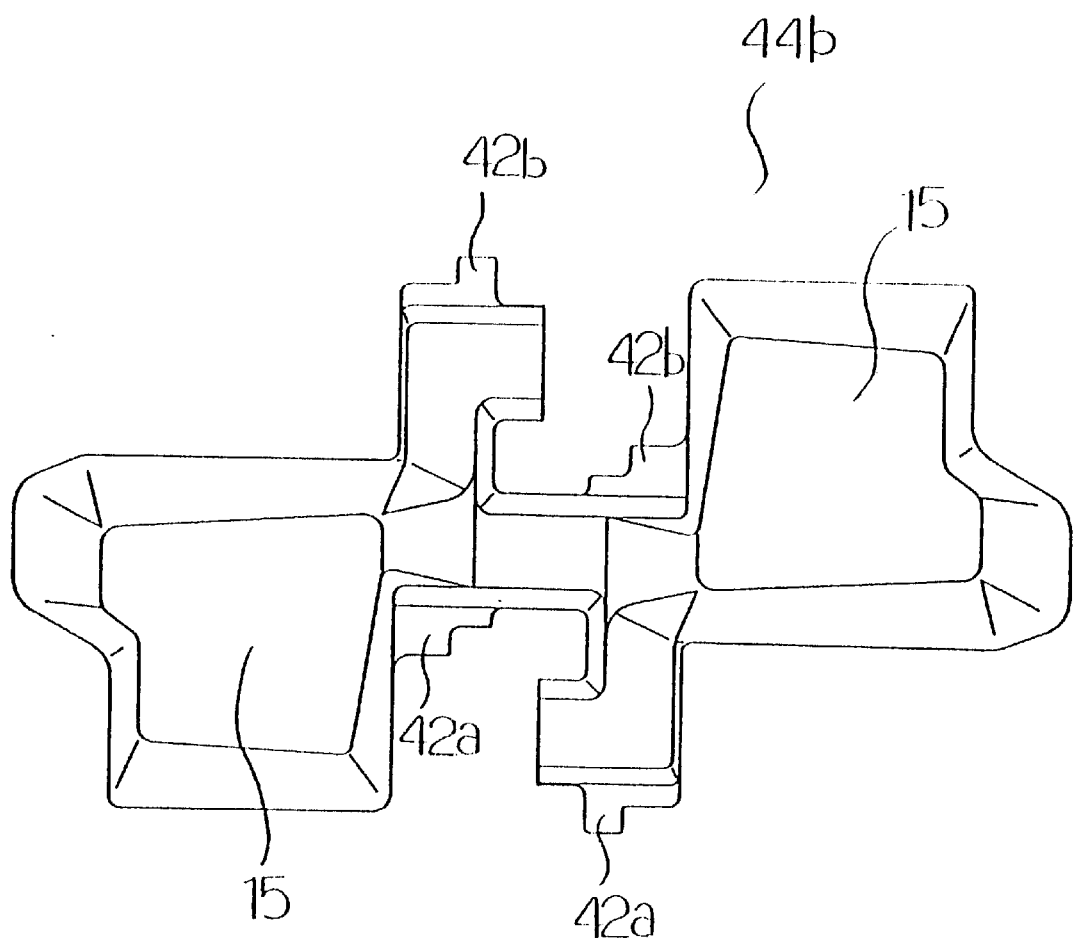
FIG. 67 is a plan view showing an outer circumference side of a rubber crawler unit of the 14th example.
Figure 68:
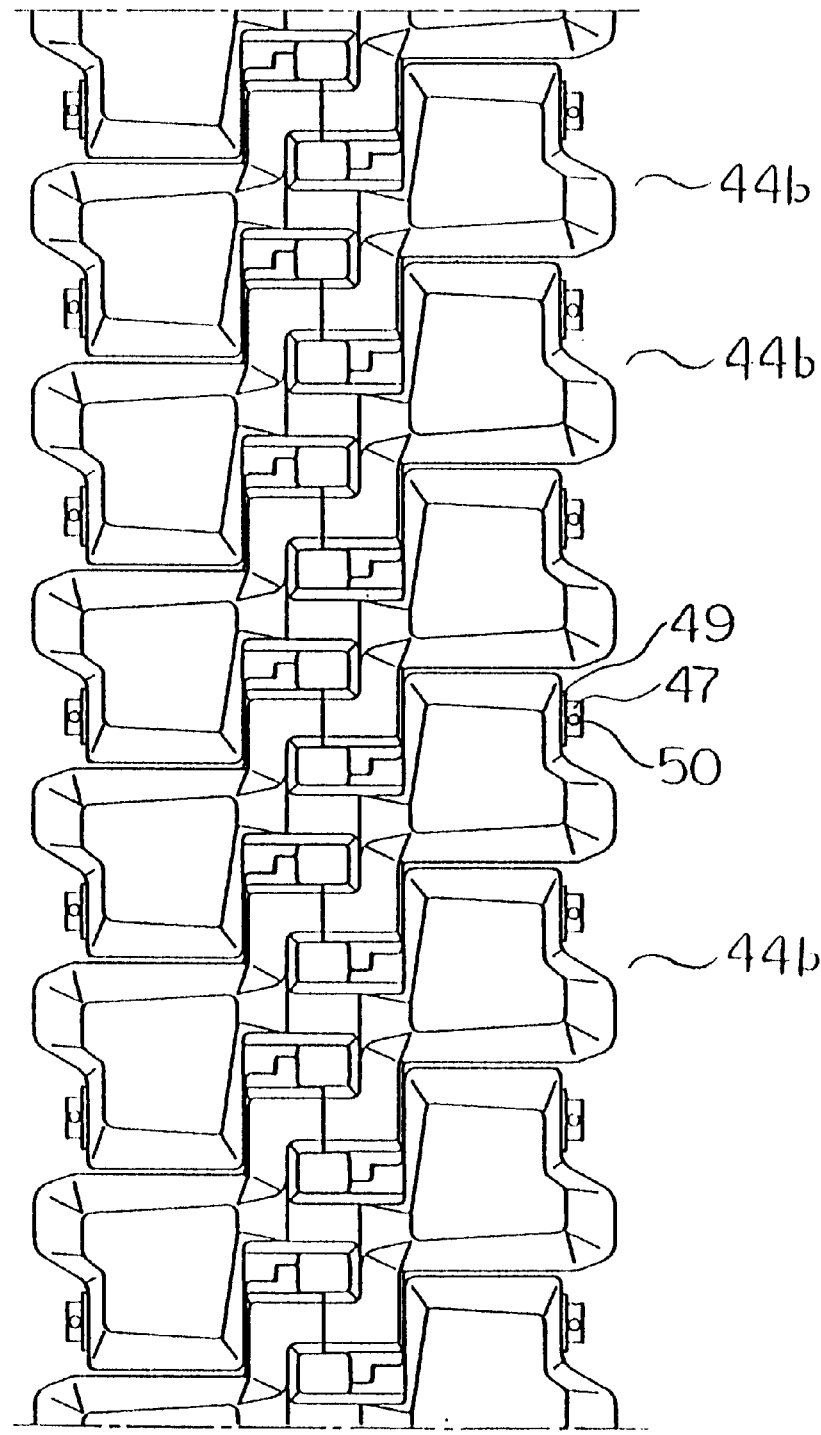
FIG. 68 is one showing an outer side of the rubber crawler connecting rubber crawler units of the 14th example to be made into endless.

The 14th example of this invention is explained using FIGS. 67 and 68. FIG. 67 is a plan view showing the tread side of a rubber crawler unit 44b. FIG. 68 is a plan view showing the tread side of an endless rubber crawler that is formed by connecting the rubber crawler units 44b.

The 14th example of this invention is concerned to a rubber crawler unit of a minimum unit, which comprises two generally parallelepiped blocks 5, one bar 4 and two connecting ring 21 embedded in the rubber crawler unit 44b. The adjacent rubber crawler units 44b are connected to each other so as to form an endless rubber crawler shown in FIG. 68.

Figure 69:
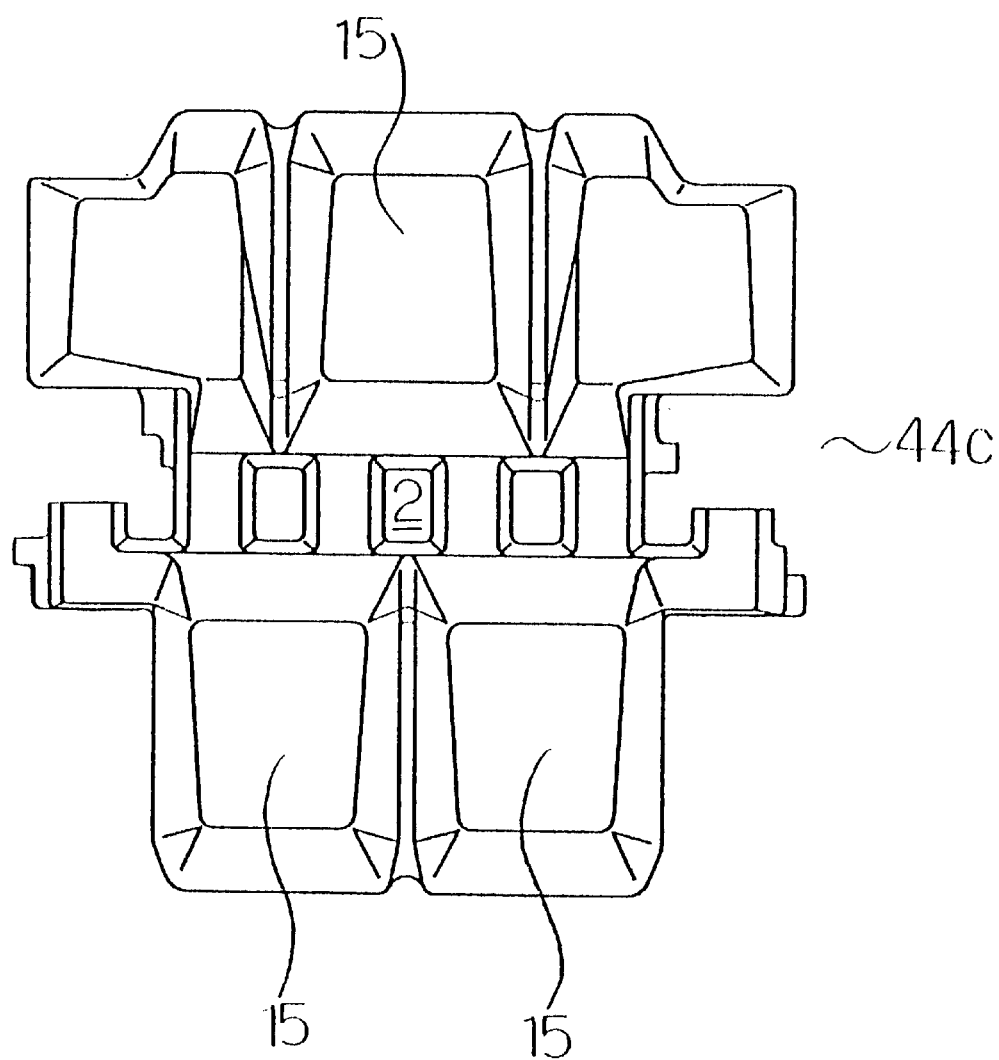
FIG. 69 is a plan view showing an outer circumference side of a rubber crawler unit of the 15th example.
Figure 70:
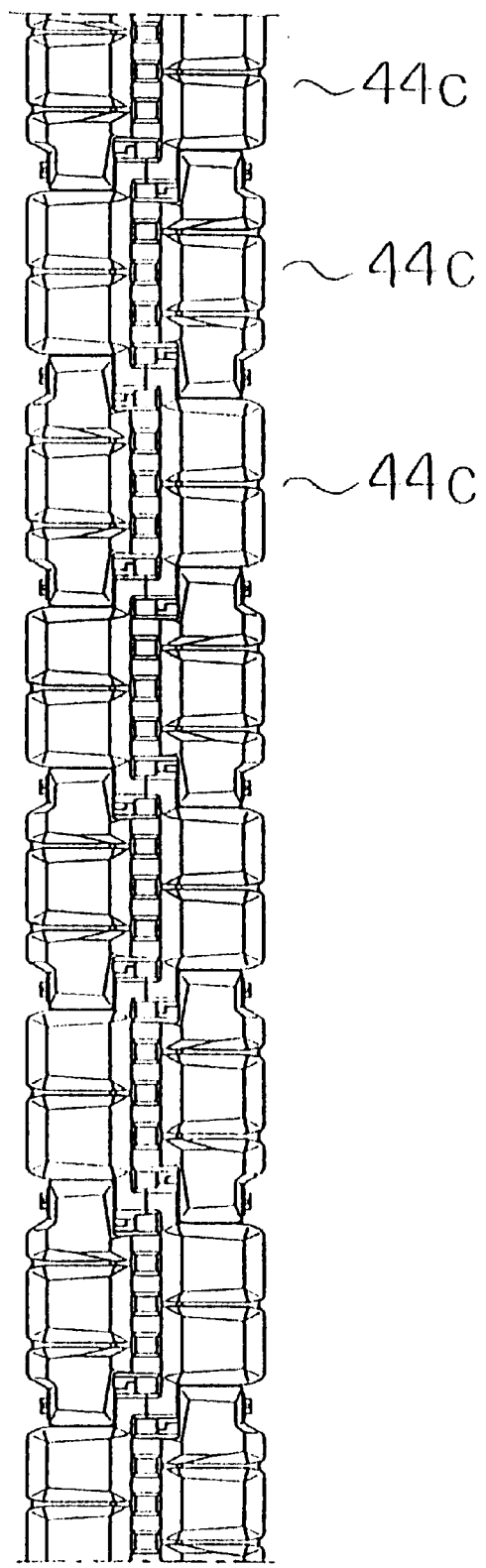
FIG. 70 is one showing an outer circumference side of the rubber crawler connecting rubber crawler units of the 15th example to be made into endless.

The 15th example of this invention is explained using FIGS. 69 and 70. FIG. 69 is a plan view showing the tread side of a rubber crawler unit 44c, and FIG. 70 is a plan view showing the tread side of an endless rubber crawler that is formed by connecting the rubber crawler units 44c.

The 15th example of this invention is another embodiment of the rubber crawler unit, which comprises five generally parallelepiped blocks 5, four bars 4 and five connecting rings 21 embedded in the rubber crawler unit 44c.

And the adjacent rubber crawler units 44c are connected so as to form an endless rubber crawler shown in FIG. 70.

Figure 71:
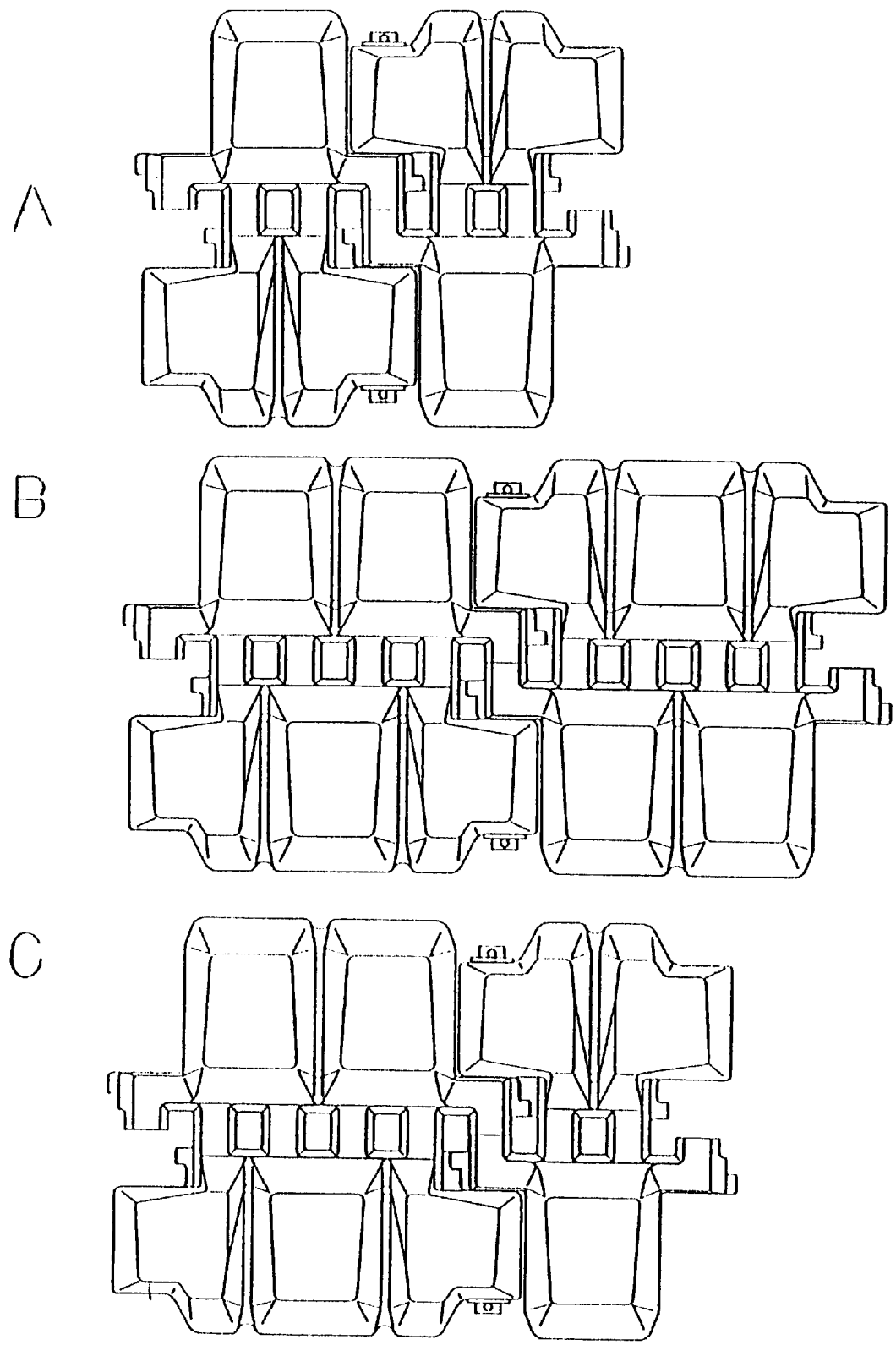
FIG. 71A is a plan view showing an outer circumference side connecting the rubber crawler units of the 13th example, FIG. 71 B is one showing an outer circumference side of the rubber crawler units of the 15th example.
FIG. 71C is one showing an outer circumference side connecting the rubber crawler unit of the 13th example and the rubber crawler unit of the 15th example.

The endless rubber crawler can be formed by connecting not only one kind of rubber crawler unit shown in FIG. 71A or FIG. 71B but also by connecting different kinds of rubber crawler units, as is shown in FIG. 71C. In this case, the rubber crawler units are suitably chosen and connected in accordance with the needed circumferential length of the rubber crawler.

Figure 72:
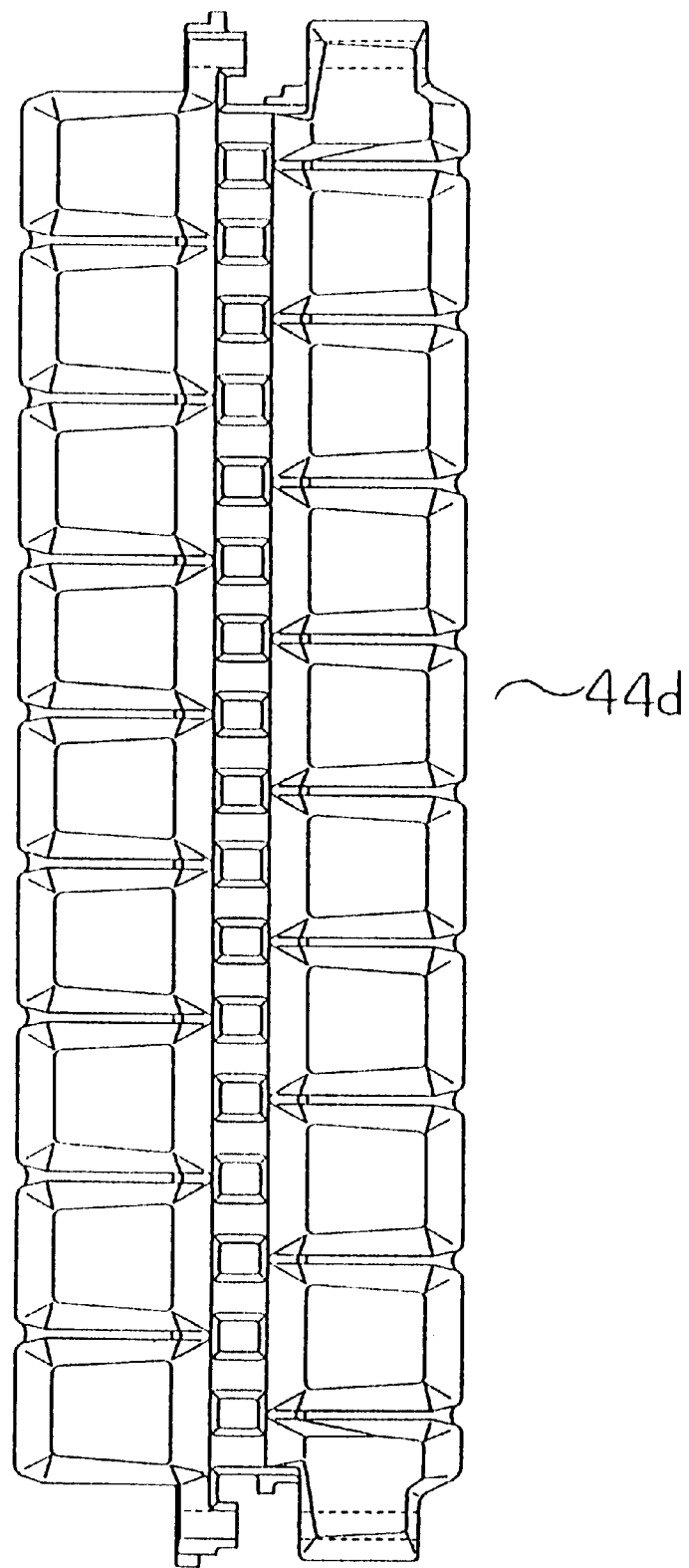
FIG. 72 is a plan view showing an outer circumference side of a long rubber crawler unit.

Moreover as shown in FIG. 72, a long rubber crawler unit 44d may be formed. Then, an endless rubber crawler is formed by connecting two to four long rubber crawler units 44d, or by connecting both ends of one long rubber crawler unit 44d.

Figure 73:
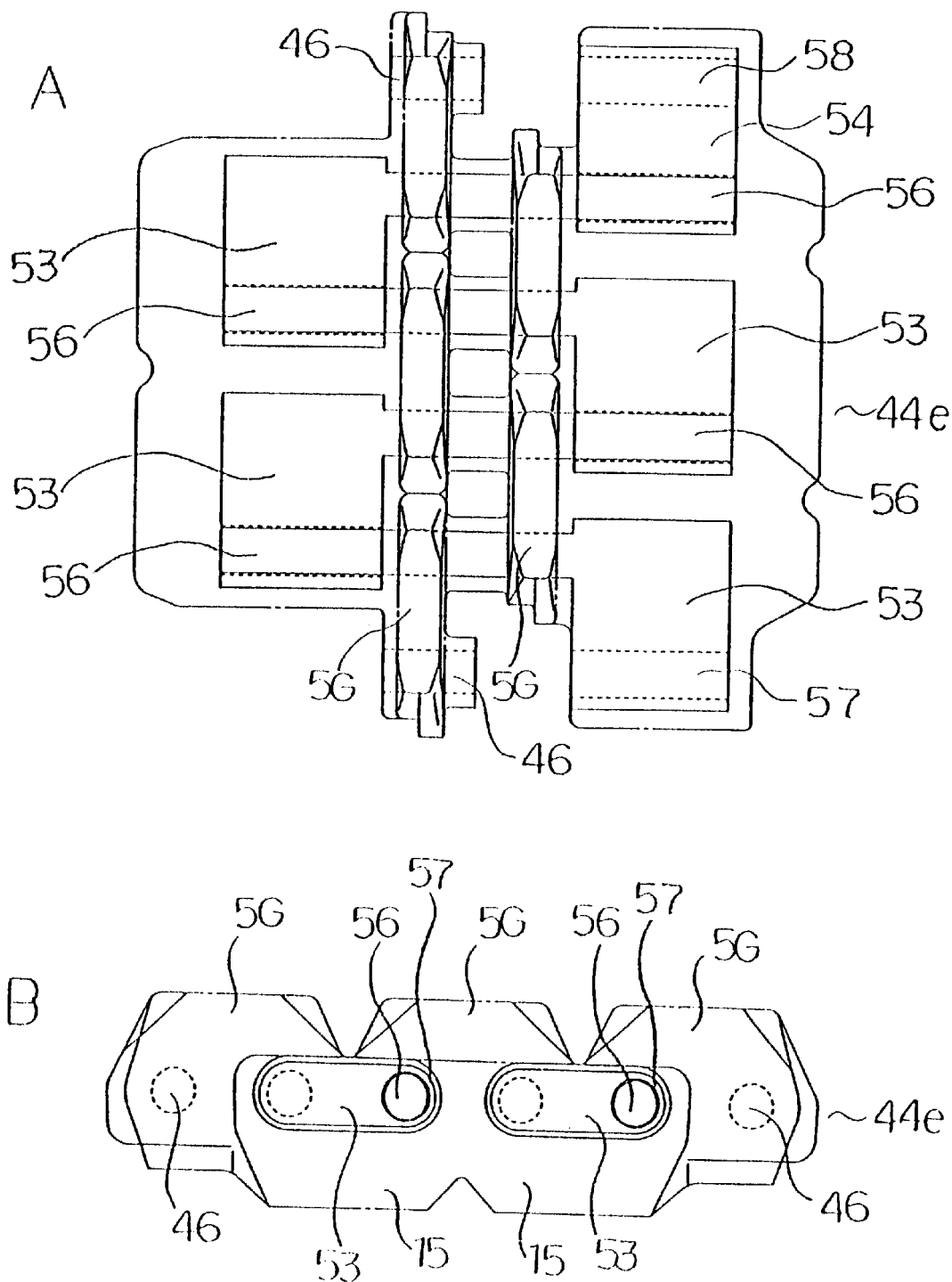
FIG. 73A is a perspective plan view showing an inner circumference side of a rubber crawler unit of the 16th example.
FIG. 73B is a perspective side view thereof.
Figure 74:
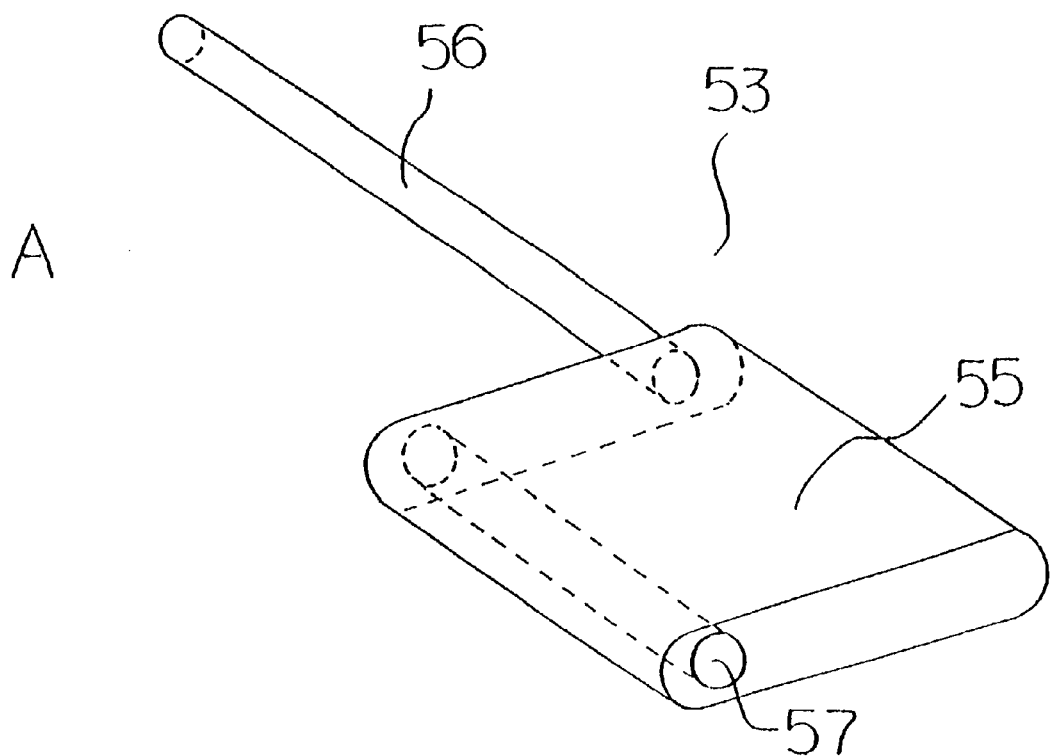
FIG. 74A is a perspective view showing a flag bar.
FIG. 74B is one of a connecting bar wing.
Figure 74:
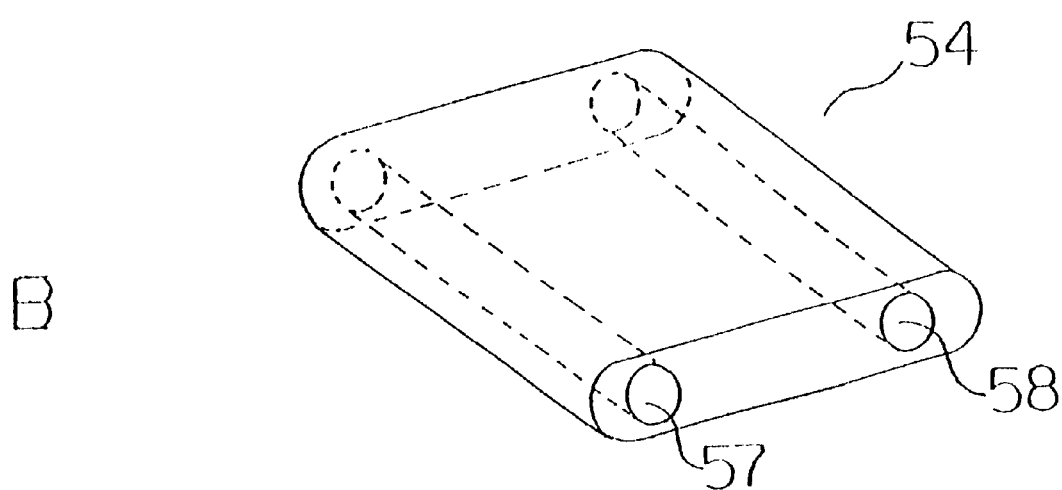
Figure 75:
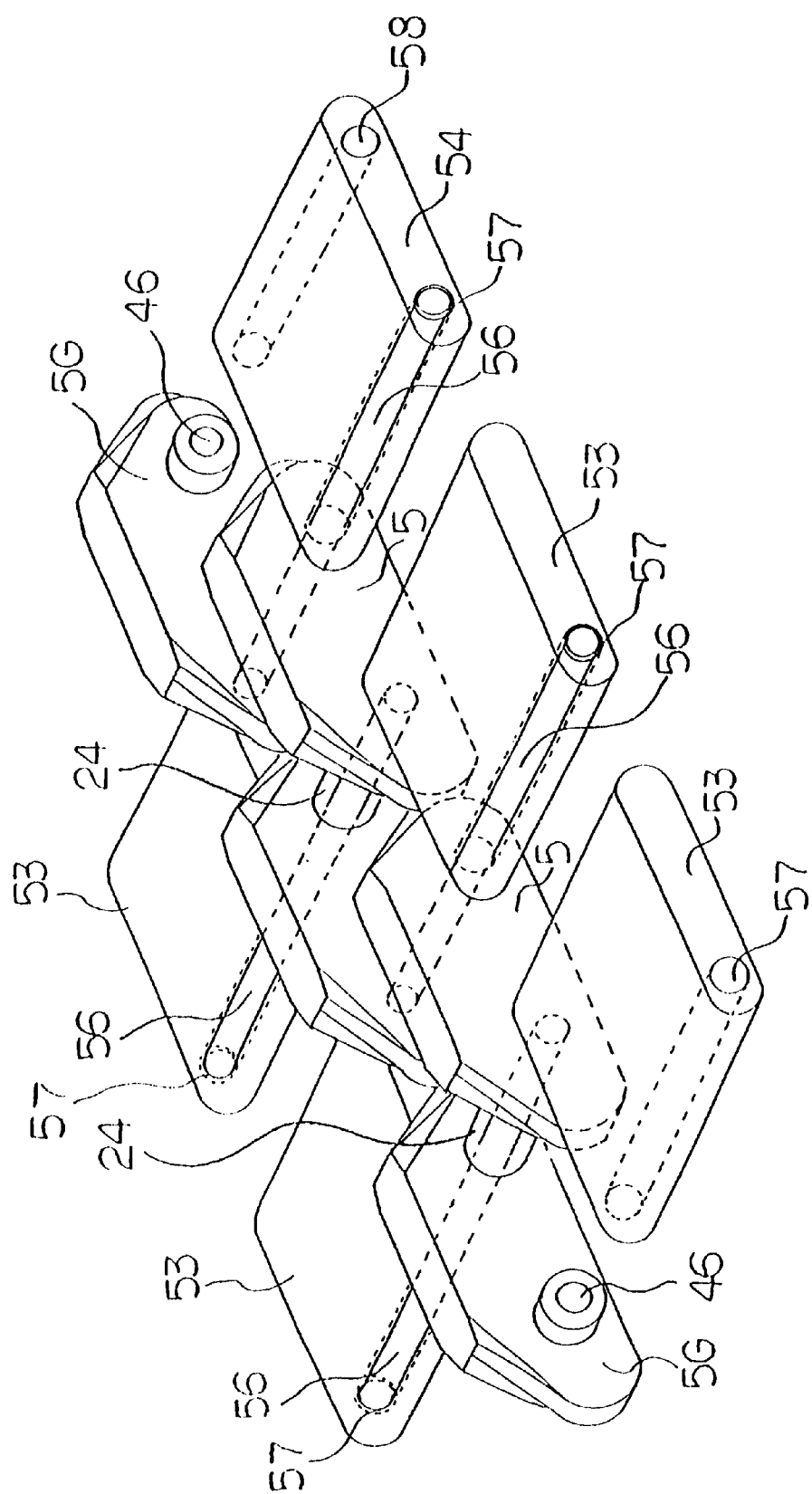
FIG. 75 is a combination view of the flag bar, the generally paralleled block and the connecting bar wing, which are embedded in the rubber crawler unit of the 16th example.

The 16th example of this invention is explained using FIGS. 73A and 73B, FIGS. 74A and 74B, and FIG. 75. FIG. 73B is a perspective plan view of an inner circumference side of a rubber crawler unit 44e, and FIG. 73B is a perspective side view thereof. FIG. 74A and FIG. 74B are perspective views showing a flag bar 53 and a connecting bar wing 54 embedded in the rubber crawler unit 44e, respectively. FIG. 75 is a combination view showing the flag bar 53, a generally parallelepiped block 5G and the wing 54.

The flag bar 53 embedded in the rubber crawler unit 44e has a bar wing 55 having a breadth larger than the through hole-through hole interval of the adjacent generally parallelepiped blocks, on one side of the bar corresponding to an outside of the generally parallelepiped block in the crawler width direction. As shown in FIG. 75, a bar wing through hole 57, in which a bar part 56 of the flag bar 53 is to be inserted, is provided on a portion of the bar wing 55, which is equivalent to the position of the through hole 9 of the generally parallelepiped block 5G. When inserting the bar part 56, which is inserted in the through hole 9 of the adjoining generally parallelepiped block, into the through hole 57 similarly, the flag bar 53 is connected by the generally parallelepiped block and the bar. Therefore, the flag bar 53 is connected still more firmly.

Moreover, the connecting bar wing 54 needs to be arranged on one end of the rubber crawler unit 44e. The connecting bar wing 54 has the bar wing through hole 57 and a connecting bar wing through hole 58. Using the connecting bar wing through hole 58 and the connecting generally parallelepiped through hole 46, the one end is connected to the adjoining rubber crawler unit 44 with the connecting bar 47. Besides, using the bar wing through hole 57 and the connecting generally parallelepiped through hole 46, the other end is connected to the adjoining rubber crawler unit 44 with the connecting bar 47. In this way, the endless rubber crawler can be formed.

Figure 76:
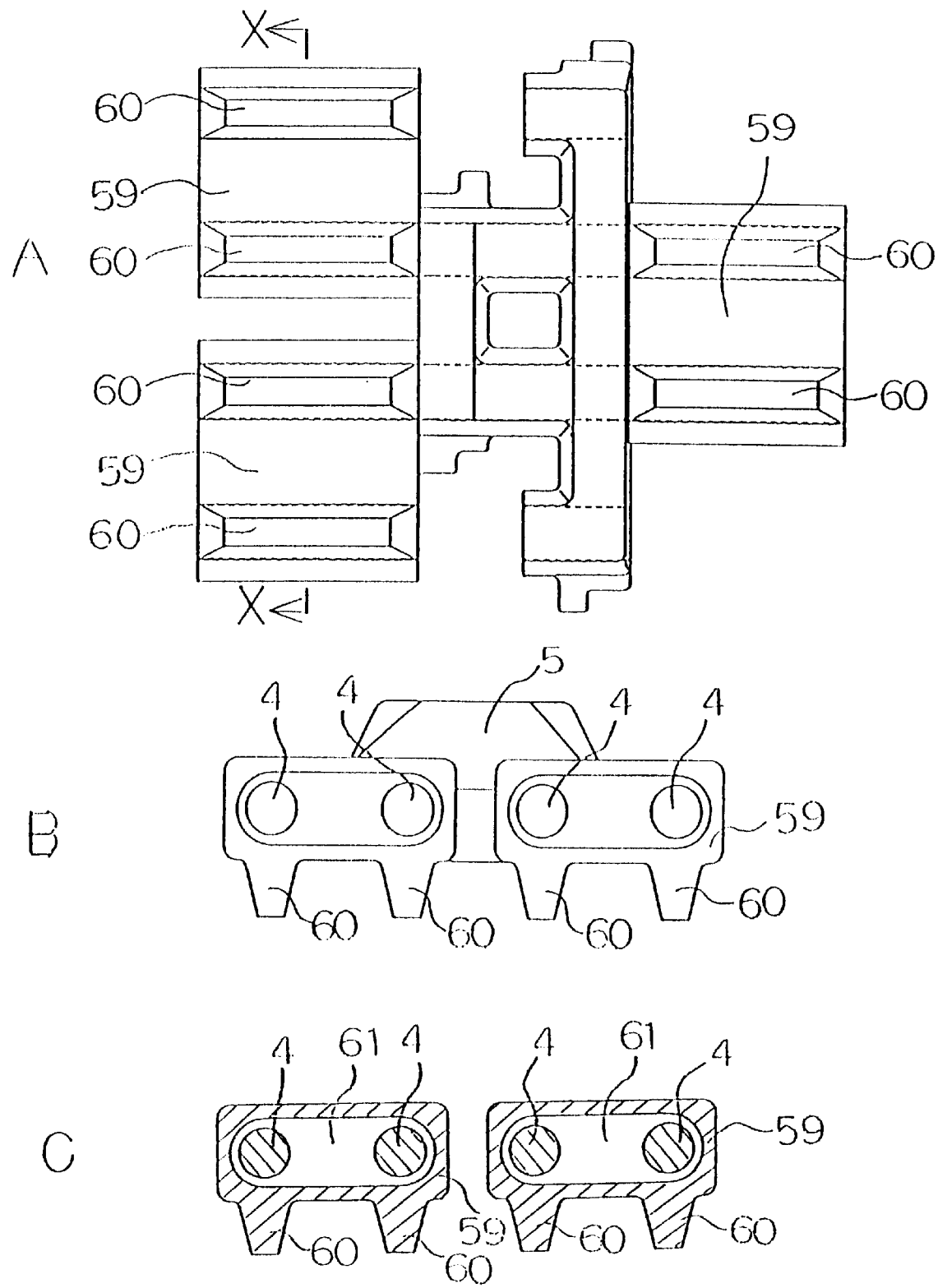
FIG. 76A is a plan view showing an outer circumference side of the rubber crawler unit of the 17th example.
FIG. 76B is a side view thereof.
FIG. 76C is an X—X line sectional view in FIG. 76A.
Figure 77:
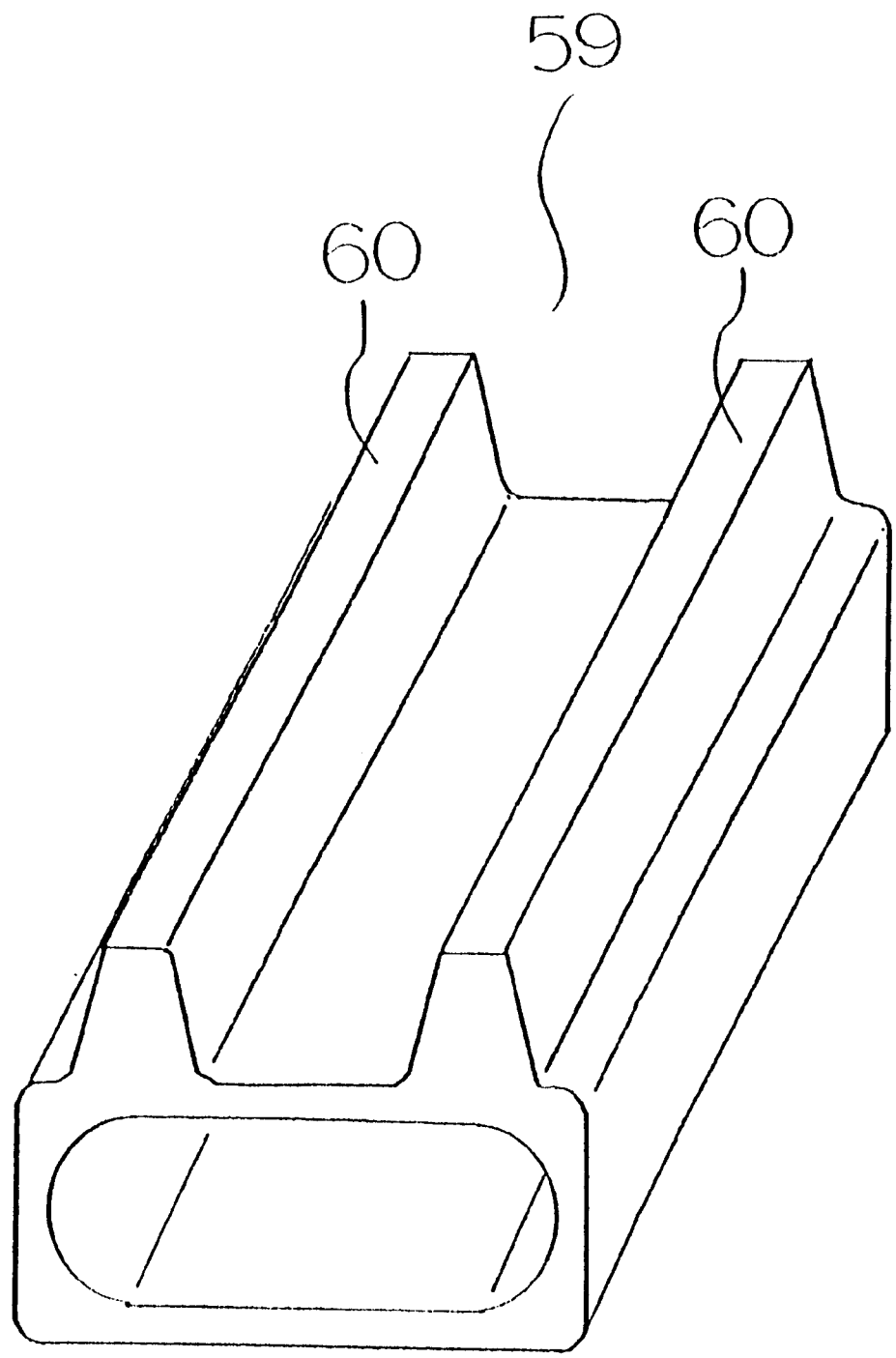
FIG. 77 is a perspective view of a pipe iron lug.

The 17th example of this invention is explained using FIGS. 76A to 76C, and FIG. 77. FIG. 76A is a plan view showing the outer circumference side of a rubber crawler unit 44f, FIG. 76B is a side view, and FIG. 76C is an X—X line sectional view. FIG. 77 is a perspective view of a pipe iron lug.

The 17th example shows a metal pipe iron lug 59 integrally formed from the above-mentioned rubber lug 15 and a metal iron lug 60. As shown in FIG. 76C, rubber 61 is filled in a gap between the bar 4 and the pipe iron lug 59 to be pasted up.

Accordingly, the above-mentioned rubber crawler can be used on irregular ground or rough places where the conventional rubber crawler is hardly used and an iron crawler is used. Here, since the conventional iron crawler is connected with links and pins, noises such as creaking sound are made. In this example, rubber is filled in the gap between the generally parallelepiped block and the bar, thereby preventing the noises such as creaking sound etc.

Figure 78:
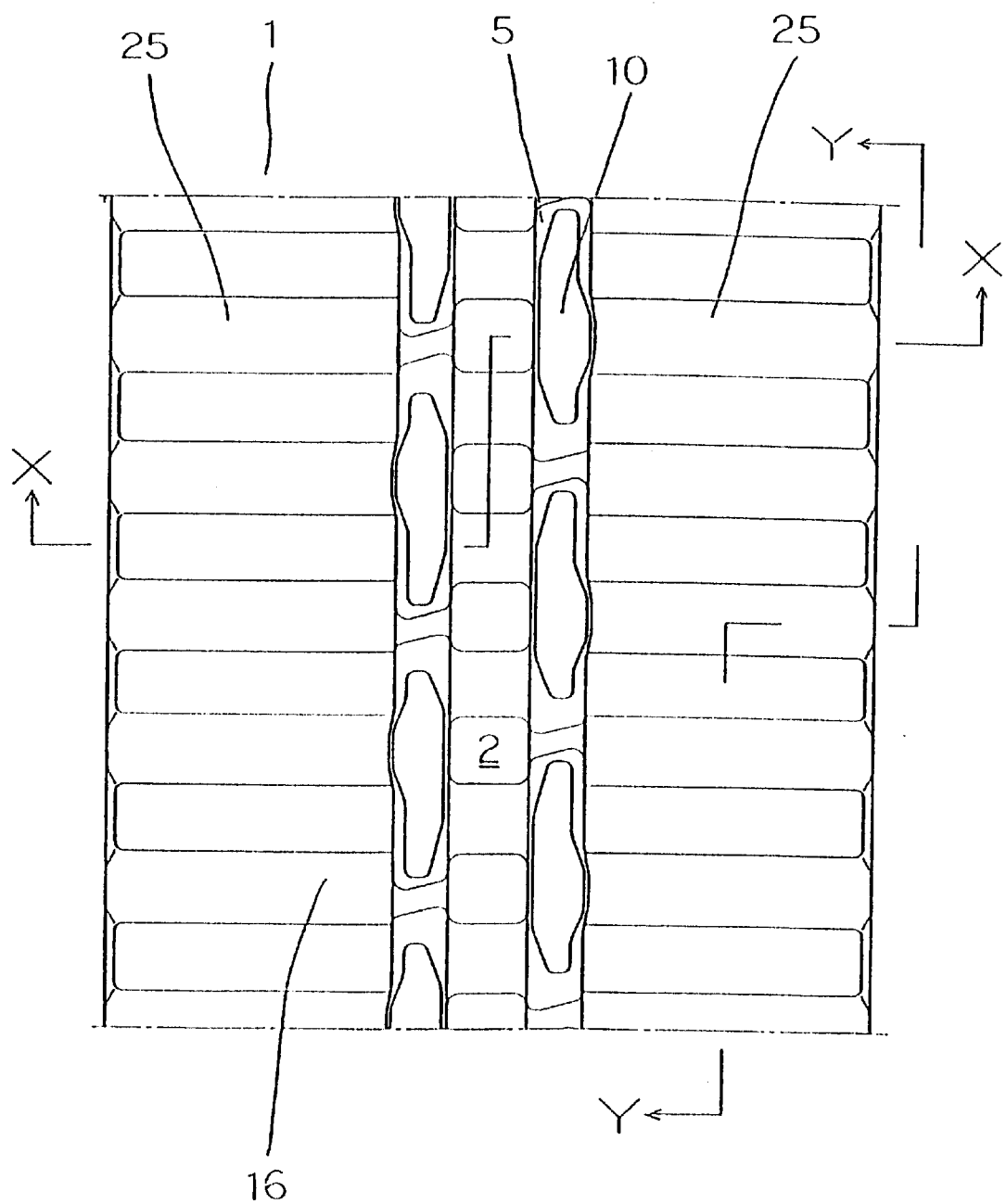
FIG. 78 is a plan view showing an inner circumference side of a rubber crawler of the 18th example.
Figure 79:
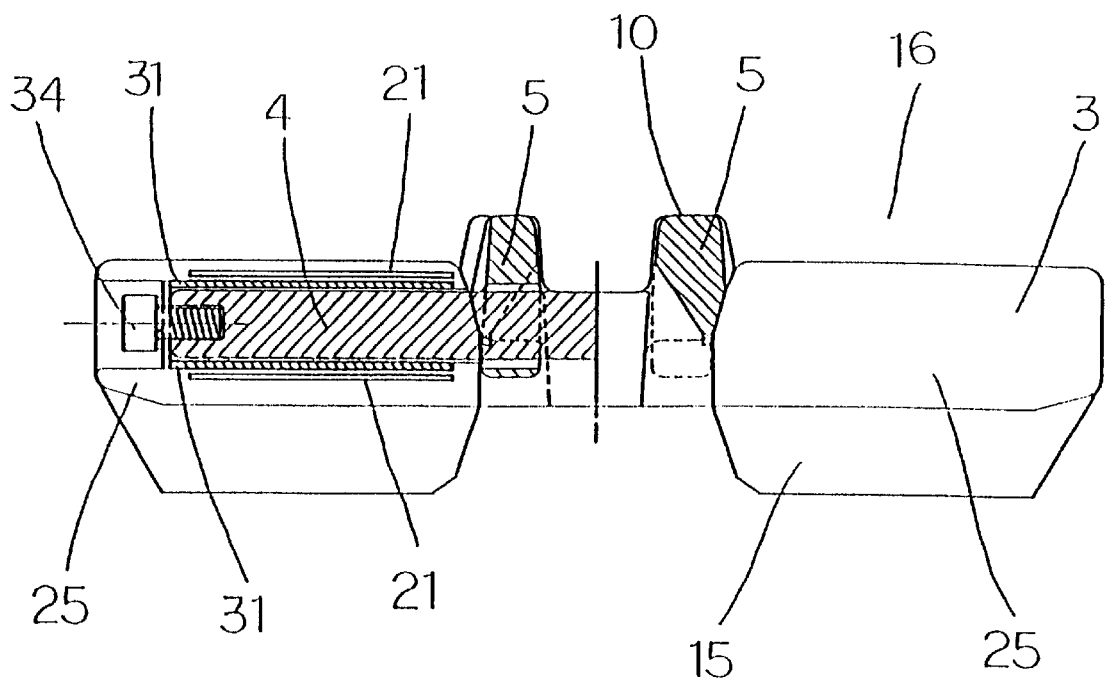
FIG. 79 is an X—X line sectional view therein.
Figure 80:
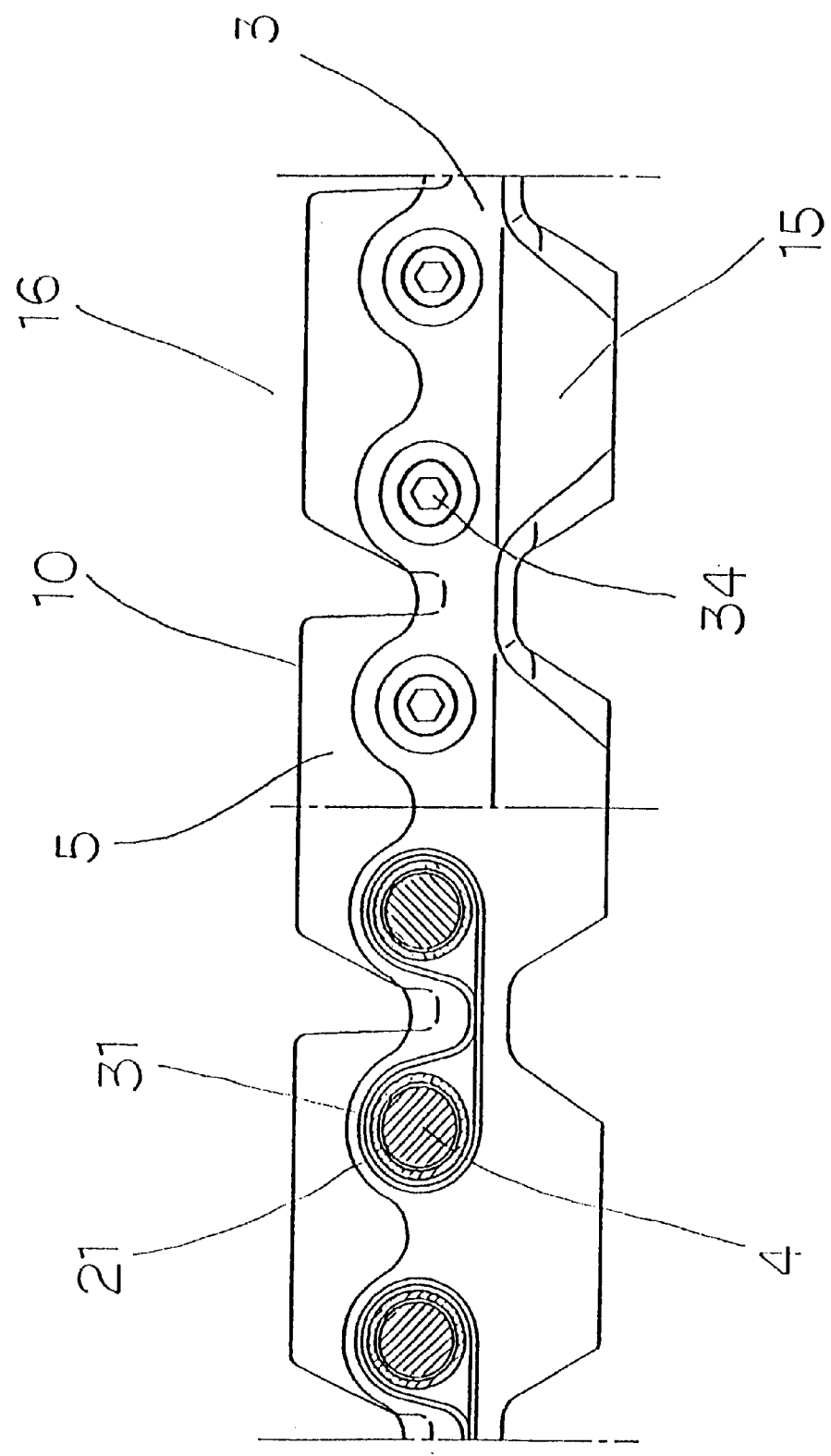
FIG. 80 is a Y—Y line sectional view therein.
Figure 81:
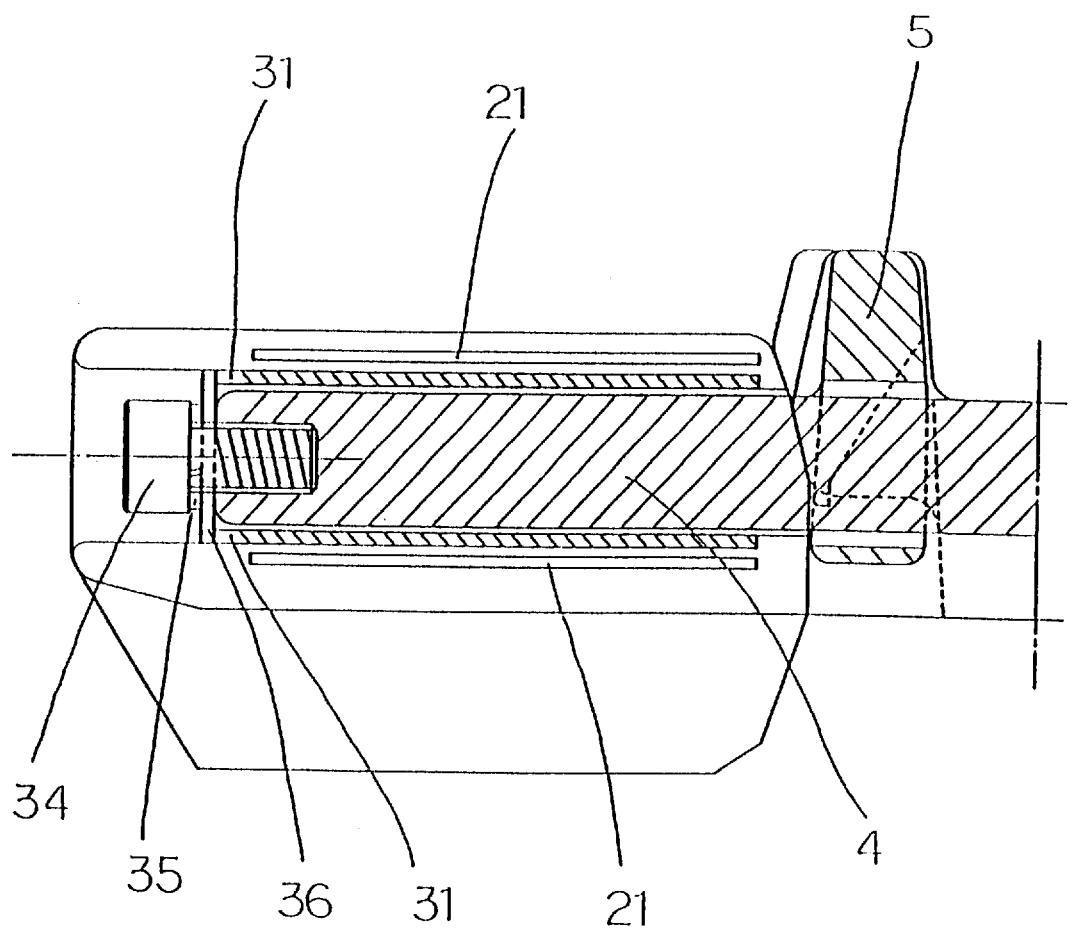
FIG. 81 is a fragmentary enlarged view of FIG. 79.
Figure 82:
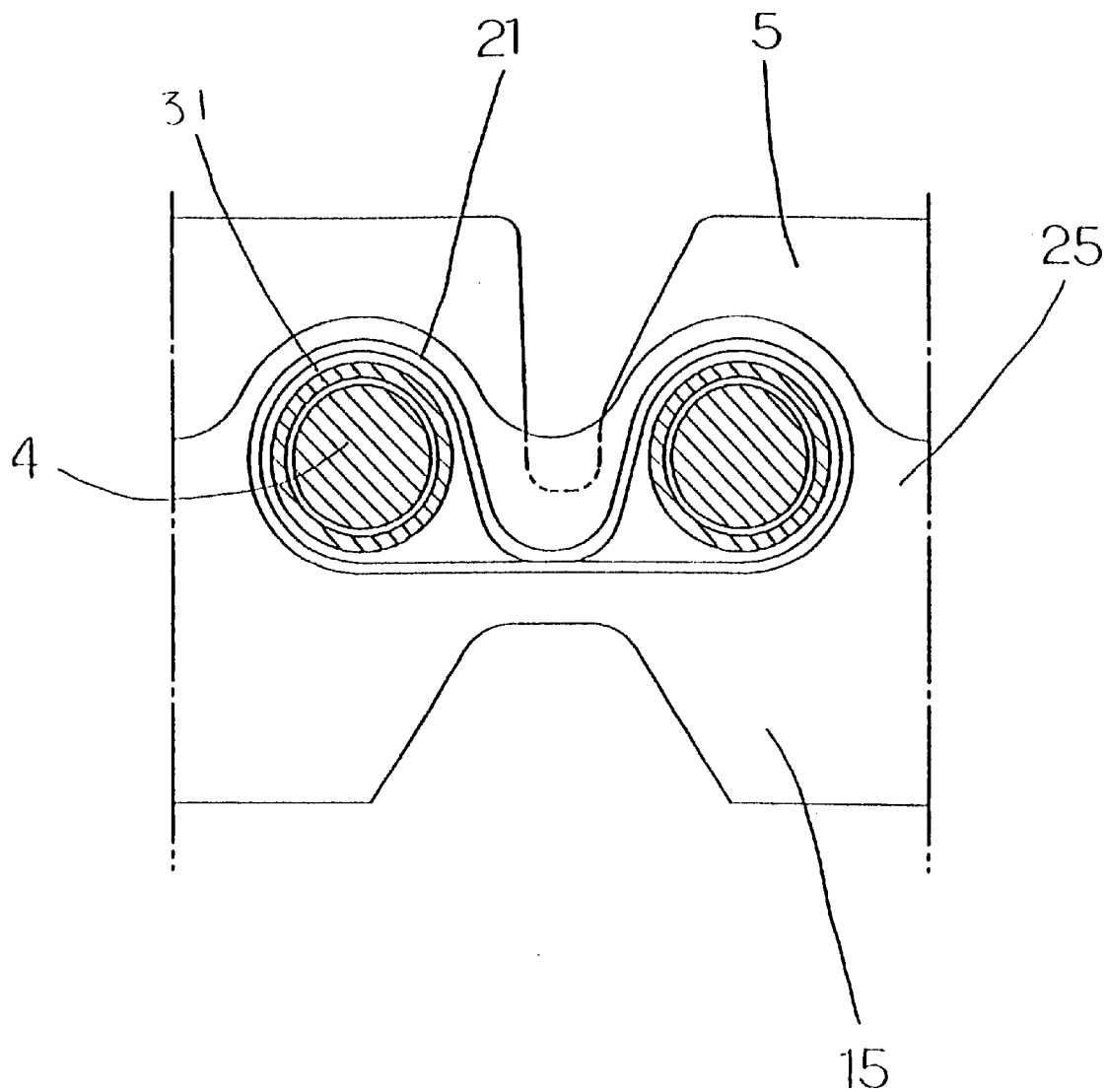
FIG. 82 is a fragmentary enlarged view of FIG. 80.

FIGS. 78 to 82 show the 18th example of this invention. FIG. 78 is a plan view showing an inner circumference side of a rubber crawler of this example. FIG. 79 is an X—X line sectional view in FIG. 78, and FIG. 80 is a Y—Y line sectional view in FIG. 78. FIG. 81 is a fragmentary enlarged view in FIG. 79, and FIG. 82 is a fragmentary enlarged view in FIG. 80.

In the 18th example, a pipe 31 is put on the bar 4 outside the generally parallelepiped block 5 in the crawler width direction, and is pasted up with the rubber of the rubber crawler body 3.

Moreover, a female screw is provided on the end of the bar 4 to fix a bolt. A band 25, which is provided to the outside of the generally parallelepiped block 5 in the crawler width direction, is attached to the bar 4 with a hexagon socket head cap screw 34 through a washer 36. In addition, in FIG. 81, 35 is a spring washer.

Figure 83:
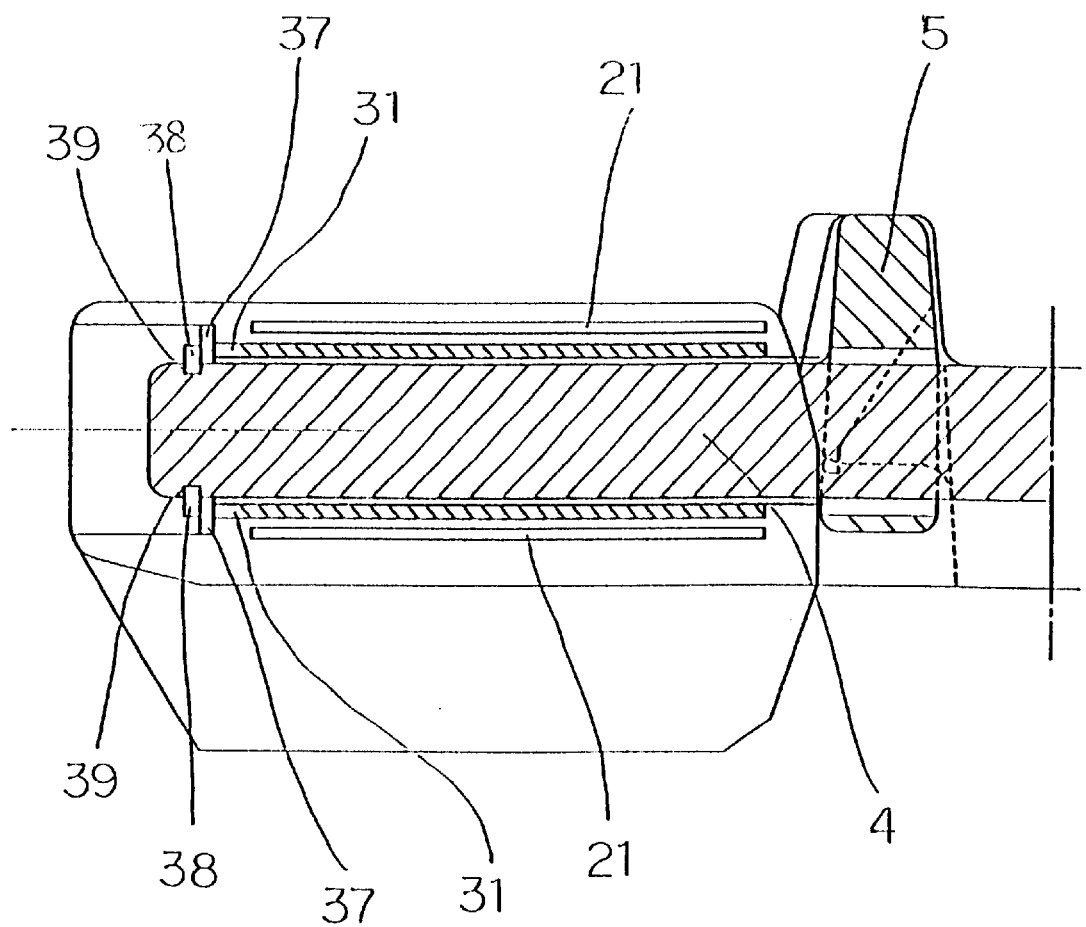
FIG. 83 is a sectional view of another embodiment of the rubber crawler of the 18th example.

According to the above-mentioned composition, the band 25 can be detached and attached easily y A method to attach this band 25 to the bar 4 is not limited to this example, and the other example is shown in FIG. 83.

In FIG. 83, a groove 39 is provided on the end of the bar 4 to fix a C-frame stop ring 38, and the above-mentioned band 25 is attached to the bar 4 with the C-frame stop ring 38 through a washer 37.

Figure 84:
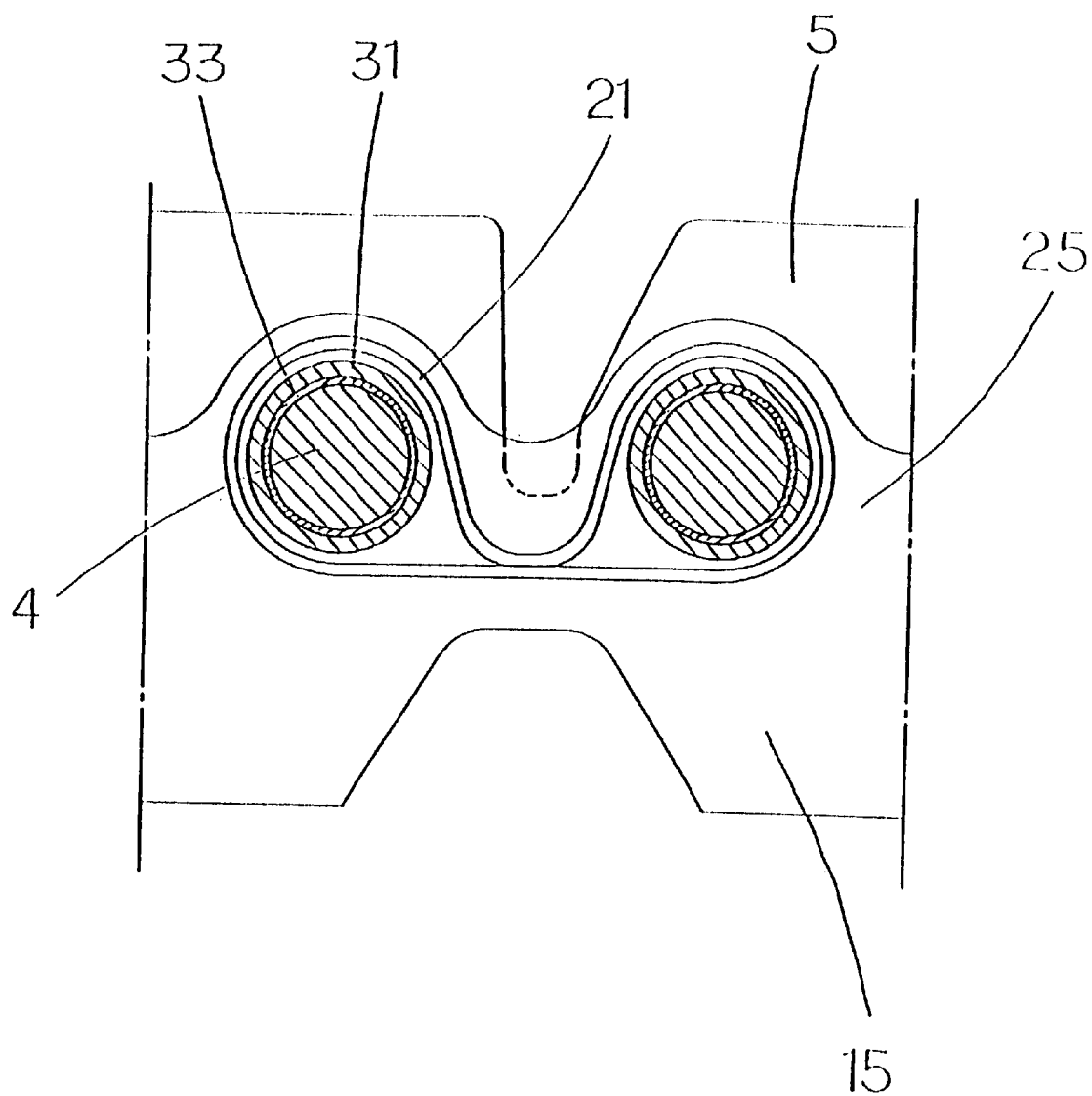
FIG. 84 is a fragmentary sectional view of a rubber crawler of the 19th example.

FIG. 84 is a fragmentary enlarged view of the rubber crawler 1 of the 19th example of this invention. The rubber crawler 1 is formed so that the inner wall of the pipe 31 fitted on the bar 4 in the 18th example is covered with a thin high molecular compound layer 33, such as rubber, epoxy, urea, urethane, and liquefied rubber. Here, the bar 4 is fixed firmly.

Figure 85:
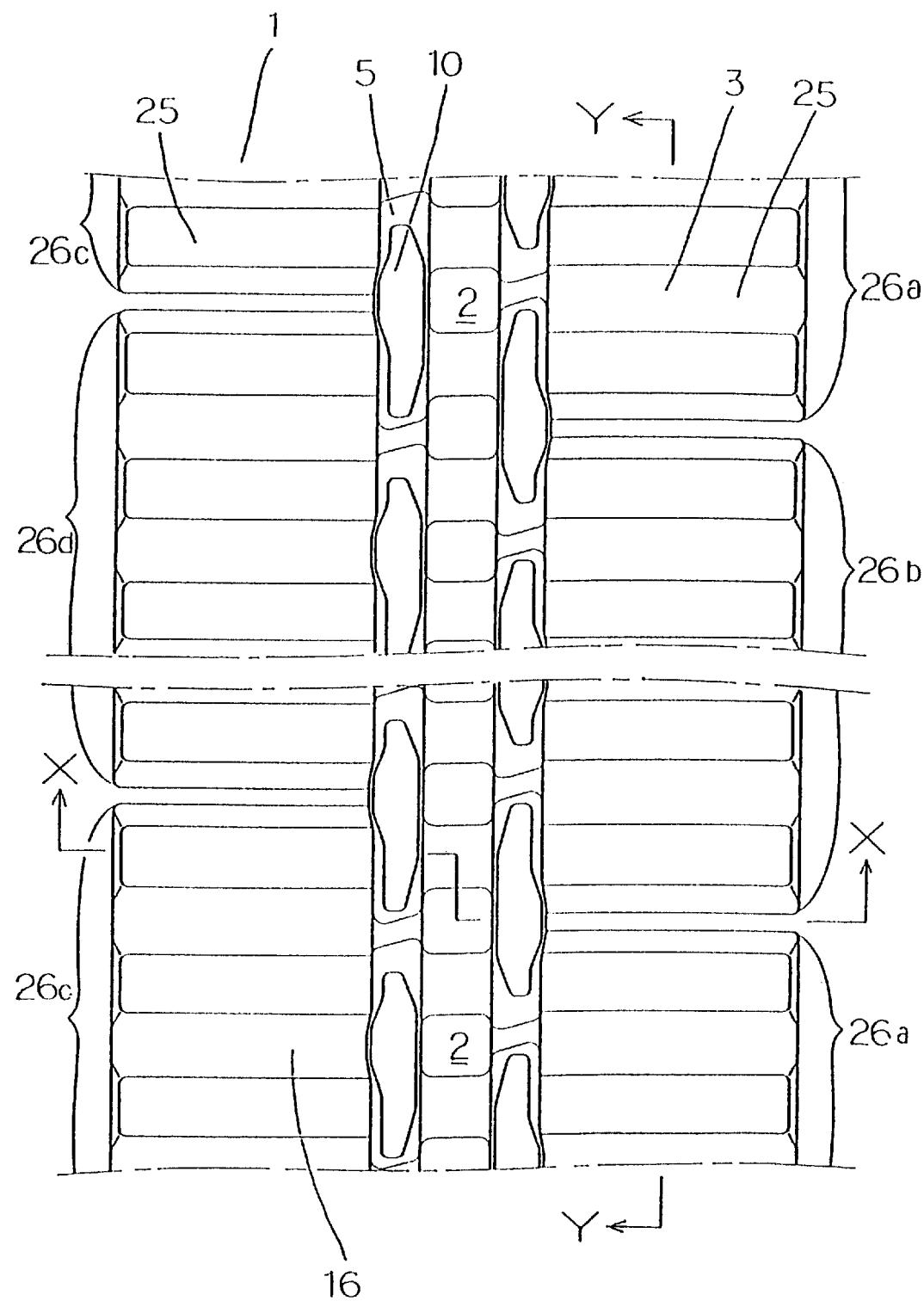
FIG. 85 is a plan view showing an inner circumference side of the rubber crawler of the 20th example.
Figure 86:
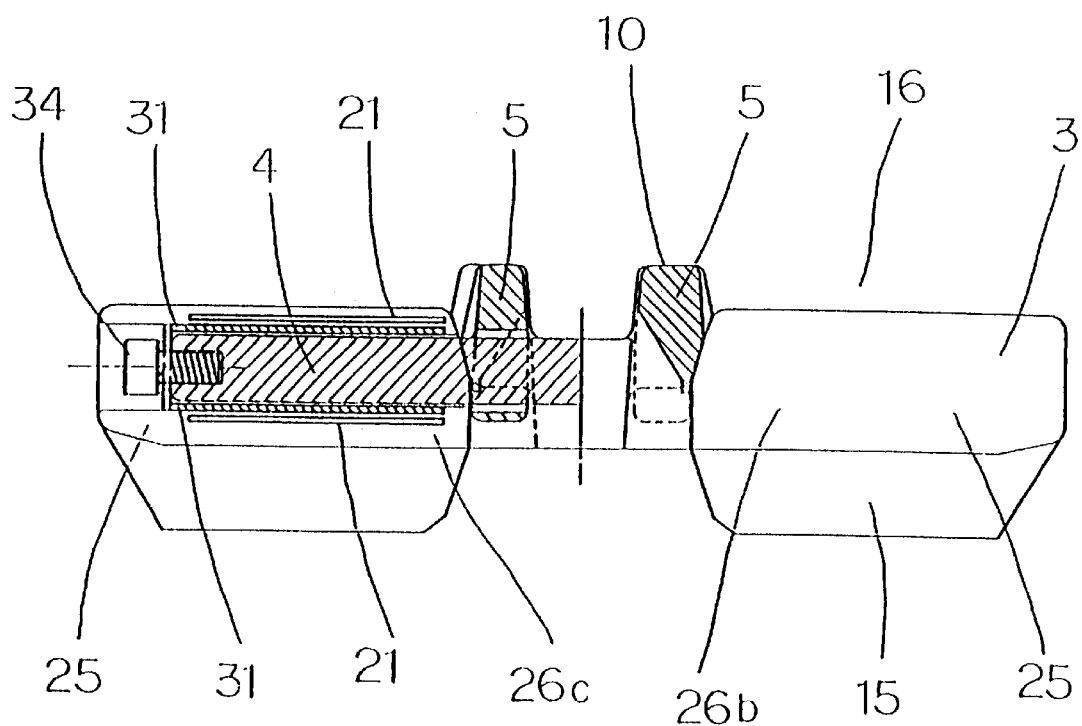
FIG. 86 an X—X line sectional view in FIG. 85, and a FIG. 87 is a Y—Y line sectional view in FIG. 85.
Figure 87:
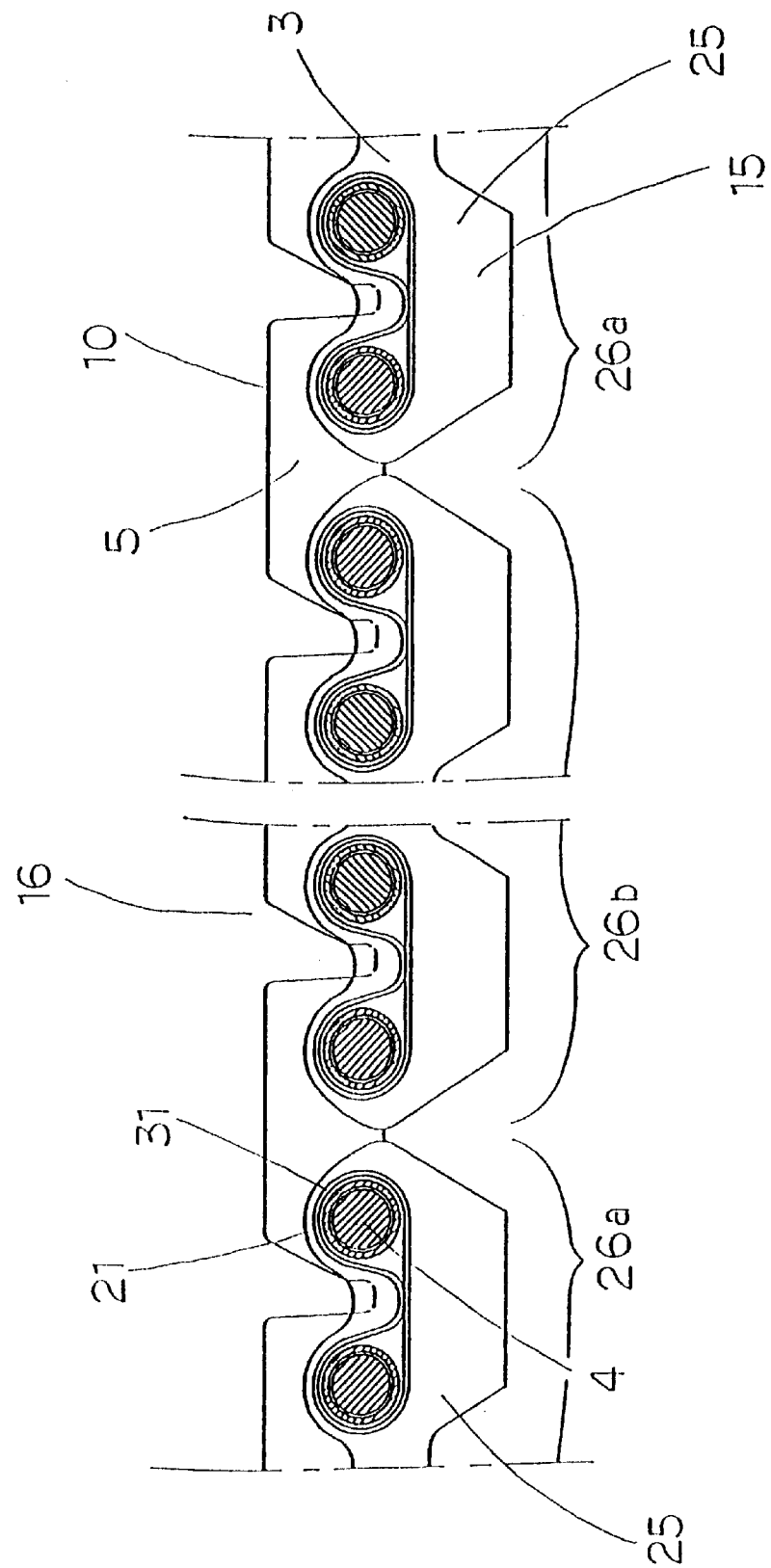
Figure 88:
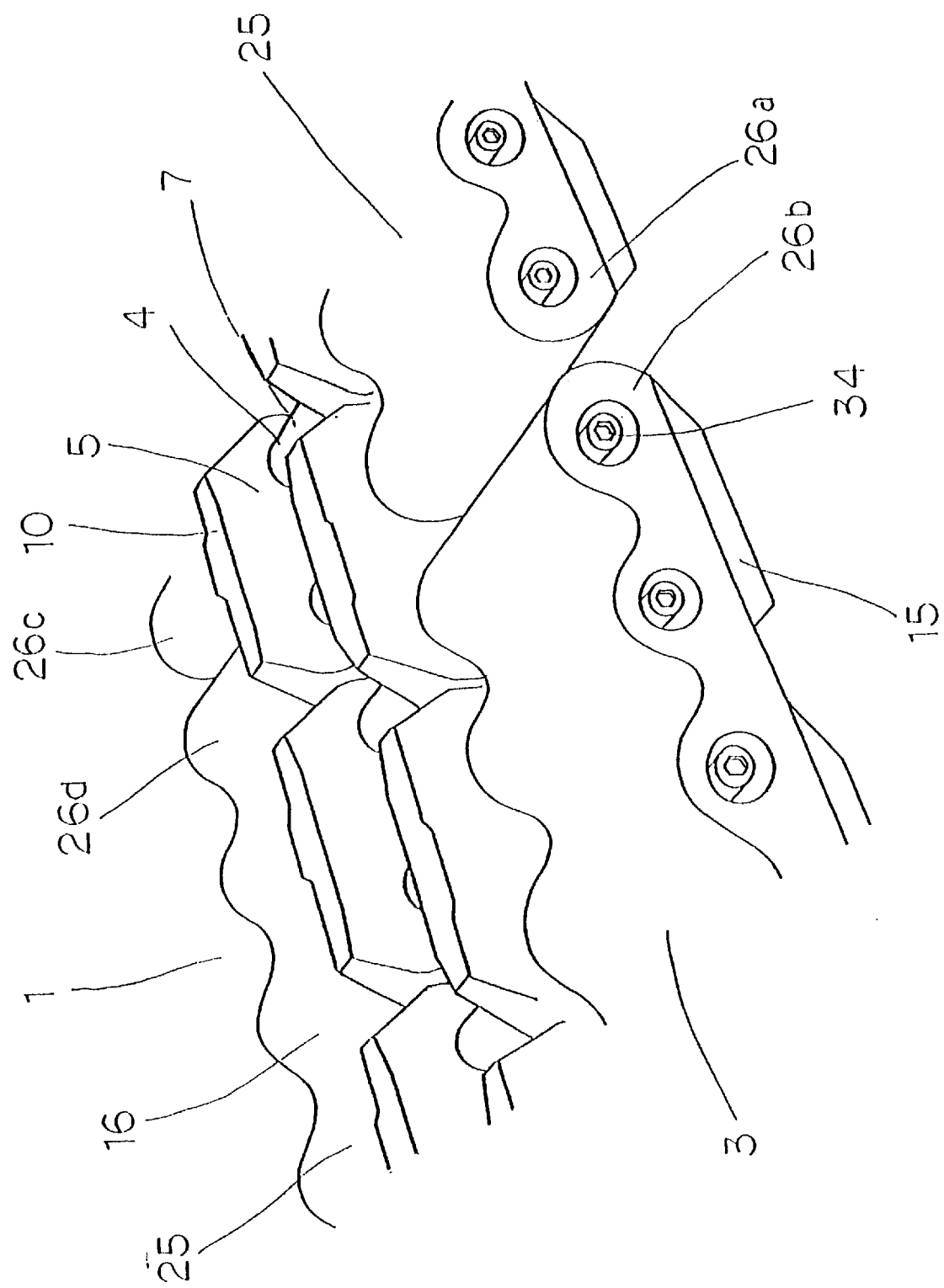
FIG. 88 is a perspective view of the rubber crawler of the 20th example.

FIGS. 85 to 88 show the 20th example of this invention. FIG. 85 is a plan view showing the inner circumference side 16 of a rubber crawler (anti-tread side) of this example. FIG. 86 is an X—X line sectional view in FIG. 85, FIG. 87 is a Y—Y line sectional view in FIG. 85, and FIG. 88 is a perspective view of the rubber crawler.

The 20th example is characterized by dividing the band 25 into two owner end bands 26 in the composition of the 18th example.

Figure 89:
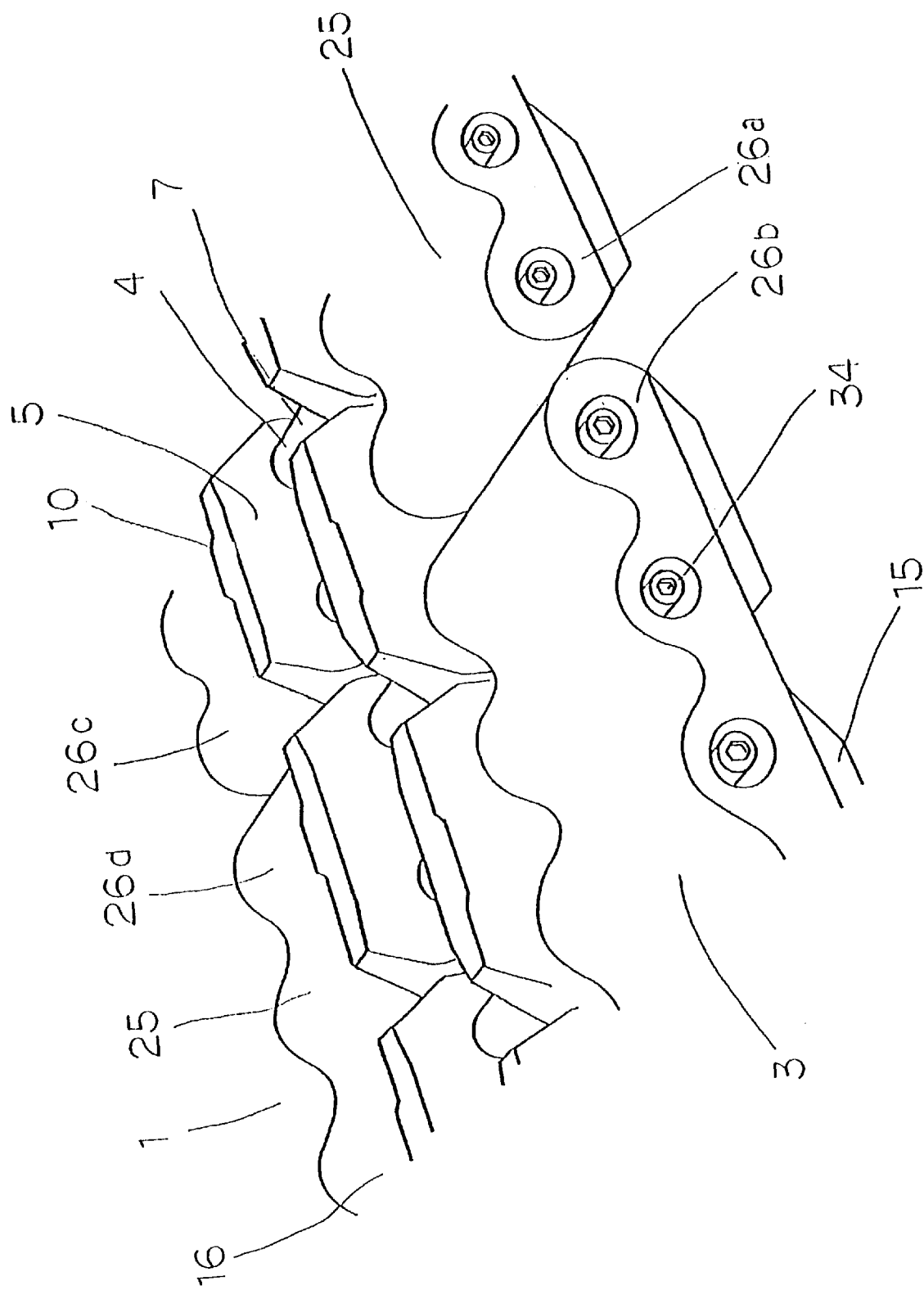
FIG. 89 is on another embodiment thereof.

In addition, this dividing position is not limited to this example, and is arbitrary. The other division example is shown in FIG. 89.

Moreover, the band 25 is not limited to dividing into two pieces, and may be divided into three to plural owner end bands 26 having beyond three bars 4.

Accordingly, when the band 25 is damaged, the rubber crawler of this example can be exchanged per a division.

Furthermore, this example can be carried out also in the composition of the 19th example.

Figure 90:
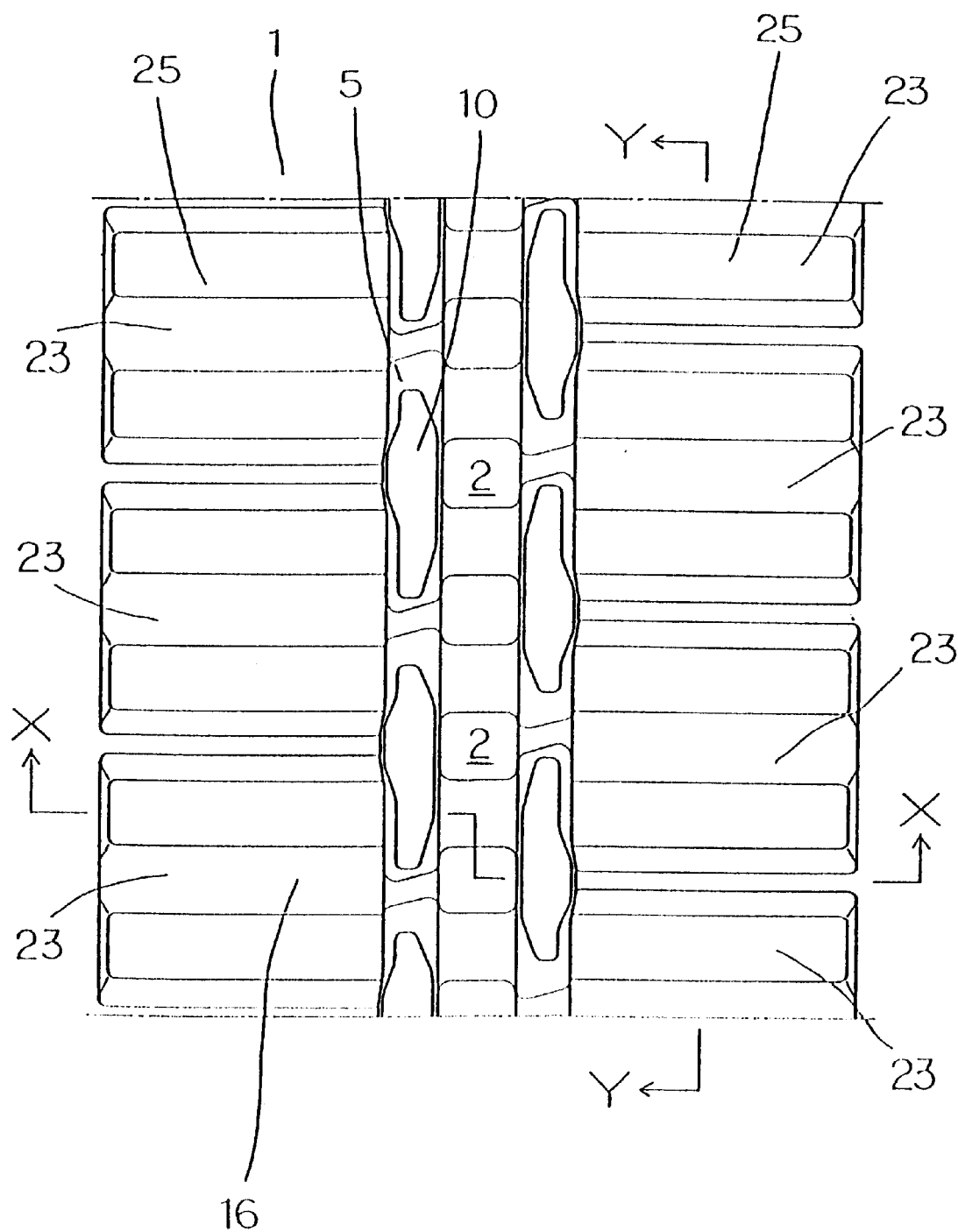
FIG. 90 is a plan view showing an inner circumference side of a rubber crawler of the 21st example.
Figure 91:
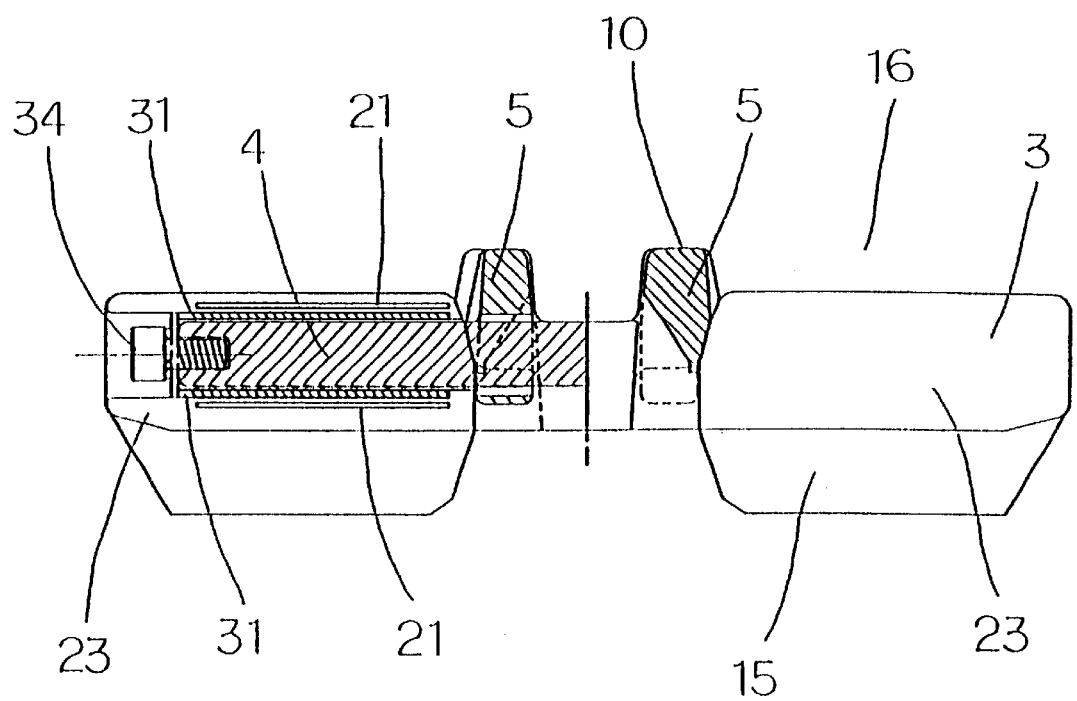
FIG. 91 is an X—X line sectional view therein.
Figure 92:
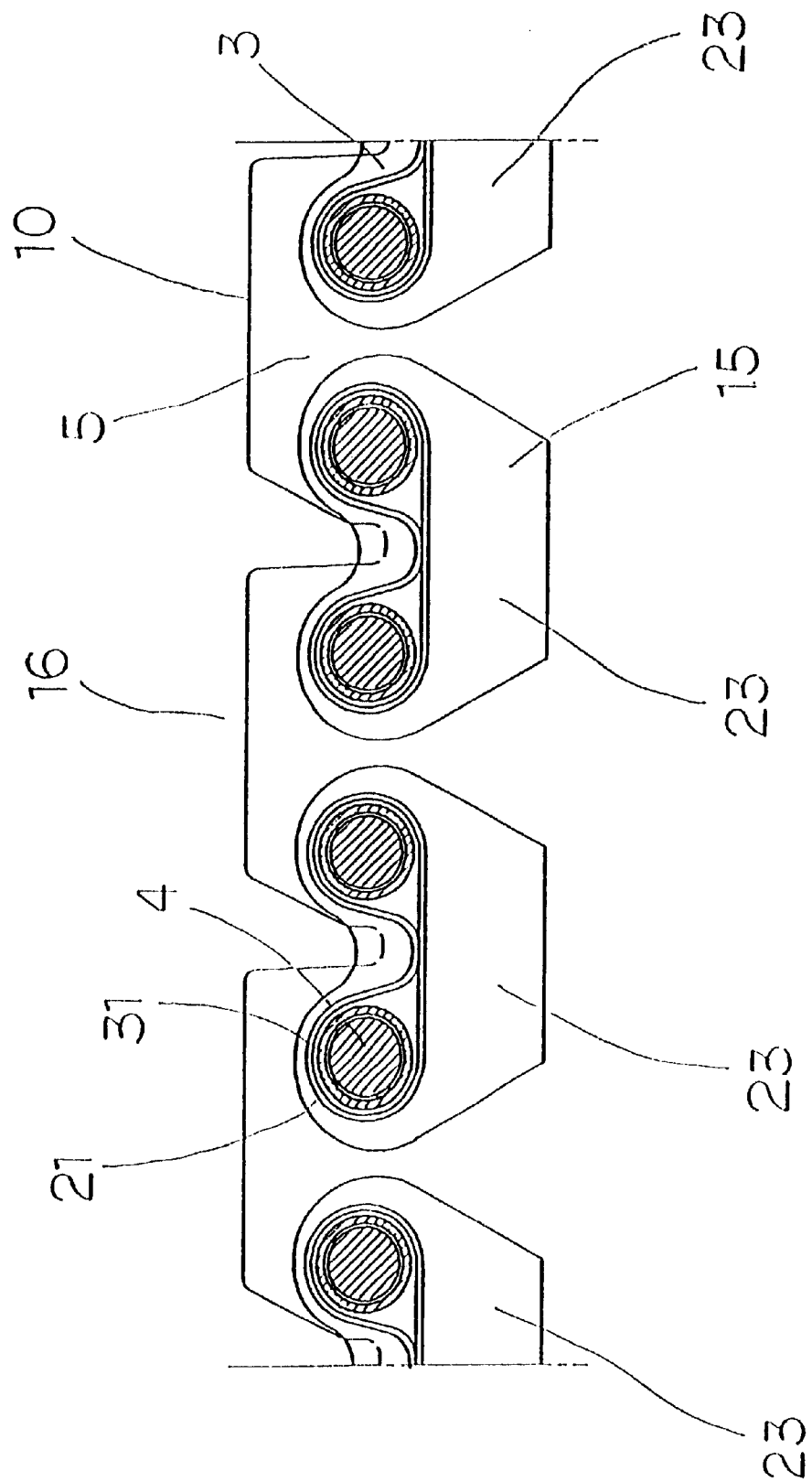
FIG. 92 is a Y—Y line sectional view therein.
Figure 93:
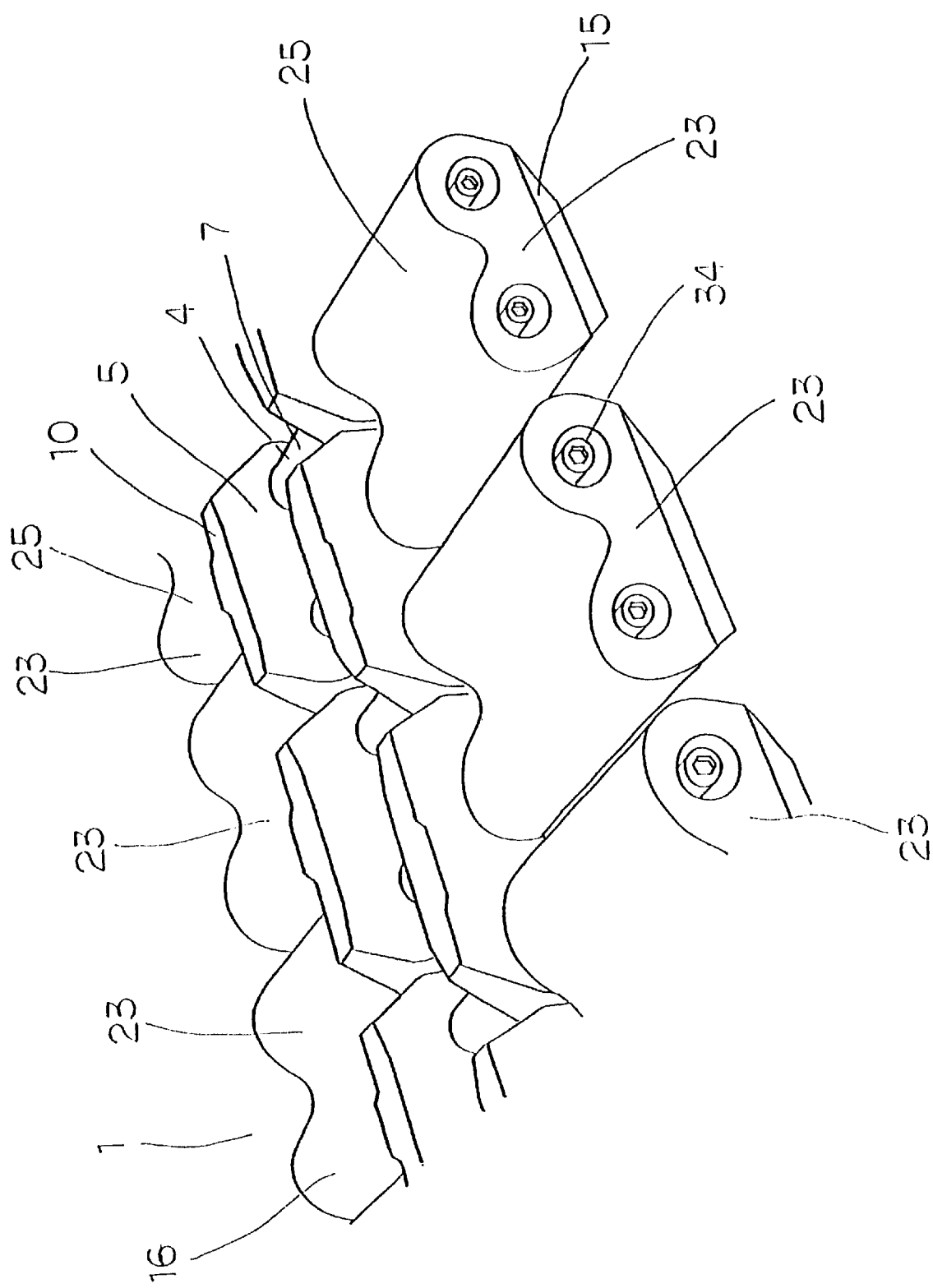
FIG. 93 is a perspective view of the rubber crawler of the 21st example.

FIGS. 90 to 93 show the 21st example of this invention. FIG. 90 is a plan view showing the inner circumference side 16 of this example. FIG. 91 is an X—X line sectional view in FIG. 90, FIG. 92 is a Y—Y line sectional view in FIG. 90, and FIG. 93 is a perspective view of the rubber crawler.

This example is characterized by dividing the band 25 into plural simple substances 23 having two bars 4 in the composition of the 18th example.

Figure 94:
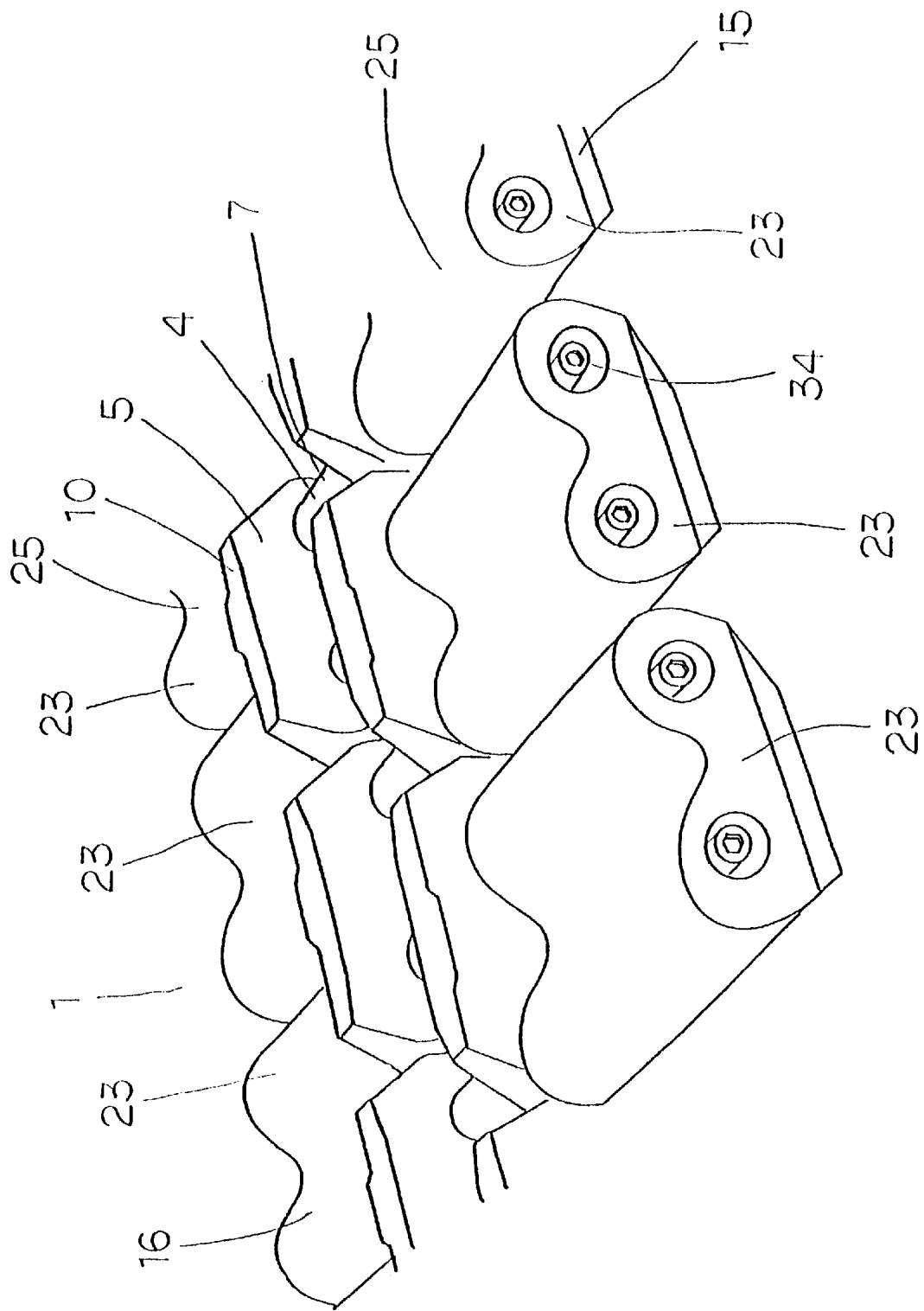
FIG. 94 is one of another embodiment of a rubber crawler of the 22nd example.

The simple substance 23 may be arranged at the same position as the generally parallelepiped block 5 in the crawler circumferential direction, or may be arranged to shift by half a pitch thereto (a pitch to the bar). Whichever is sufficient, shifting by half a pitch is more desirable. The other embodiment of this example is shown in FIG. 94.

The rubber crawler of this example is partially repaired easily. Besides, when it is winded around the driving wheel or the idler wheel, winding resistance is lessened.

Moreover, this example can be carried out also in the composition of the 19th example.

Figure 95:
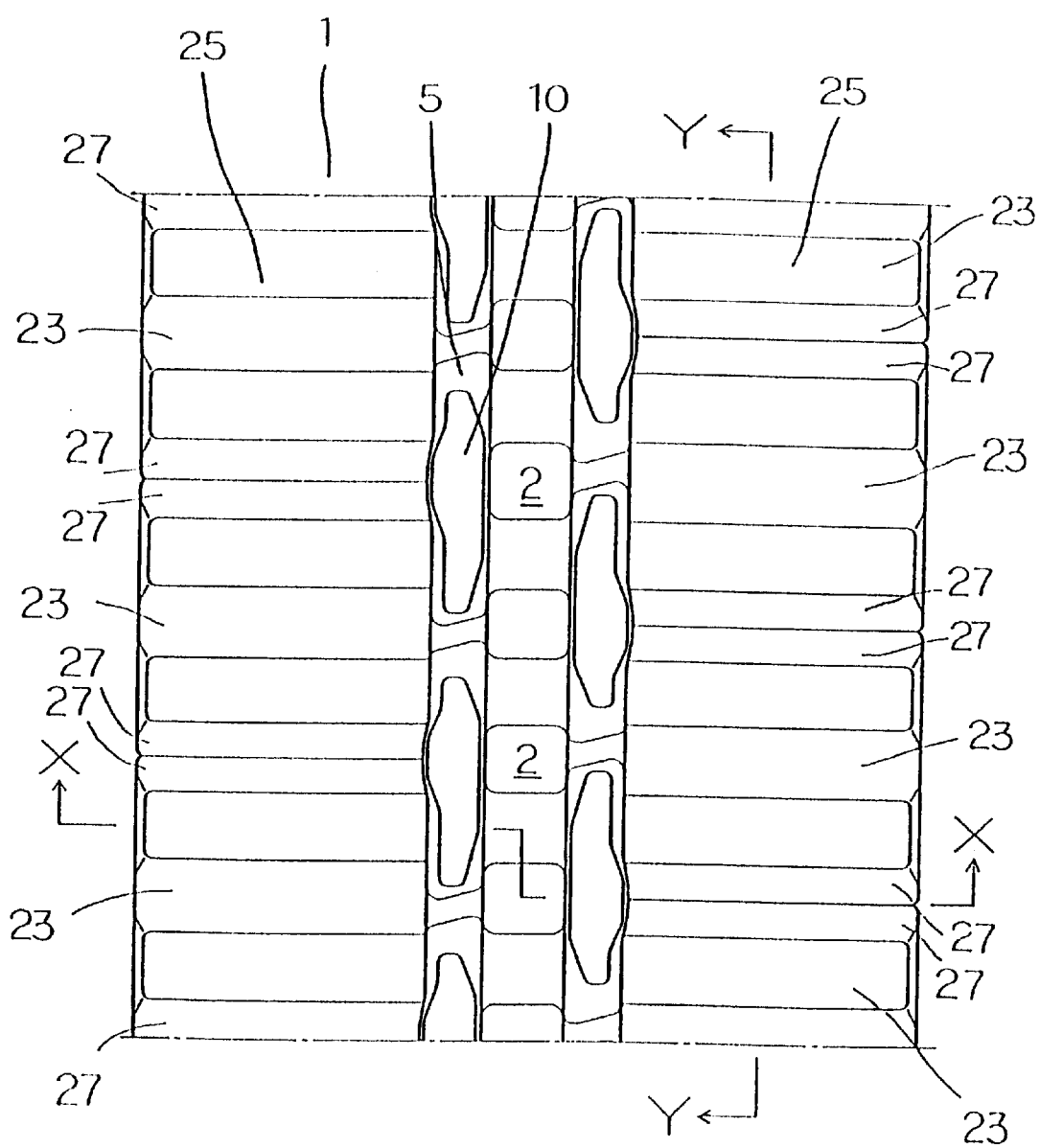
FIG. 95 is a plan view showing an inner circumference side of the rubber crawler of the 22nd example.
Figure 96:
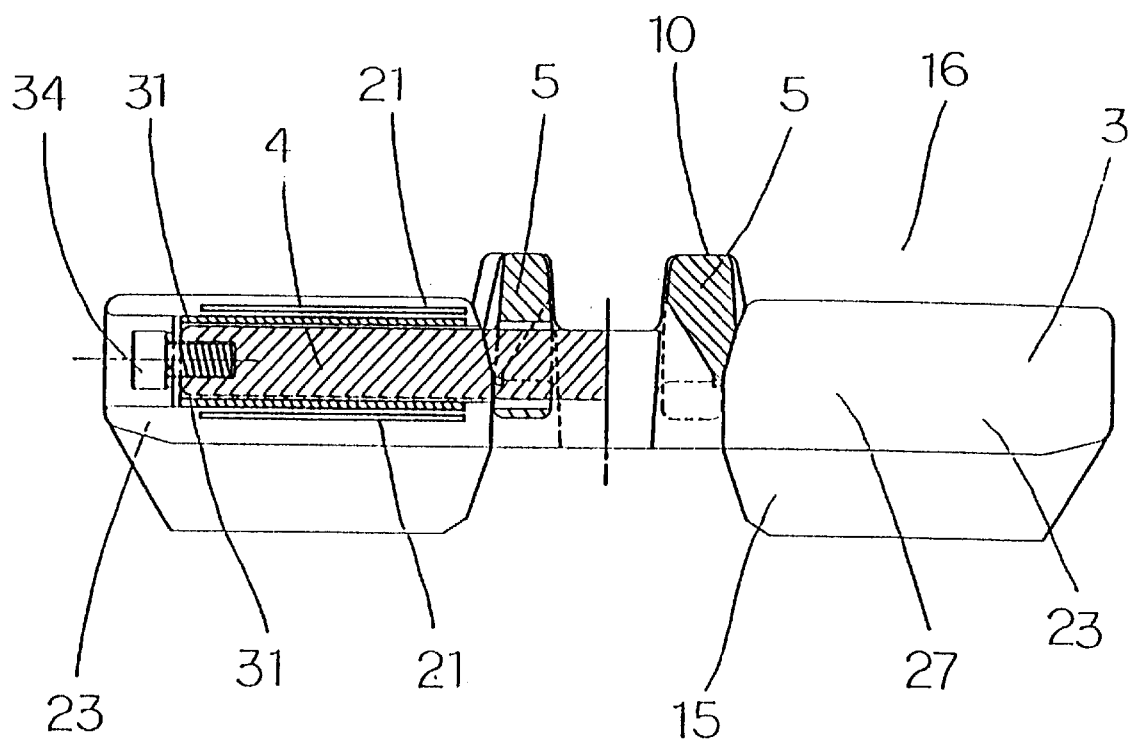
FIG. 96 is an X—X line sectional view therein.
Figure 97:
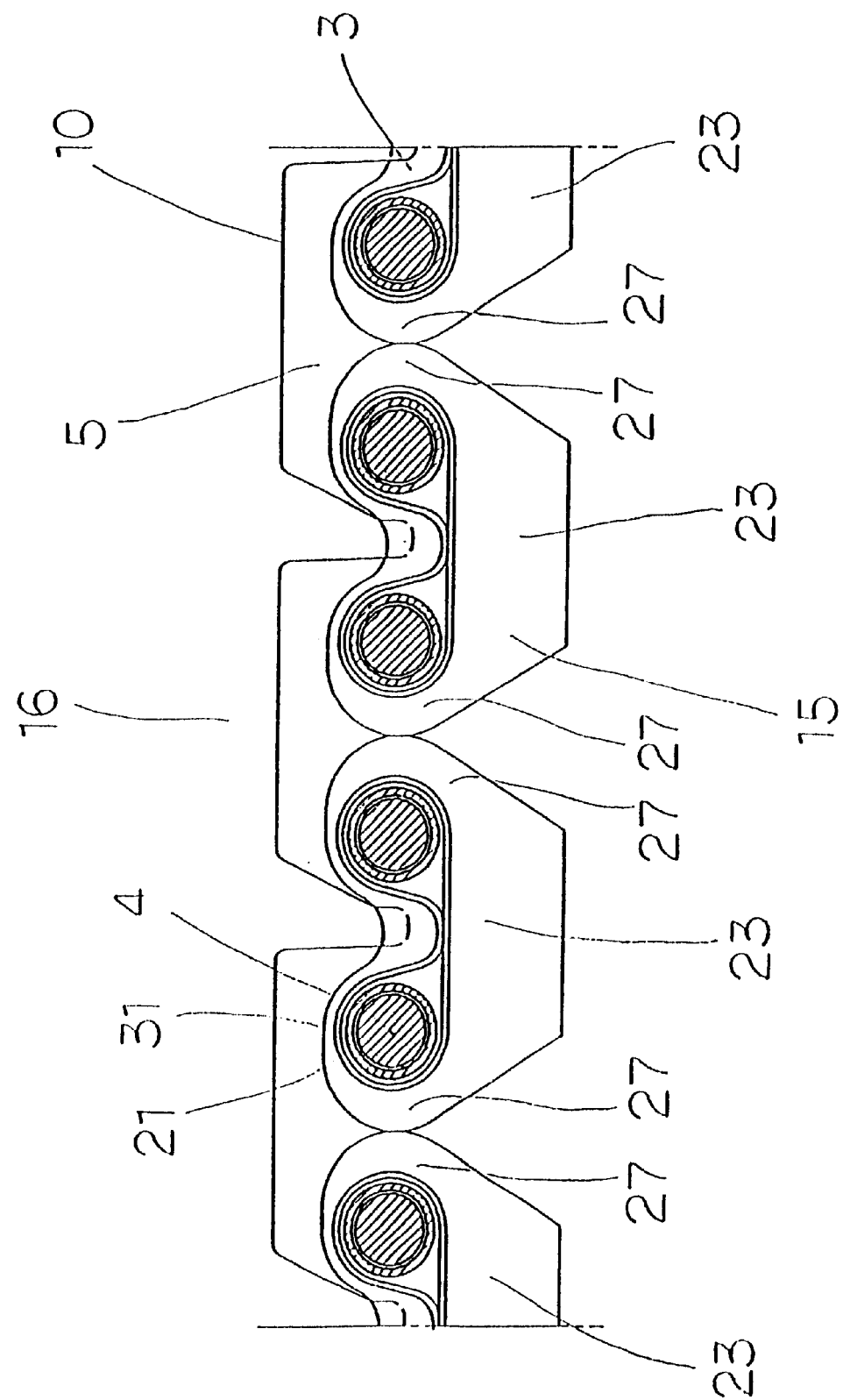
FIG. 97 is a Y—Y line sectional view therein.

FIGS. 95 and 96 show the 22nd example of this invention. FIG. 95 is a plan view showing the inner circumference side 16 of a rubber crawler of this example. FIG. 96 is an X—X line sectional view in FIG. 95, and FIG. 97 is a Y—Y line sectional view in FIG. 95.

In the rubber crawler of this example, each end 27 of the simple substance 23 in the crawler circumferential direction touches face to face with an end 27 of a like simple substance in the composition of the 21st example. Therefore, mud and foreign substances are prevented going up to the inner circumference side of the rubber crawler.

In addition, this example can be similarly carried out in the composition of the 20th example.

Figure 98:
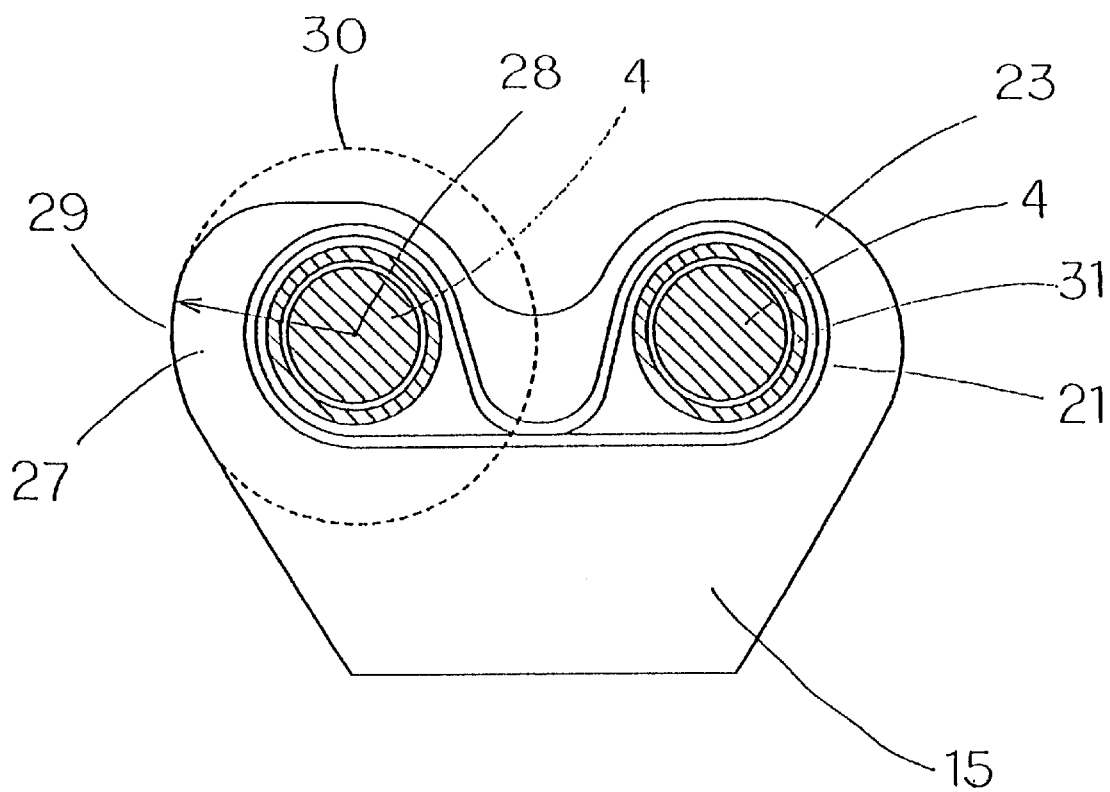
FIG. 98 is a fragmentary sectional view of a rubber crawler of the 23rd example.
Figure 99:
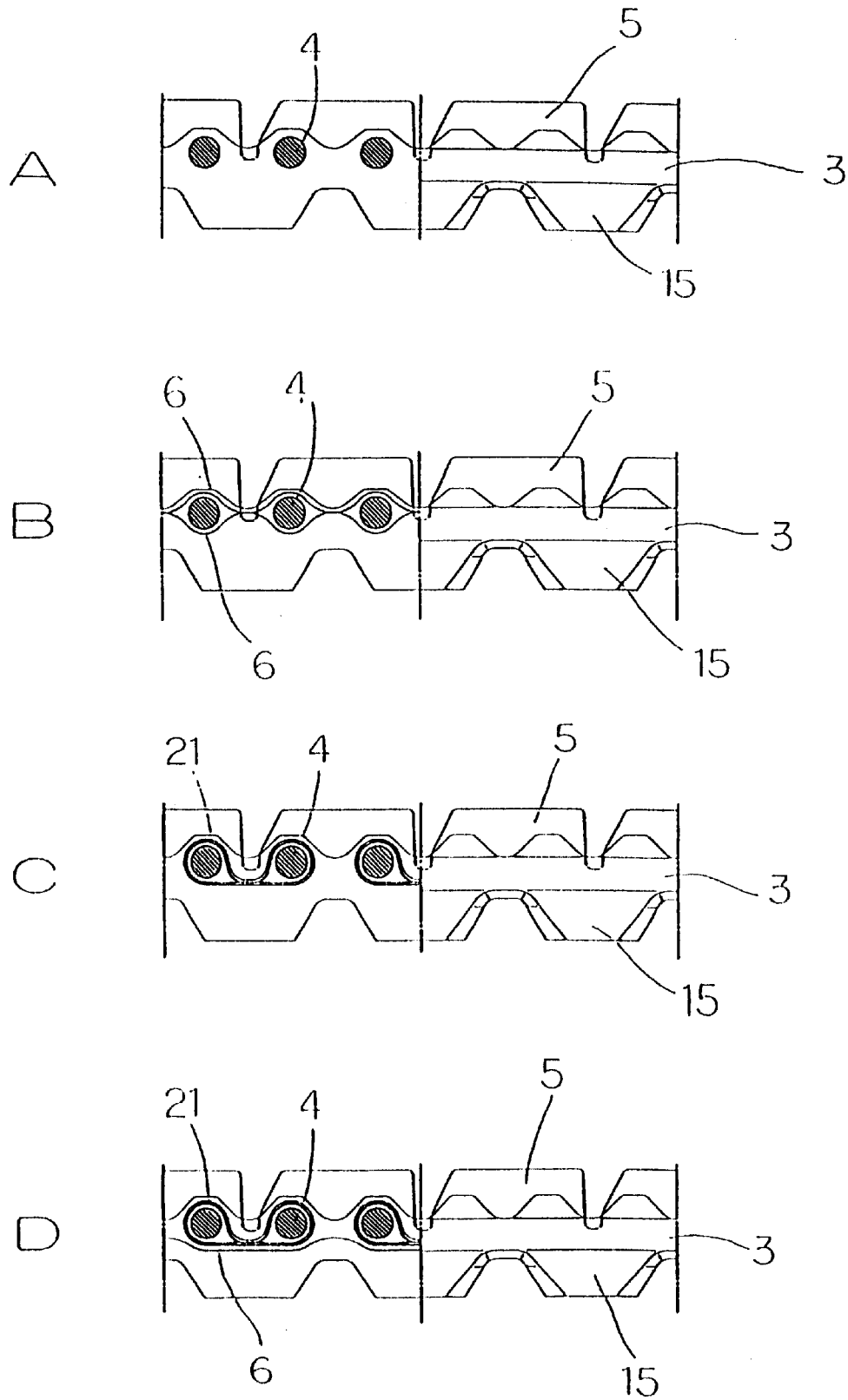
FIG. 99A is a sectional view showing another embodiment of the $1^{st}$ example.
FIG. 99B is one showing another embodiment of the 8th example.
FIG. 99C is one showing another embodiment of the 9th example.
FIG. 99D is one showing another embodiment of the 10th example.

FIG. 98 shows the 23rd example of this invention. In the 23rd example, a circle 29 of the end 27 of the single substance 23 or the owner end band 26 of the 22nd example is located on a circle 30 centering on the center 28 of the bar 4 in its right-angled section in its length direction.

Therefore, even if the rubber crawler is crooked to its inner circumference or its outer circumference, the ends 27 of the owner end bands 26 or the ends 27 of the simple substances 23 always touch face to face with each other.

FIGS. 99A to 99D are representative examples showing other embodiments of the above-mentioned example, respectively. In these figures, a rubber crawler is formed so as to shift the lug 15 by half a pitch to the generally parallelepiped block 5 and the connecting ring 21 (a pitch to the bar) in the crawler circumferential direction.

FIG. 99A, FIG. 99B, FIG. 99C and FIG. 99D show rubber crawlers that the lug 15 is shifted by half a pitch in the crawler circumferential direction in the compositions of the 1st example, the 9th example, the 10th example and the 11th example, respectively. This composition is arbitrarily applied to another example.

Figure 100:
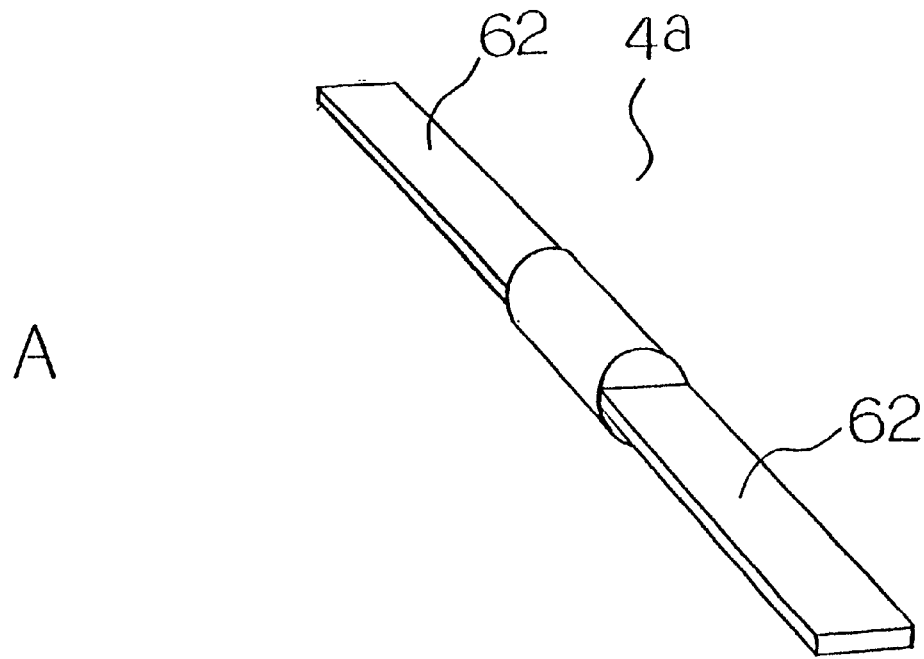
FIG. 100A is a perspective view showing another embodiment 1 of the bar.
FIG. 100B is one showing another embodiment 2.
Figure 100:
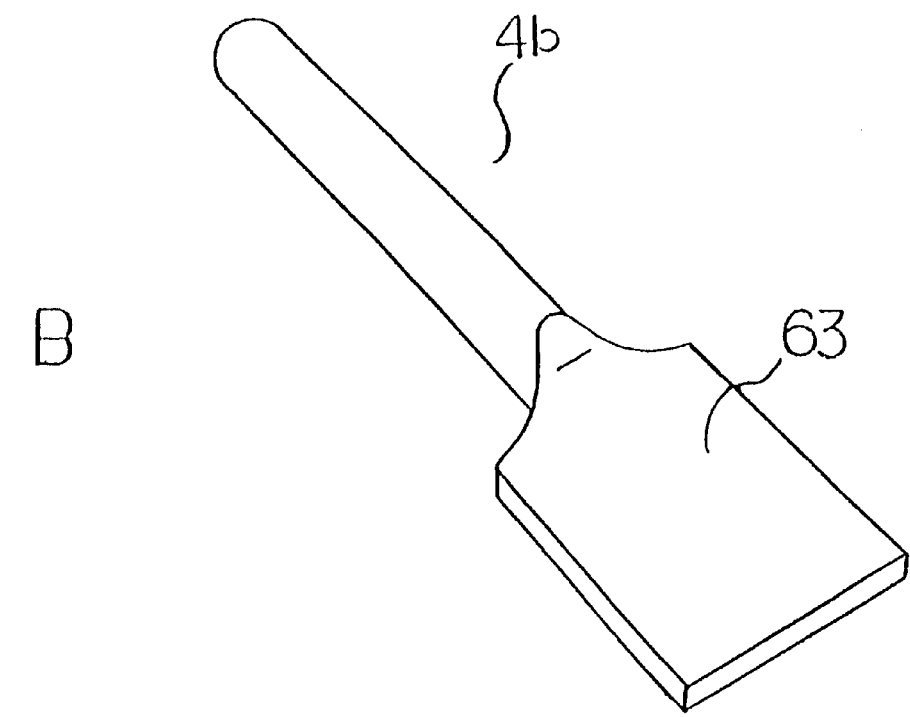
Figure 101:
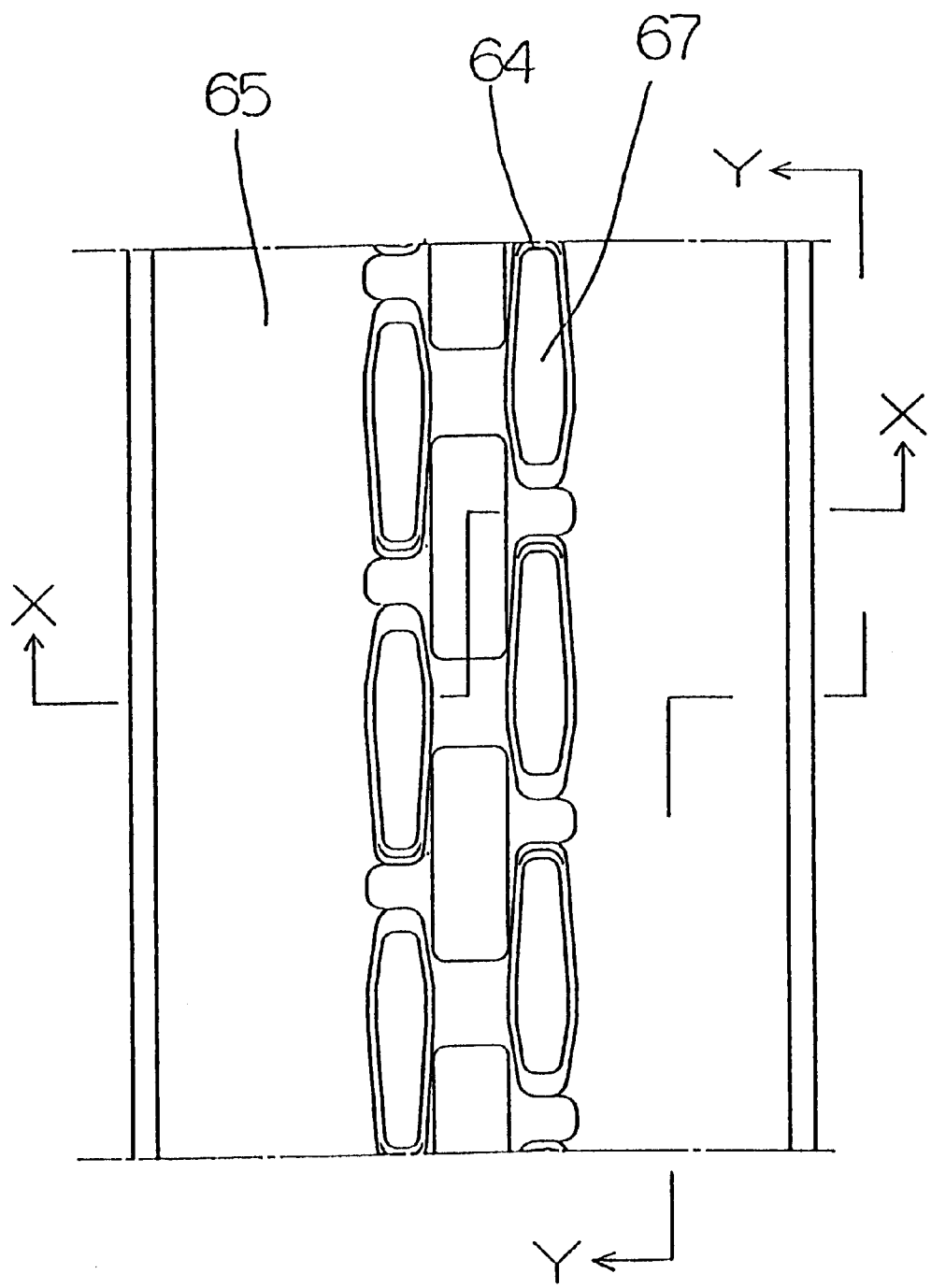
FIG. 101 is a plan view showing an embodiment of the conventional rubber crawler.
Figure 102:
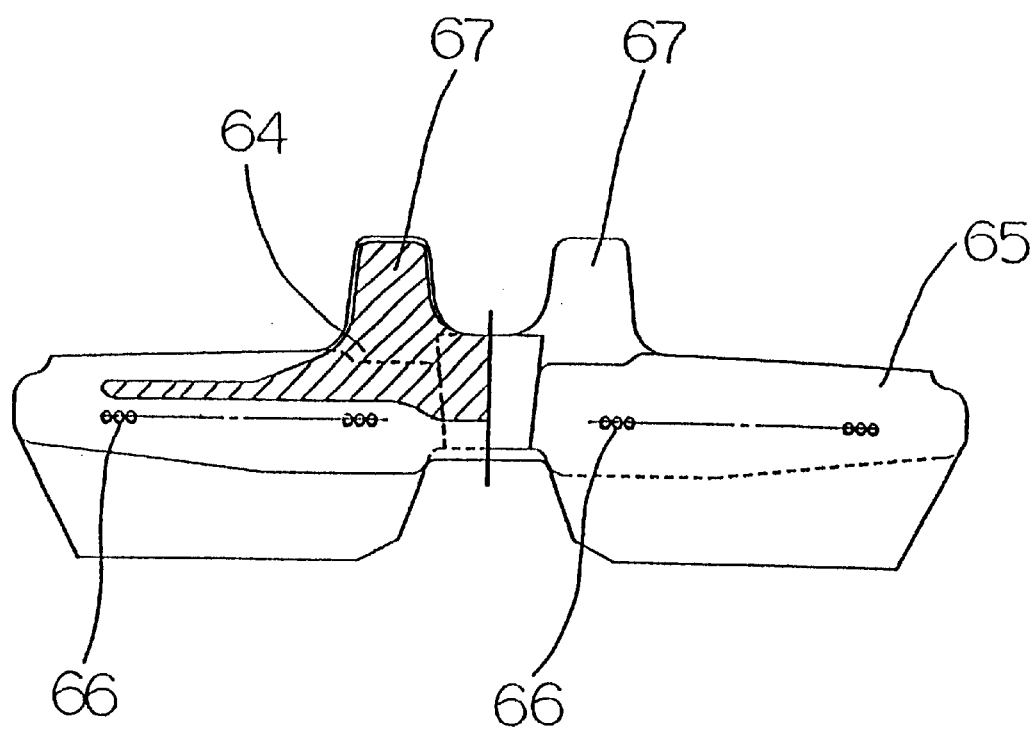
FIG. 102 is an X—X line sectional view therein.
Figure 103:
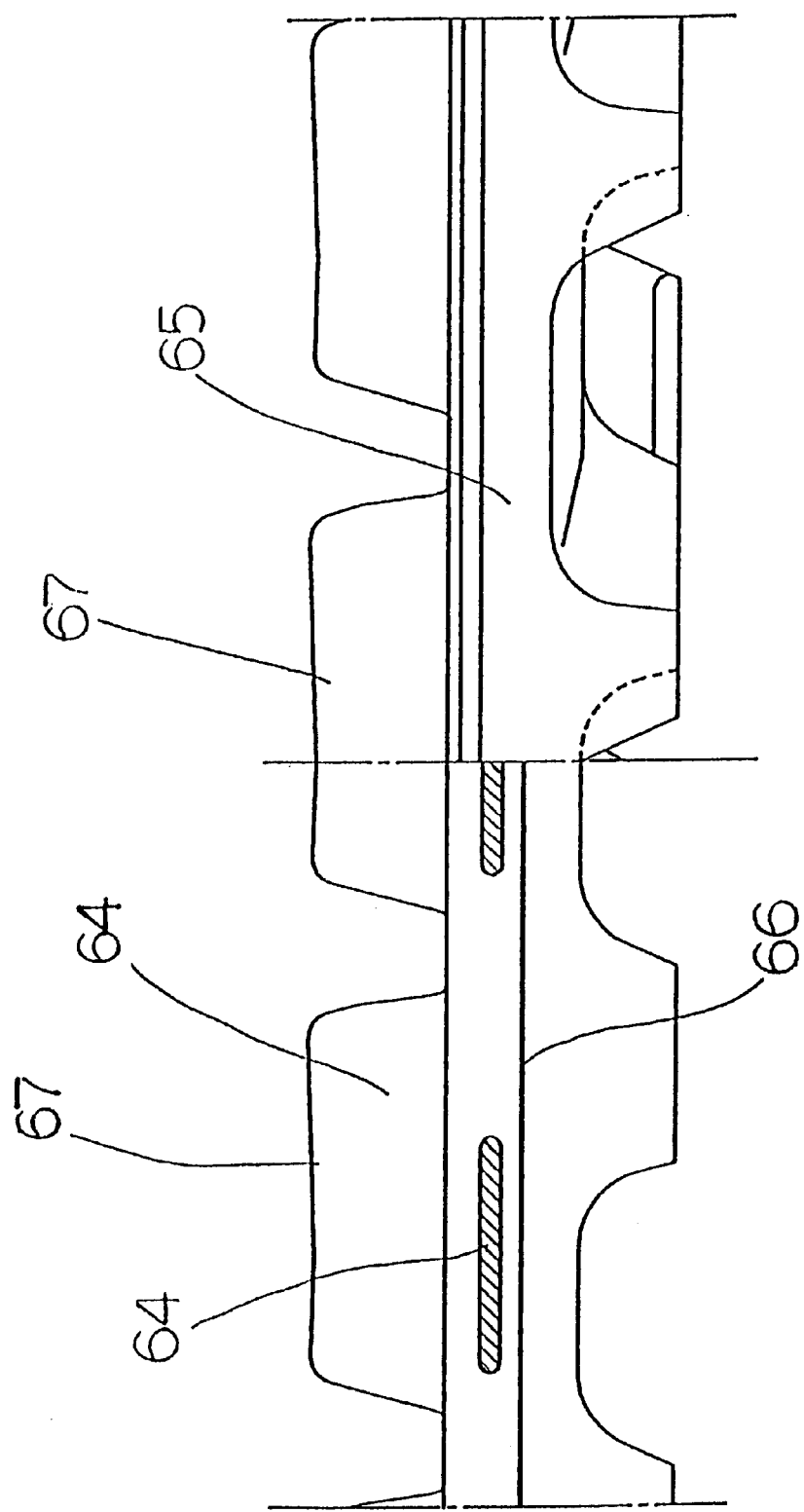
FIG. 103 is a Y—Y line sectional view therein.

FIGS. 100A and 100B are representative examples showing another embodiment of the bar 4. A bar 4a of FIG. 100A is formed, except in a central engaging part and a portion fitted to the generally parallelepiped block 5, into a flat plate part 62 with fixed thickness. In FIG. 100B, one end of a bar 4b in its length direction is formed as a ladle part 63 broader than a diameter of its central part.

Availability on Industry

In this invention, a rubber crawler is formed to be endless by connecting bars with generally parallelepiped blocks. Therefore, even if the rubber part sustains fatal damage to the conventional rubber crawler, there is neither a fracture by cut nor a fracture by steel cord corrosion. Besides, even if the generally parallelepiped block, which is a part of the core, is caught$_1$ in the chassis, the core does not protrude like the conventional rubber crawler. Accordingly, the rubber crawler serves as a very reliable one.

Moreover, since the generally parallelepiped blocks are arranged in a laterally overlapping pattern, a collapse of the rolling wheel and travelling oscillations are lessened, thereby enabling the rubber crawler to travel smoothly.

The bar is a stick material, which is made of cheap common steel material such as a round bar and a steel pipe. Accordingly, it is very economical and the manufacture cost of the rubber crawler can be reduced.

When the bush is fitted in the portion engaging with the sprocket, it can be engaged with the sprocket in various sizes by changing the size of its outer diameter. Besides, using a wear-resistant bush, a life of the rubber crawler can be extended.

Moreover, the diameter of the through hole of the generally parallelepiped block is larger than the diameter of the bar, and the rubber is filled into the gap between the through hole and the bar to be pasted up. In this case, the bar is fixed through the rubber of an elastic material, so that the rubber crawler can elongate somewhat. Accordingly, though high load is added, unusual tension is hardly generated differently from an iron link, thereby serving as a rubber crawler not to be broken easily.

In an elongation beyond a fixed level, the bar is fixed on the generally parallelepiped block firmly, thereby lessening twists and preventing the rubber crawler derailing. Besides, shaking of each bar lessens, thereby serving as a rubber crawler to be lessened oscillations.

Moreover, the rubber is filled into the gap between the bar and the through hole of the generally parallelepiped block, and the crawler travels through the rubber, thereby preventing noises such as creaking sound.

When making one side of the through hole of the generally parallelepiped block small, and the other side large, in addition, when providing the bar shake stop protrusion to the inner wall of the through hole, the rubber crawler can lessen twists and shaking more than the above-mentioned rubber crawler.

The protrusion of the generally parallelepiped block in the inner circumference side of the rubber crawler serves as a slip-preventing guide of the rolling wheel or the idler wheel. When the protrusion is formed in the horn shape, the generally parallelepiped block becomes cheap. When the top of the protrusion is extended in the crawler circumferential direction, it serves as a rolling part of the rolling wheel.

Moreover, when the wing part attached to the generally parallelepiped block is extended in the crawler circumferential direction, it serves as a rolling contact surface of the outer rolling wheel. When the wing part is located between adjacent bars, the generally parallelepiped block becomes cheap as well as provides the above effect, thereby serving as an economical rubber crawler.

Lateral shift control parts are provided on both ends of the generally parallelepiped block in its length direction. The lateral shift control parts of adjacent generally parallelepiped blocks in the crawler circumferential direction are overlapped in view of the crawler circumferential direction when embedded therein, thereby preventing the rubber crawler shifting and coming off.

When embedding the reinforcing layer in the rubber crawler, driving force, which is transmitted from the sprocket to the bar, is transmitted to the whole rubber crawler with sufficient balance, and enough traction is obtained. At the same time, partial stress around the bar is eased, thereby improving durability of the rubber crawler.

When the crawler coils around the driving wheel or the idler wheel, the rubber crawler having the connecting ring decreases distortion repeatedly generated to the rubber between the generally parallelepiped blocks, thereby preventing rubber fatigue destruction therebetween. Moreover, the connecting ring fixes the bar with assistance, thereby serving as a rubber crawler to lessen oscillations, to prevent derailing, and to increase intensity. Since the connecting ring has spring nature and elongation, even if high load is added, an unusual tension does not occur, thereby preventing the rubber crawler being broken.

Moreover, the connecting ring serves on increasing rigidity between the bar and the bar, and dispersing the driving force that is transmitted from the sprocket to the bar to transmit to the lug effectively. Therefore, enough traction is obtained.

When arranging the reinforcing layer on the outer circumference side of the connecting ring, the driving force is transmitted uniformly, and the rigidity of the rubber crawler is increased. Therefore, reliable traction is obtained.

In the rubber crawler having the connecting ring, when the lug is shifted by half a pitch to the connecting ring in the crawler circumferential direction, it is located over an adjoining connecting ring, thereby increasing rigidity between the connecting rings to be uniform to the whole crawler. Besides, reliable traction is obtained, and the derailment is prevented effectively.

In the rubber crawler having the generally parallelepiped auxiliary block having a through hole whose diameter is larger than the outer diameter of the bar, the bar is fixed through rubber of an elastic material. Therefore, the rubber crawler can elongate somewhat, thereby hardly generating unusual tension even if high load is added. Accordingly, the rubber crawler is hard to be broken. On the other hand, the bar is firmly fixed when the rubber crawler extends more than fixed, thereby serving as a rubber crawler to lessen oscillations and not to derail easily.

When exposing the top face of the generally parallelepiped auxiliary block in the inner circumference side of the rubber crawler, it serves as a rolling contact surface of the outer rolling wheel.

In the endless rubber crawler formed by connecting with the same kind of rubber crawler unit or the various kind of rubber crawler unit, if the rubber crawler should be damaged partially, only the portion can be exchanged. As compared with exchanging the whole rubber crawler, cost is reducible, waste decreases and abandonment processing also becomes easy.

In the rubber crawler that the pipe is fitted on the bar, the rubber part embedding the pipe is easily attached and detached. When the, rubber part is damaged, it can be exchanged easily, thereby enabling to repair easily and to reduce maintenance cost.

When the inner wall of the pipe is covered with the high molecular compound layer such as thin rubber, noises due to the friction between the pipe and the bar are prevented, and the bar is fixed firmly.

In the rubber crawler dividing the band provided to the outside portion of the generally parallelepiped block in the crawler width direction, when the rubber part is damaged, only the damaged partial unit can be exchanged. Accordingly, it is economical. Besides, when the band is divided into the simple substance having two bars, the unit parts are miniaturized, and are exchanged easily. In addition, since manufacturing equipment can be miniaturized, carrying work becomes easy.

In the rubber crawler, with ends of the divided band touching face to face, there is no crevice between the simple substances or the owner end bands, thereby preventing mud or foreign substances going up at the inner circumference side. Besides, the derailment or the unusual tension due to biting foreign substances between the sprocket and the rubber crawler is prevented. Moreover, a soft ground is prevented sinking, and the revolving nature is prevented reducing.

When ends of the divided band are touched face to face in the crawler circumferential direction, if the circle of the end is on the circle centering on an axial center of the bar, the ends of adjacent divided bands keep the touch even if the rubber crawler bends in its inner or outer circumference side by coiling around the idler wheel or the driving wheel, or even if the touching position moves. Therefore, the mud and the foreign substances are prevented coming in the inner circumference side of the rubber crawler, thereby preventing the derailment and the unusual tension due to biting foreign substances.

What is claimed is:

1. A rubber crawler comprising a body of elastic material, and a core having a first series of blocks (5) each having, in a lower surface region, a forward through hole and a longitudinally spaced, rear through hole, a second series of blocks (5) each having, in a lower surface region, a forward through hole and a longitudinally spaced, rear through hole, and bars (4) inserted in the through holes (9) of the blocks of both series, the blocks of both series being made of metal, the blocks (5) of the first series being arranged in laterally overlapping relationship with the blocks of the second series, with sprocket engaging holes (2) disposed between the two series, and each bar (4) being inserted in a forward through hole (9) of a block of one of the series and in a rear through hole of an adjacent block (5) of the outer series, the bars (4) being connected within the blocks (5) and embedded in the body.

2. A rubber crawler comprising a rubber crawler unit consisting of plural rectangular parallelepiped blocks (5) and plural bars (4) by connecting minimum rubber crawler units consisting of two rectangular parallelepiped blocks (5) each having two longitudinally spaced through holes (9) in the lower surface region and one bar (4) inserted in each through hole (9), the rectangular parallelepiped blocks (5) being arranged in zigzags with sprocket engaging holes (2) disposed therebetween, the bars (4) being inserted in alternately corresponding through holes (9) in adjacent rectangular parallelepiped blocks (5), the bars (4) being connected within the rectangular parallelepiped blocks (5) and embedded in the rubber crawler unit, the rectangular parallelepiped blocks (5) being provided to one side of right and left of the rubber crawler unit in a crawler width direction with engaging holes disposed therebetween of both ends of the rubber crawler unit in a crawler circumferential direction, connecting bars (47) being inserted in connecting rectangular parallelepiped block through holes (46) and connecting bar insertion holes (45) of the rectangular parallelepiped blocks (5), and the rubber crawler units being connected at their ends in the crawler circumferential direction and served as an endless rubber crawler.

3. A rubber crawler as claimed in claim 1, wherein each of the bars (4) has a circular section form.

4. A rubber crawler as claimed in claim 1, wherein a diameter of each through hole of the blocks (5) is larger than an outer diameter of each bar, and rubber (13) is filled into a gap between the through hole (9) and the bar (4).

5. A rubber crawler as claimed in claim 1, wherein each through hole (9) is formed into different sizes in its front face and back face, one side small and the other side large.

6. A rubber crawler as claimed in claim 4, wherein a diameter of each through hole (9) is larger than an outer diameter of the bar, and a bar shake stop protrusion (14) is provided on an inner wall of the through hole (9).

7. A rubber crawler as claimed in claim 1 wherein an upper surface region (10) of each block (5) protrudes out of an inner circumference side (16) of the rubber crawler.

8. A rubber crawler as claimed in claim 7, wherein the upper surface region (10) of each block (5) extends over the through holes (9) on the lower surface region, and a top face of the upper surface region (10) is formed flat so as to serve as a travelling rolling surface on which a rolling wheel travels.

9. A rubber crawler as claimed in claim 7, wherein a protrusion (32) in a horn shape is provided on the inner circumference side of the rubber crawler on each block (5).

10. A rubber crawler as claimed in claim 1, wherein a lateral shift control part (42) is provided to both ends of each block (5) in its length direction, and the lateral shift control part (42) is overlapped with a lateral shift control part (42) of an adjoining block (5) in the crawler circumferential direction.

11. A rubber crawler as claimed in claim 10, wherein one end of the lateral shift control part (42) is formed with a convex lateral shift control part (42c) and the other end with a concave lateral shift control part (42d), and these lateral shift control parts (42c, 42d) are fitted to each other and embedded in the rubber crawler.

12. A rubber crawler as claimed in claim 1, wherein a wing part (11a, 11b, 11c) is provided on an outside of each block (5) in the crawler width direction.

13. A rubber crawler as claimed in claim 1, wherein a bush (24) is fitted into a sprocket engaging part (7) of the bar (4).

14. A rubber crawler as claimed in claim 1, wherein the body is made of rubber, and a reinforcing layer (6) is embedded in the body (3) throughout the circumference of the body, the reinforcing layer being distributed on both sides of the bars (4) in the crawler width direction and embedded in at least one of an outer circumference side and an inner circumference side of the body.

15. A rubber crawler as claimed in claim 1, wherein connecting rings (21) are provided outside blocks (5) in the crawler width direction shifted by half a pitch relative to the generally parallelepiped blocks (5) in the crawler circumferential direction, and adjacent bars (4) are within each connecting ring (21) and embedded in the body (3).

16. A rubber crawler as claimed in claim 1, wherein auxiliary blocks (17) each having two through holes (19) are provided outside of the blocks (5) in the crawler width direction and shifted by half a pitch relative to the blocks (5) in the crawler circumferential direction, and adjacent bars (4) are alternately inserted into the through holes (19) of each auxiliary block and embedded in the rubber crawler body (3).

17. A rubber crawler as claimed in claim 16, wherein a top face (20) of each auxiliary block (17) on the inner circumference side of the rubber crawler is exposed or covered with rubber to a degree of burr.

18. A rubber crawler as claimed in claim 1, wherein a pipe (31) is fitted on each bar (4) outside the blocks (5) in the crawler width direction, and a band (25), a single substance (23) or an owner end band (26) corresponding to an outside part of the blocks (5) in the crawler width direction is detectably secured.

19. A rubber crawler as claimed in claim 18, wherein an inner wall of the pipe (31) is covered with rubber, high molecular elastic material, or a high molecular compound layer (23).

20. A rubber crawler as claimed in claim 18, wherein a band (25) is detectably secured, the band comprising at least one single substance (25) or owner end bands (26) containing more than two of the bars (4).

* * * * *